United States Patent
Goel et al.

(10) Patent No.: US 9,680,658 B2
(45) Date of Patent: Jun. 13, 2017

(54) COLLABORATIVE GROUP COMMUNICATION METHOD INVOLVING A CONTEXT AWARE CALL JOCKEY

(75) Inventors: Amit Goel, San Diego, CA (US); Mohammed Ataur R. Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 713 days.

(21) Appl. No.: 13/313,435

(22) Filed: Dec. 7, 2011

(65) Prior Publication Data

US 2013/0151622 A1    Jun. 13, 2013

(51) Int. Cl.
*G06F 15/16* (2006.01)
*H04L 12/18* (2006.01)

(52) U.S. Cl.
CPC ................................ *H04L 12/1822* (2013.01)

(58) Field of Classification Search
CPC .... G06Q 10/10; H04L 29/08072; H04L 29/06
USPC ....................................................... 709/205
See application file for complete search history.

(56) References Cited

U.S. PATENT DOCUMENTS

| | | | |
|---|---|---|---|
| 7,769,403 B2 | 8/2010 | Schwagmann et al. | |
| 7,809,390 B2 | 10/2010 | Shaffer et al. | |
| 8,559,610 B2 | 10/2013 | Crockett et al. | |
| 2006/0079260 A1* | 4/2006 | Tillet et al. | 455/518 |
| 2007/0054687 A1 | 3/2007 | Akita et al. | |
| 2008/0046514 A1 | 2/2008 | Daughtry et al. | |
| 2008/0267095 A1 | 10/2008 | Sekaran et al. | |
| 2009/0019374 A1 | 1/2009 | Logan et al. | |
| 2009/0161617 A1* | 6/2009 | Abedi ................... H04W 16/10 370/329 |
| 2009/0285220 A1* | 11/2009 | Shaffer et al. ........... 370/395.42 |
| 2010/0261494 A1* | 10/2010 | Tiwari et al. .................. 455/509 |
| 2012/0077536 A1 | 3/2012 | Goel et al. | |
| 2012/0143330 A1 | 6/2012 | Linares | |
| 2012/0225666 A1* | 9/2012 | Qu et al. .................... 455/456.1 |

FOREIGN PATENT DOCUMENTS

| | | |
|---|---|---|
| EP | 1024647 A1 | 8/2000 |
| EP | 1091550 A2 | 4/2001 |
| JP | H10164240 A | 6/1998 |
| JP | 2001346267 A | 12/2001 |
| JP | 2003069563 A | 3/2003 |
| JP | 2005062932 A | 3/2005 |

(Continued)

OTHER PUBLICATIONS

International Search Report and Written Opinion—PCT/US2012/068374—ISA/EPO—May 8, 2013.

(Continued)

*Primary Examiner* — Alan S Chou
(74) *Attorney, Agent, or Firm* — Raphael Freiwirth

(57) ABSTRACT

A system and method comprises establishing a group communication session between a first participant and a second participant. The method may include a dynamic point of control entity within the communication session. The dynamic point of control entity may be designated to operate in different roles and may have access to information regarding the conduct and participants of the call session, and also have control authority required in order to execute the designated role.

115 Claims, 30 Drawing Sheets

(56) References Cited

FOREIGN PATENT DOCUMENTS

| JP | 2008034900 A | 2/2008 |
|---|---|---|
| WO | 0135655 A2 | 5/2001 |
| WO | 2007015329 A1 | 2/2007 |
| WO | 2008076687 | 6/2008 |

OTHER PUBLICATIONS

Partial International Search Report and Written Opinion—PCT/US2012/068374—ISA/EPO—Mar. 21, 2013.

* cited by examiner

COLLABORATIVE GROUP COMMUNICATION METHOD INVOLVING A CONTEXT AWARE CALL JOCKEY

FIELD

The embodiments relate to a collaborative group communication method involving a context aware call jockey providing a focal point to a group communication call.

BACKGROUND

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communication systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-Talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast." As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

In addition to various transmission schemes (e.g., unicast, multicast, and broadcast) that may be used, the PTT call may also be a half duplex or a full duplex communication for at least some of the participants. Generally, a PTT call corresponds to a server mediated communication between two or more identified access terminals, regardless of the various configurations used to conduct the PTT calls.

SUMMARY

In an embodiment, a network communications entity may receive from an originator wireless communications device a request to initiate a call with a target wireless communications device. The network entity may receive a session request from an access terminal to initiate a call with at least one target access terminal through a dispatch console. The network entity may perform an initial allocation of resources associated with credentials of the at least one target access terminal. The network entity may then receive and buffer session updates from the dispatch console, and then update the initial allocation of resources based upon the buffered session updates. The network communications entity may be an application server and include a dispatch function and a gateway function.

In another embodiment, a method comprises establishing a group communication session between a first participant and a second participant. The method includes a dynamic point of control entity within the communication session. The dynamic point of control entity has access to information regarding the conduct and participants of the call session and also has control authority over the communication session. In another embodiment of the present disclosure, the method may include transmitting a message from a communication session participant to a server to replace a dynamic point of control entity with a communication session participant, wherein the communication session participant becomes the dynamic point of control entity.

In yet another embodiment, the method may include transmitting a request to a server to change a dynamic point of control entity. The server may map resource allocation between at least two parties and may pass control from the dynamic point of control entity to a second entity. The second entity may receive control of the communication session as the dynamic point of control entity. In another embodiment, the method may comprise transmitting a message from the dynamic point of control entity to a server. The server may formulate a request to delete a participant to the communication session. The server may communicate resource allocation parameters to delete the participant from the communication session. The dynamic point of control entity may be hosted on one of a computer device, a server, a computer console or a mobile computing device.

In another embodiment, a method for conducting a communication session among a plurality of participants supported by a server includes establishing a group communication session between a first participant and a second participant, determining a contextual parameter of the group communication session, and taking action in the group communication session based on the contextual parameter.

In another embodiment, the method further includes transmitting a request to the server to assign a dynamic point of control entity to the group communication session based on the contextual parameter, and delivering resource allocation parameters from the server to the dynamic point of control entity. The method may also include transmitting a request to the server to assign the dynamic point of control entity access to information regarding the conduct and participants of the group communication session and assigning the dynamic point of control entity control authority over the group communication session. The method may also include delivering resource allocation parameters from the server to the dynamic point of control entity to assign the dynamic point of control entity access to information regarding the conduct and participants of the group communication session, and assigning the dynamic point of control entity control authority over the group communication session.

In another embodiment, the method may include determining a contextual parameter of the group communication session by receiving an output of a sensor, and comparing the output to a plurality of rules to determine the contextual parameter. The method may also include determining a contextual parameter of the group communication session and receiving a message from the group participant indicating the contextual parameter.

In another embodiment, the method may also include determining a contextual parameter of the group communication session and receiving an output from a computing device that a group participant has crossed a predetermined geographic location, and comparing the output to a plurality of rules to determine the contextual parameter In another embodiment, the method may also include determining a contextual parameter of the group communication session by receiving an output from a computing device, and comparing the output to a plurality of defined rules to determine the contextual parameter.

In another embodiment, the method may also include determining a contextual parameter of the group communication session by receiving a signal from a computing device indicating that an emergency has occurred, or by determining a contextual parameter of the group communication session by receiving a signal from the server that an emergency has occurred.

In another embodiment, the method may also further include determining a contextual parameter of the group communication session by receiving a signal that a predetermined entity has joined the group communication session, or by receiving a signal which is transmitted in response to a condition that an entity with specialized knowledge is needed by at least one participant in the group communication session.

In another embodiment, the method may include determining a contextual parameter of the group communication session by receiving a signal which is transmitted in response to a condition indicating assistance is needed by at least one participant in the group communication session.

In another embodiment, the method may further include determining a contextual parameter of the group communication session by receiving a signal which is transmitted in response to a condition indicating that a priority level of a group communication session has changed by at least one participant in the group communication session.

In another embodiment, the method may also include ranking a plurality of group participants and determining the contextual parameter based on the ranking. The method may further include adding additional group participants, ranking the additional group participants and the group participants, and determining the contextual parameter based on a change of the ranking.

In an embodiment, the method may further include taking action in the group communication session based on the contextual parameter by transmitting a request to the server adding group participants to the group communication session, and receiving resource allocation parameters to add group participants to the group communication session, or by taking action in the group communication session based on the contextual parameter by transmitting a request to the server to drop group participants from the group communication session, and receiving resource allocation parameters to drop group participants from the group communication session.

In another embodiment, the method may further include taking action in the group communication session based on the contextual parameter by transmitting a request to the server to form a sidebar communication session from at least two of group communication session participants, and receiving resource allocation parameters to form the sidebar communication session from at least two of group communication session participants.

In another embodiment, the method may also include taking action in the group communication session based on the contextual parameter by transmitting a request to the server to assign a specific dynamic point of control entity to the group communication session from a plurality of dynamic point of control entities, and receiving resource allocation parameters to assign the specific dynamic point of control entity to the group communication session, or by taking action in the group communication session based on the contextual parameter by transmitting a request to the server to grant an entity a floor from a plurality of group participants wherein the entity transmits content to the plurality of group participants, and receiving resource allocation parameters to grant the entity the floor from the plurality of group participants so the entity transmits content to the group participants.

In another embodiment, the method may include taking action in the group communication session based on the contextual parameter by transmitting a request to the server to transfer a dynamic point of control entity role to a second entity, and receiving resource allocation parameters to transfer the dynamic point of control entity role to the second entity. In another embodiment, the method may include transmitting a request to the server to remove a dynamic point of control entity role from the group communication session, and receiving resource allocation parameters to remove the dynamic point of control entity role from the group communication session, or transmitting a request to the server to store the contextual parameter to a memory, and receiving resource allocation parameters to store the contextual parameters to the memory.

In yet another embodiment, the dynamic point of control entity may control and assist with the communication session but may not have access to voice media and media exchanges. This may form privacy between the plurality of communication session participants.

In another embodiment, the method may include communicating a request to the server to communicate information parameters of at least one communication session participant to the dynamic point of control entity. The information parameters may include a communication participant's location information, sensor data associated with at least one communication participant's computing device, information relating to an entity under suspicion or disfavor, information indicating a prohibited member, and a membership status information of the communication session participant. The method may also include communicating resource allocation parameters to the communication session participants to deliver information parameters to the dynamic point of control entity.

In another embodiment, a method for conducting a communication session supported by a server comprises receiving a signal identifying the communication session being between a plurality of communication session participants and determining an identifying parameter dynamically of a computing device associated with at least one communication session participant of the plurality of communication session participants. The method may also include transmitting the identifying parameter from the computing device to the server and dynamically assigning a role from a plurality of different roles from the server based on the identifying parameter of the computing device, wherein the assignment of the role is dynamically selected from at least one of the communication session participants.

In another embodiment, server, comprises: memory; and a processor coupled to the memory, wherein the processor is configured with processor-executable instructions to perform operations comprising: establishing a group communication session between a first participant and a second participant; determining a contextual parameter of the group communication session; and taking action in the group communication session based on the contextual parameter.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
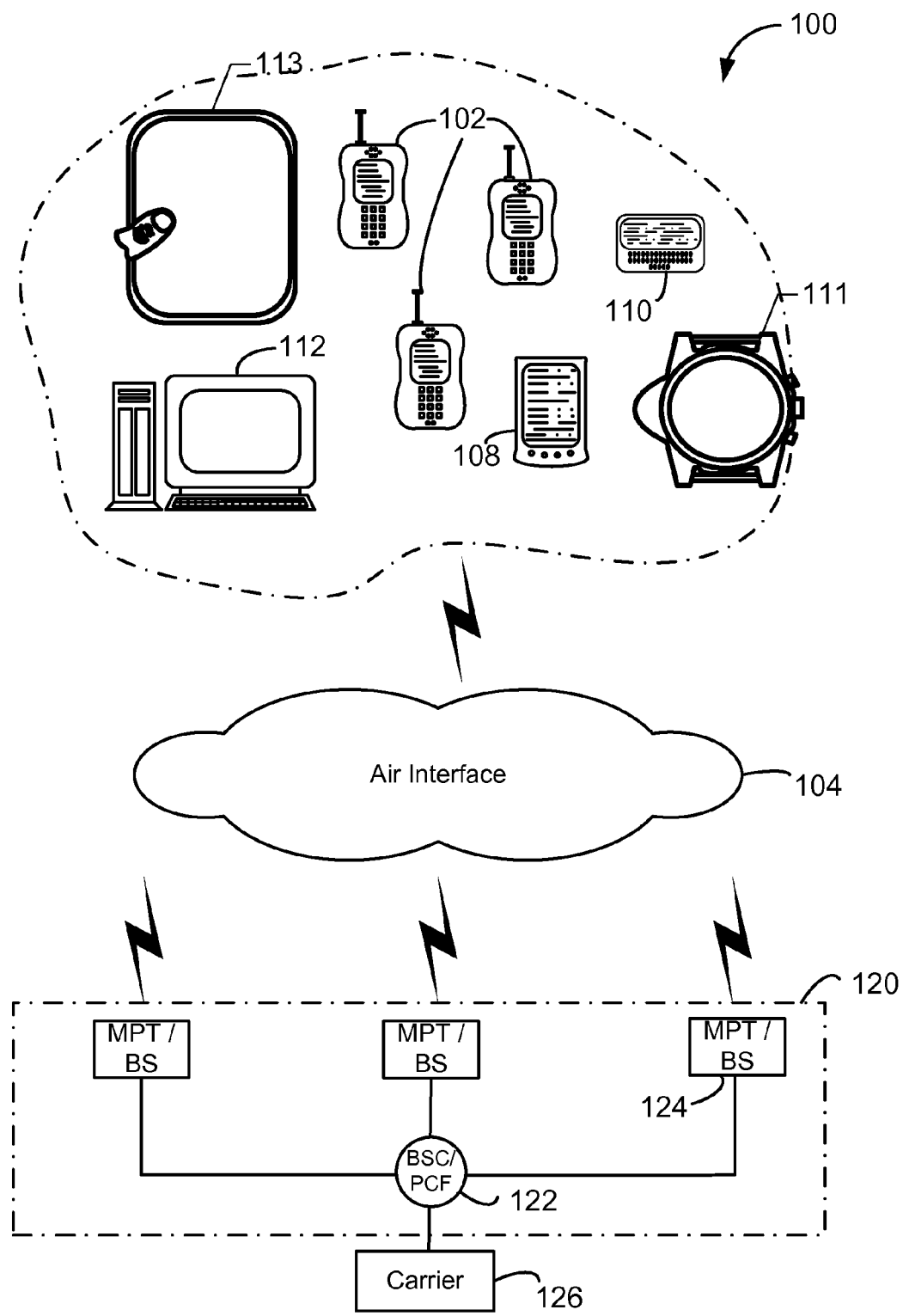
FIG. 1 is a diagram of a wireless network architecture that supports access terminals and access networks in accordance with at least one embodiment of the invention.

Embodiments of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage, or mode of operation.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC), and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices, including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various embodiments of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

FIG. 1 illustrates a block diagram of one exemplary embodiment of a wireless communication system 100 in accordance with at least one embodiment of the invention. The wireless communication system 100 may include a number of access terminals of various types, such as cellular telephones 102, smart phones 108, portable electronic mail devices 110, small wireless communication devices like wrist watch telephones 111, personal computers 112, and tablet computers 113 to name just a few. In general, access terminals may be may be any communication or computing device capable of supporting the communication session and implementing the various embodiments. In the various embodiments, the access terminals may communicate via an air interface 104 with an access network or radio access network (RAN) 120 that can connect the access terminals 102-113 to network equipment providing data connectivity between a packet switched data network (e.g., an intranet, the Internet, and/or carrier network 126) and the access terminals 102, 108, 110, 112. As shown here, the access terminal may be a cellular telephone 102, a personal digital assistant 108, a pager 110, which is shown here as a two-way text pager, or even a separate computer platform 112 that has a wireless communication portal. Access terminals may also include a wirelessly enabled tablet computer 113 and a wireless communication enabled watch phone 111. Embodiments of the invention may thus be realized on any form of access terminal including a wireless communication portal or having wireless communication capabilities, including without limitation, wireless modems, PCMCIA cards, personal computers, telephones, or any combination or subcombination thereof. Further, as used herein, the terms "access terminal," "wireless device," "client device," "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and may include any system that allows remote access terminals, such as native PTT client computing devices 102, 108, 110, 112 to communicate over-the-air between and among each other and/or between and among components connected via the air interface 104 and RAN 120, including, without limitation, carrier network 126, the Internet, and/or other remote servers. As used herein, a native PTT client may be a Push-To-Talk client that interfaces with the Application Server by mechanisms other than SIP.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 may be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 may broadcast data messages wirelessly to the access terminals, such as cellular telephone 102. The MPT/BS 124, BSC/PCF 122 and other components may form the RAN 120, as is known in the art. However, alternate configurations may also be used and the embodiments are not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
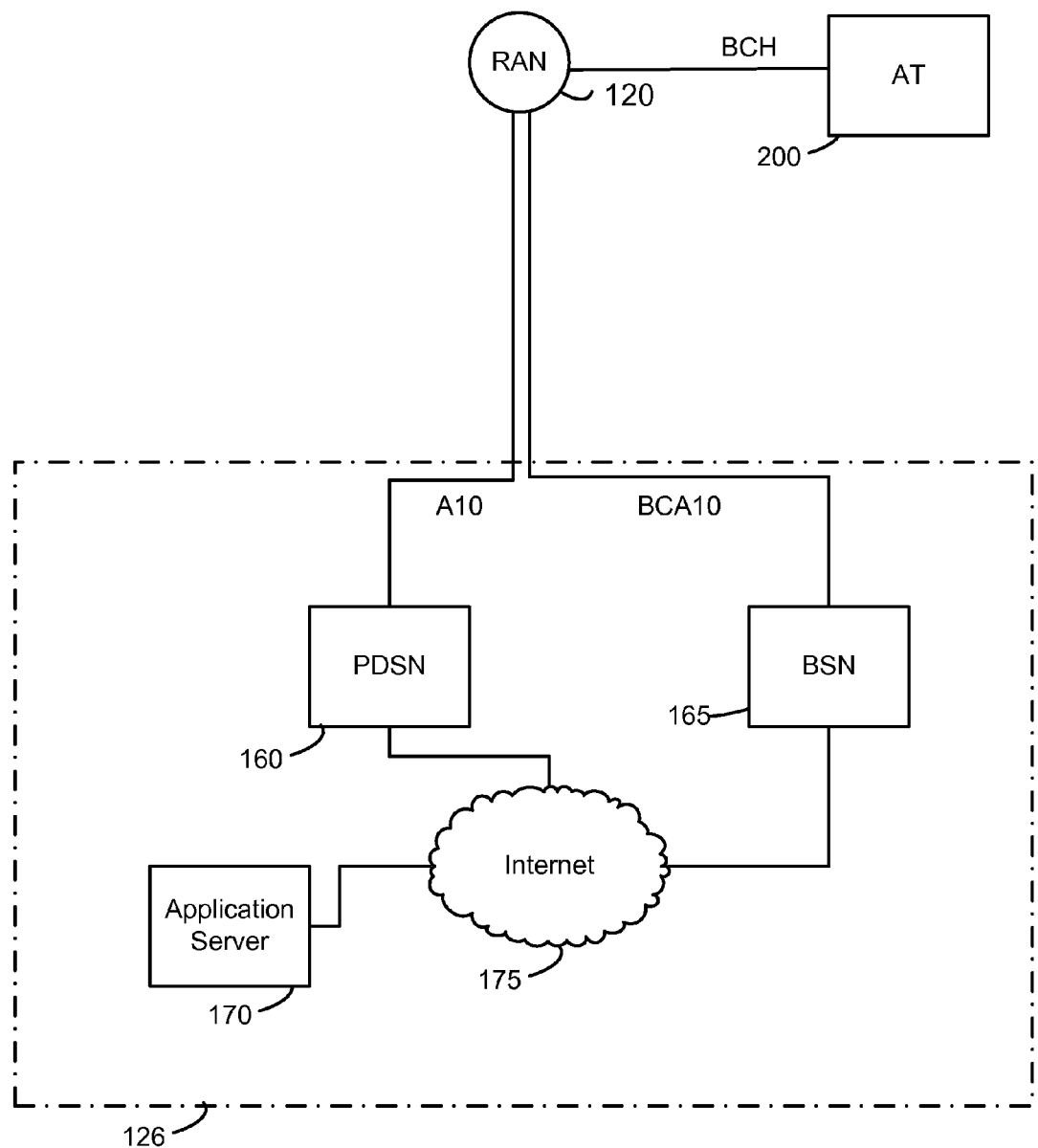
FIG. 2A illustrates the carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 may act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 may send unicast messaging to the PDSN 160 via the Internet 175, and may send multicast messaging to the BSN 165 via the Internet 175.

Figure 2B:
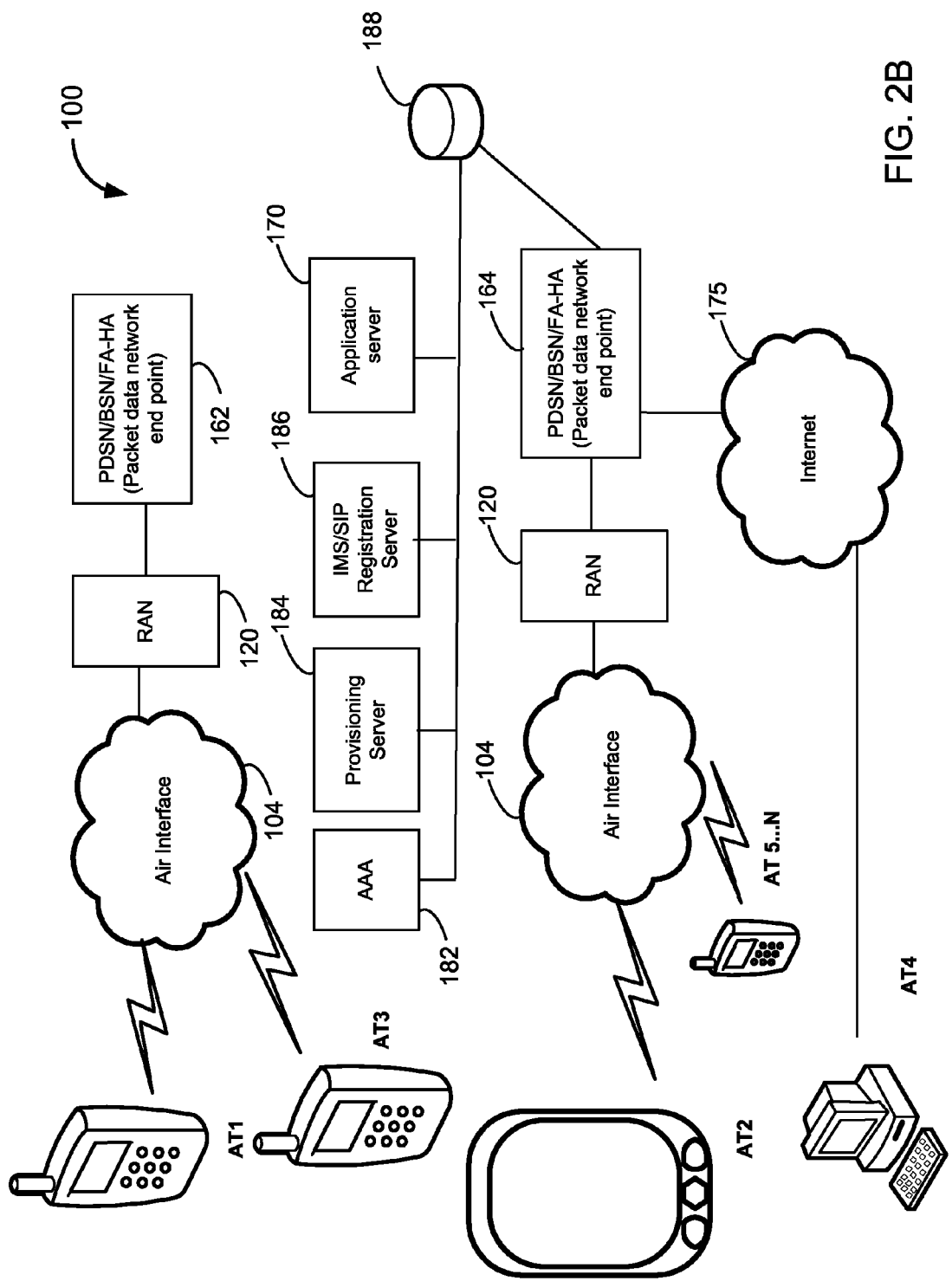
FIG. 2B illustrates an example of the wireless communication of FIG. 1 in more detail.

FIG. 2B illustrates an example of the wireless communication system 100 of FIG. 1 in more detail. In particular, referring to FIG. 2B, ATs 1 . . . N are shown as connecting to the RAN 120 at locations serviced by different packet data network end-points. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 . . . N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 may then connect to any of the system components described above.

Referring to FIG. 2B, ATs 1, 3 and 5 . . . N are illustrated as wireless cell-phones, AT 2 is illustrated as a wireless tablet-PC and AT 4 is illustrated as a wired desktop station. However, in other embodiments, it will be appreciated that the wireless communication system 100 may connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Figure 3:
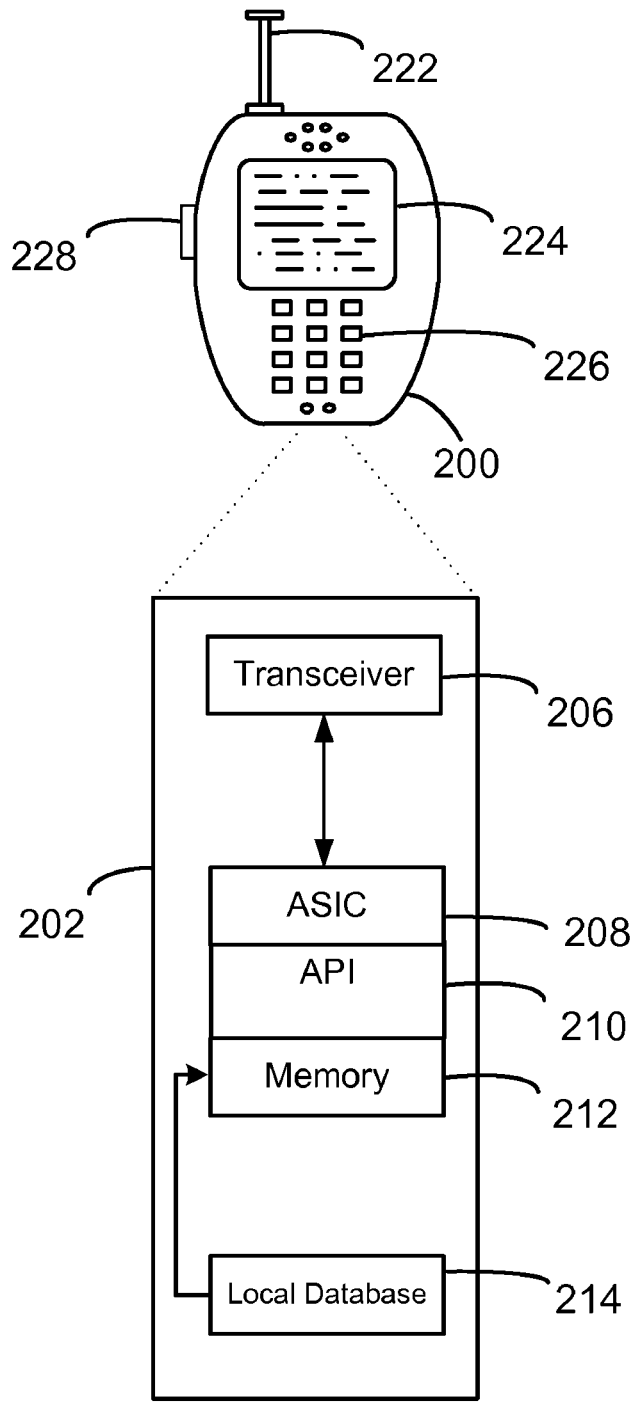
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 may include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 may be comprised of read-only or random-access memory (RAM and ROM), EEPROM, flash cards, or any memory common to computer platforms. The platform 202 also may include a local database 214 that may hold applications not actively used in memory 212. The local database 214 is typically a flash memory cell, but may be any secondary storage device as known in the art, such as magnetic media, EEPROM, optical media, tape, soft or hard disk, or the like. The internal platform 202 components may also be operably coupled to external devices such as antenna 222, display 224, push-to-talk button 228 and keypad 226 among other components, as is known in the art.

Accordingly, an embodiment of the invention may include an access terminal, including the ability to perform the functions described herein. As will be appreciated by those skilled in the art, the various logic elements may be embodied in discrete elements, software modules executed on a processor or any combination of software and hardware to achieve the functionality disclosed herein. For example, ASIC 208, memory 212, API 210 and local database 214 may all be used cooperatively to load, store, and execute the various functions disclosed herein and thus, the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 may be based on different technologies, such as code division multiple access (CDMA), WCDMA, time division multiple access (TDMA), frequency division multiple access (FDMA), orthogonal frequency division multiple access (OFDMA), the Global System for Mobile Communications (GSM), or other protocols that may be used in a wireless communications network or a data communications network. The data communication is typically between the client device 102, MPT/BS 124, and BSC/PCF 122. The BSC/PCF 122 may be connected to multiple data networks, such as the carrier network 126, PSTN, the Internet, a virtual private network, and the like, thus allowing the access terminal 102 access to a broader communication network. As discussed in the foregoing and known in the art, voice transmission and/or data may be transmitted to the access terminals from the RAN using a variety of networks and configurations. Accordingly, the illustrations provided herein are not intended to limit the embodiments of the invention and are merely to aid in the description of embodiments of the invention.

Figure 4:
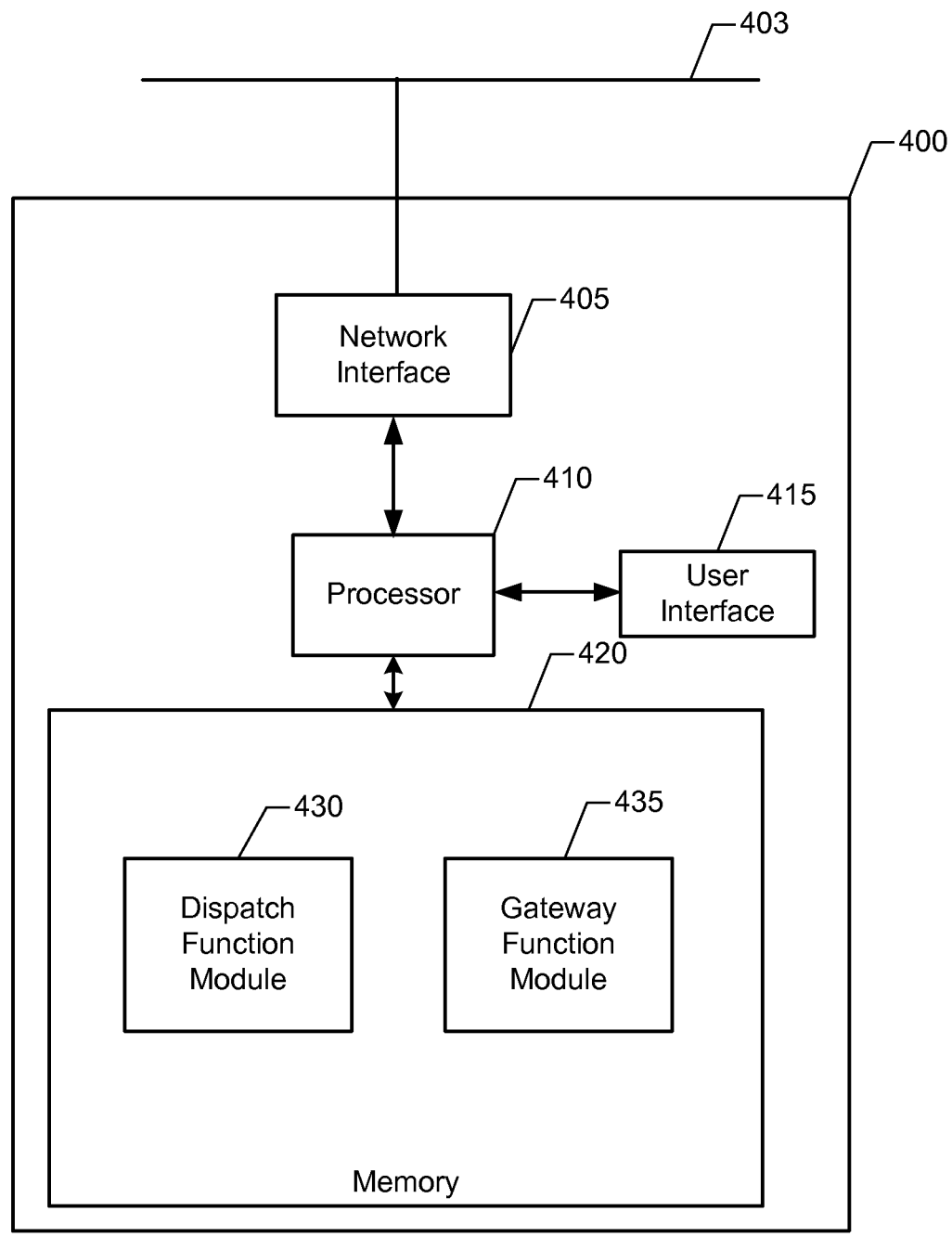
FIG. 4 is a block diagram illustrating an exemplary embodiment of an application server.

FIG. 4 is a block diagram illustrating one exemplary embodiment of an application server 400. The application server 400 may be a separate device which may be present on a server-side LAN 430, wherein it functionality is discussed above. For the sake of simplicity, the various features and functions illustrated in the block diagram of FIG. 4 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 4 may be further subdivided or two or more of the features or functions illustrated in FIG. 4 may be combined.

The application server 400 may include a network interface 405 that may be wired and/or wireless for communicating over the server side LAN. A processor 410 may be connected to the network interface 405, a user interface 415 and memory 420. The processor 410 may include one or more microprocessors, microcontrollers, and/or digital signal processors that provide processing functions, as well as other calculation and control functionality. The processor 410 accesses memory 420 for reading/writing data and/or software instructions for executing programmed functionality. The memory 420 may be on-board the processor 410 (e.g., within the same IC package), and/or the memory may be external memory to the processor and functionally coupled over a data bus.

A number of software modules and/or data tables may reside in memory 420 and be utilized by the processor 410 for resource and session management functionality, including functionality describe above. As illustrated here, within memory 420, the application server 400 may further include or otherwise provide a Dispatch Function Module 430 and/or a Gateway Function Module. While the software modules 430, 435 are illustrated in the example as being contained in memory 420, it should be recognized that in certain implementations such procedures may be provided for or otherwise operatively arranged using other or additional mechanisms. For example, all or part of software modules 430, 435 may be provided in firmware. Additionally, while in FIG. 4 the software modules 430, 435 are shown as a single distinct entity for ease of description, it should be understood that it may include a plurality of modules that are not illustrated, or otherwise be further partitioned into a differing groups of procedures.

Figure 5:
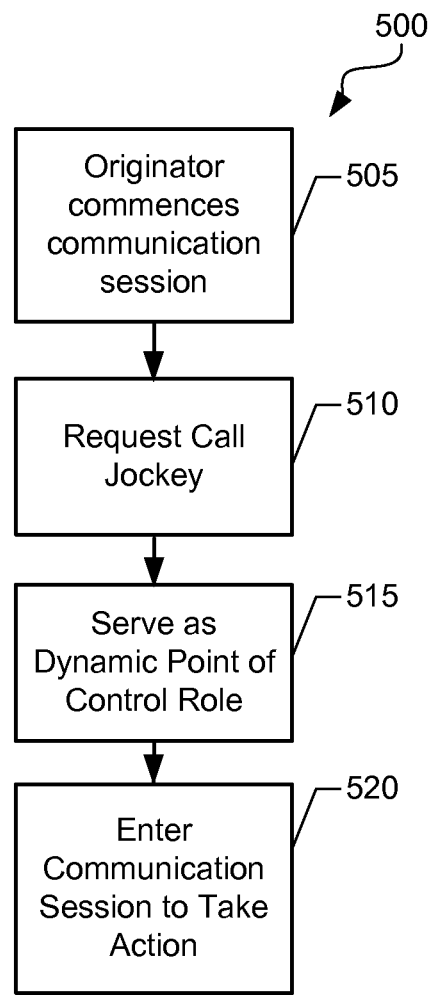
FIG. 5 is a process flow diagram of an embodiment method of forming a communication session and requesting a call jockey to serve as a dynamic point of control in the communication session.

FIG. 5 illustrates an embodiment method 500 for adding a context aware call jockey to a group communication session. In one non-limiting embodiment, the context aware call jockey may be added to a group communication session that may be a Push to Talk or Push to Experience ("PTX") communication session. The context aware call jockey (sometimes referred to herein simply as the "call jockey") is a dynamic point of control entity within the communication session. The dynamic point of control entity may be an entity or an automated virtual device that provides access to information regarding the conduct and participants of the call session, and that has control authority over the communication session. Method 500 may be implemented in a computing device having a processor configured with processor-executable instructions to perform the operations of the method. For example, the method 500 may be implemented in a communication device like a smart phone.

The context aware call jockey may be analogous, in one non-limiting embodiment, to a mission control/command center that can provide control over a communication session in order to focus the communication session on one or more topics or to focus a group of participants. However, the context aware call jockey is not limited to the mission controller/command center role and encompasses more functionality. The communication system and the group communication session may be configured so that the context aware call jockey has a role in the group communication session that has certain authority or that provides certain benefits and advantages.

For example, the communication system and the group communication session may be configured so that the context aware call jockey may be a dynamic point of focus for the group communication session, which is chosen dynamically, based on the predefined rules, context, trigger, or sensor data. For example, the context aware call jockey may be dynamically added to a group communication session and dynamically removed from a communication session. For example, the context aware call jockey may also include a role that can be transferred from between at least two participants in a group communication session along with a contextual parameter of the group communication session. In another embodiment, the communication system and the group communication session may be configured so that the dynamic point of control role may assume at least two roles in the group communication session. For example, in one embodiment, the role may be a point of control role, or may be a point of assistance role for other group participants. This is quite different from a dispatch console, which is static and cannot be dynamically added from a number of group communication participants and changed as needed.

In another embodiment, the communication system and the group communication session may be configured so that the dynamic point of control entity has a "one to many" association between the dynamic point of control entity and the multiple entities that make up the group communication session. In other words, the dynamic point of control entity may service multiple group communication session participants. For example, the dynamic point of control entity may serve as a supervisory role for multiple group communication session participants, and in another embodiment, may also serve a supervisory role for larger sets of multiple groups. In another embodiment, the dynamic point of control entity may formulate private sidebar communication sessions between the dynamic point of control entity and one or more group communication session participants. For example, the content of the private sidebar communication sessions may only be available to the selected participants and not be available to other group communication session participants. For example, multiple dynamic point of control entities may be envisioned. Each dynamic point of control entity may have a private group communication session that they may access. The session may be available to the dynamic point of control entity communication session participants and not available to other group communication participants.

In another embodiment, the communication system and the group communication session may be configured so that the dynamic point of control entity may maintain the privacy of a group communication session but may continue to monitor the group communication session through other means. For example, the dynamic point of control entity may not receive media or content of the group communication session but may monitor data parameters in such a way to keep the content private between the group communication session participants. In an embodiment, the dynamic point of control entity's access terminal may receive a signal to join the group communication session and then the dynamic point of control entity may receive the content (e.g., voice content) of the group communication session and thus breaking the private nature of the group communication session. In one embodiment, the dynamic point of control entity may form one role in the group communication session and there may be another group communication participant that forms a second role. For example, the second role may also be an information gathering entity or a lower level supervisor and may exert control over portions of the group communication session. The second role may have a different functionality than the first dynamic point of control role, and may be an information gathering entity. In another embodiment, one entity may encompass multiple roles. The dynamic point of control entity role may be dynamically assigned by a server, which determines an identifying parameter of a computing device and delivers resource allocation parameters to the access terminal so the computing device may exert dynamic control of a communication session.

In another embodiment, the communication system and the group communication session may be configured so that the dynamic point of control entity may be selected based on a context of a group communication session. For example, contextual parameters of the group communication session may be determined by a number of methods including sensor outputs, messages, by participants or by other means. Based on the context of the call, the communication system may be configured so that a specific dynamic point of control entity can be selected from a number of different entities. The dynamic point of control entity may accept an appointment and may enter the group communication session. The dynamic point of control entity may also receive data from a sensor located on at least one group participant access terminal and may supervise the group communication session or may provide assistance to the participants. At a conclusion of a group communication session, the context may be stored in a memory, such as on an access terminal or a server. The context may be transferred to another entity and a second dynamic point of control entity may be selected to participate in the group communication session.

In another embodiment, the communication system may be configured so that the communication session may be established and a contextual parameter of the communication session may be determined, and based on the contextual parameter of the communication session, one or more actions may be taken. For example, the group communication session context may include a summary of what the group communication session is about along with relevant text/picture/media materials.

For example, the communication system may be configured so that a contextual parameter of the group communication session may be determined by receiving an output of a sensor and comparing the output to rules to determine the contextual parameter. For example, a particular user's access terminal may include a sensor configured to sense conditions that may indicate an emergency condition and output a signal. Based on the emergency condition, one or more different parameters of the group communication session may be determined.

For example, a specific access terminal assigned the roll of a dynamic point of control entity (call jockey) and a number of participants may be selected, or invited to participate in a communication session. A first participant may have the floor whereby the first participant may communicate to many different other group communication session participants and relay instructions relevant to the emergency. An expert may be invited to the communication session and may also be joined. Additionally, a ranking of members may be made. If a higher ranking participant joins the group communication session, the higher ranking participant may assume control as the dynamic point of control entity. In an embodiment, the context of the communication session may be determined by a message received from a group participant, or may be determined from an output from a computing device, or may be determined by comparing detected parameters of the communication session with a set of rules stored in an engine.

The communication system may be configured so that, when required, a "context relevant" dynamic point of control entity may be selected by the system that may best do the tasks needed based one or more parameters. The dynamic point of control entity may be presented with a group communication session context via a message before accepting participation in the group communication session. The dynamic point of control entity may or may not participate in a "media part" of the session but will receive context updates. For example, context information may be received even if the dynamic point of control entity did not accept to participate. The dynamic point of control entity may be available for context specific tasks related to the session and may ensure privacy of the group communication session. Depending on the context, the dynamic point of control entity may be operating as an assistant, or may an exert authority for the rest of the group. The dynamic point of control entity may permit tasks, and a list of allowed tasks may vary. The dynamic point of control entity may transfer responsibility by authorized users or by communication a signal. A group communication service like Qchat PTT/Yagatta® may serve the group communication needs in enterprise environments where the group communication is required for some specific business needs (e.g. construction/security/field engineering etc.).

For example, the processor of the method 500 may establish a group communication session in block 505. This communication session may be between a first participant and a second participant. The commencement may identify the participants to the call. It also may provide a message (similar to a blind carbon copy address functionality in an email) that requests a mission controller/command center entity or a dynamic point of control entity (call jockey). For example, in block 505, the processor of the computing device associated with an originator may commence a communication session. The originator may be any entity that commences a communication session between participants. The originator may be one participant in the communication session, or any entity that includes an access terminal. The originator may commence a group communication session. In a non-limiting embodiment, the group communication session may be a PTT or PTX communication session, however, the claims are not limited to a PTT or PTX communication session. In another embodiment, the group communication session may be any other group communication session. For example, if the group communication session is a PTT, or a PTX group communication, the communication may commence by a user pushing a push to talk button (or touchscreen icon) on an access terminal, smart phone, or otherwise providing an input to a computing device in the communication network. To initiate a call, a user may press in a PTT button and receive an immediate indication of whether the call recipient is available. If the call recipient is available, the caller may begin speaking immediately. If the recipient is unavailable, the caller will simply hear a negative response tone, instead of a busy signal or voicemail.

In a non-limiting embodiment, the group communication session may be a QChat® PTT session, or a Yagatta® social network communication session but is not limited to any specific protocol. By way of example only, QChat is operable on 3G wireless devices that can connect to each other worldwide, in either private or group calls, with the push of a button. QChat uses Voice over Internet Protocol (VoIP) technologies to allow subscribers to communicate by using a PTT button on the handset instead of making a standard cellular call. QChat calls are created by combining separate point-to-point connections between each IP endpoint, and the PTT session is managed by the QChat Applications Server, which is deployed on an IP-based Wide Area Network (WAN).

A communication session may be commenced that links an originator's access terminal to another participant's access terminal via a group communication session protocols. In a non-limiting embodiment, the communication session may link via PTT or PTX communication session protocols or any other communication protocol. The access terminal may initiate a session request, and a server may allocate resources and transmit an announcement to a second participant's access terminal. The second participant's access terminal may transmit a confirmation message indicating successful connection to the communication session. Once the communication session is established, media may be exchanged from the originator and the participant.

In block 510, the processor associated with the originator's computing device may request a call jockey be added to the session by providing an input on an access terminal or speaking a voice command. In an embodiment, the session request to commence the group communication session may also transmit a request for a dynamic point of control entity. For example, speech may be monitored by a server or participating computing device for voice commands spoken in the communication session. When a certain phrase is detected, the detecting computing device may send a message to a server monitoring or supporting the VoIP session to request participation by a dynamic point of control entity or call jockey. This request may be sent from the originator access terminal to the server. The request may be a part of the session request or may be a part of a second request. The request may be delivered to a server and may specify an individual of the group call session to assume the dynamic point of control role. The dynamic point of control entity can be any entity (or automated entity) with an access terminal or a console suitable to exert control over the communication session.

In block 515, the processor associated with the computing device of the dynamic point of control entity may accept an appointment as the dynamic point of control entity via a message to the server. The server, in response, may transmit resource allocation parameters to the dynamic point of control entity which enable it to take control of and assume authority over a communication session.

In block 520, the dynamic point of control entity may enter the communication session and may take any of a variety of actions. The dynamic point of control entity may monitor the communication session, but may not originally receive the media, so the communication session may have aspects that are private. In an embodiment, the dynamic point of control entity may display for a user a summary of the communications taking place (e.g., IDs of the user talking and the IDs of all participants in the session), but not enable the user to hear the conversations taking place. The dynamic point of control entity may serve an authoritative mission controller/command center role, but is not limited to this role.

The dynamic point of control entity (call jockey) may serve as any assistant role, or supervisory role for a group communication session. In a non-limiting embodiment, the dynamic point of control entity may serve an authoritative mission controller/command center role for a PTT, PTX, QChat or Yagatta group communication session or any other group communication session. The dynamic point of control entity (call jockey) may perform a number of supervisory, informational, assistance or supporting tasks. For example, the dynamic point of control entity may mute some participants. This may be to give an authorized participant full control over the session. As another example, the dynamic point of control entity may drop some participants from the communication session. In another example, the dynamic point of control entity may function as a service to the participants. The call jockey may send each participant files (e.g., media, text, video, graphics files) or content that will support their activities. Additionally, the dynamic point of control entity may receive information from the communication devices of each participant in a call session, such as location reports and sensor data.

In another embodiment, the dynamic point of control entity may receive context information of a group communication session. For example, the dynamic point of control entity may receive a group voice conversation, a talking individual on the group voice conversation's identification information, a member's profile details, a member's preemption rank, a member's location profile, or a member's cumulative talk time. In another embodiment, the dynamic point of control entity may receive a member's flags and status (indicating whether the member is authorized or prohibited from participation in activities), a member's access terminal information, a member's sensor data outputs (e.g., temperature data, radiation data, pressure data, gyroscopic data) and/or data relating to a side bar conversation.

In an embodiment, the dynamic point of control entity may receive an output of a sensor 733 (FIG. 7A) and provide supervisory instructions to a group communication session participant based on the output of the sensor 733. For example, if a participant travels into a dangerous area, the dynamic point of control entity may be able to determine this fact from GPS position reports from the user's communication device. The dynamic point of control entity may enter the communication session to receive additional data or lend support. Such support may include communicating directions to the participant to guide the participant away from the dangerous area and into a safe area. As another example, the dynamic point of control entity or call jockey may provide an alarm, or otherwise alert an operator when a call participant is performing a problematic task. The dynamic point of control entity may also monitor sensor outputs and provide appropriate assistance to the call participants by providing information, such as by providing data, or professional assistance as required in real time.

The dynamic point of control entity may be replaced by others as befits the circumstances. For example, a second computing device within the call session may transmit a message to replace the first dynamic point of control entity based on an event. Examples of the kinds of events which may prompt replacement of the dynamic point of control include an emergency for which a second call jockey is more suited, when one or more of the communication session participants have moved into an area under the control or supervision of the second dynamic point of control entity as discussed below. The second computing device may be configured with program instructions to issue a command to the server supporting the indications session which causes the server to switch the dynamic point of control entity role to the second computing device.

Figure 6:
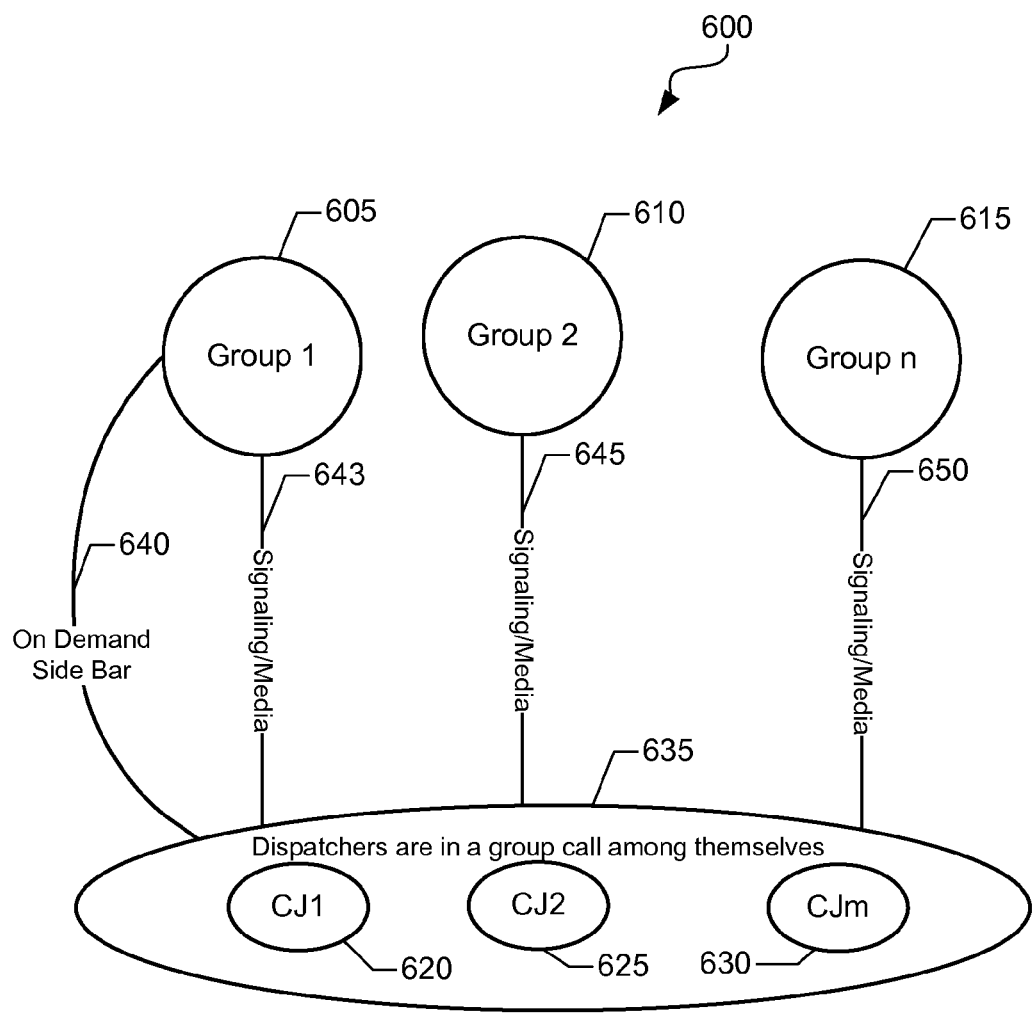
FIG. 6 is a high level schematic diagram of an enterprise communication scheme having a number of communication groups and a dispatch group with the dispatch group, including a number of dynamic points of control entities for interacting with the communication groups.

In an embodiment, the dynamic point of control entity may form a sidebar or private conversation with one or more participants within the communication session. FIG. 6 shows a sidebar communication between a dynamic point of control entity (call jockey or "CJ") and a first group of participants as message 640.

FIG. 6 illustrates an embodiment method 600 of a messaging among a number of groups that are engaging in group communication sessions. FIG. 6 illustrates a high level system diagram shown illustrating a number of groups 605, 610 and 615 of participants. Each group includes multiple participants. Each participant in the groups 605, 610 and 615 includes an access terminal. Each participant is an entity that may be utilizing a group communication enabled access terminal, or may be communicating via a different communication protocol. In one non-limiting embodiment, the participant may utilize a PTT or PTX group communication enabled access terminal.

In another embodiment, the dynamic point of control entity may include call controls. For example, the dynamic point of control entity may add a member to the group communication session, may delete a member, or may mute a participant. In another example, the dynamic point of control entity may further restart a call, may continue a call even though the call was originated by a different entity that is no longer present or may merge two different groups of callers. For example, the dynamic point of control entity may also split a group communication session into two or more communication groups, or may initiate a one to one side bar communication session with a member, or may initiate a one to one side bar communication session with a non-member.

For example, a first through third participants within a first group 605 in a communication session 605 may be involved in a group communication session 605 that is monitored by a dynamic point of control entity 620 by signal 643. The dynamic point of control entity may send a message inviting the second participant to form a second sidebar communication session 640. Alternatively, the second participant can send a message requesting a sidebar communication session 640 to the dynamic point of that control entity 620. Through the sidebar communication 940, the second participant and the dynamic point of control entity 620 may communicate, or deliver messages privately such that the first participant and third participant may not receive the private sidebar messages. The sidebar communication with one of the participants is not audible to any of the other participants in the communication session.

A group of dynamic control entities 620, 625 and 630 are also shown in a dispatch group 635. Each dynamic point of control entity 620, 625 and 630 utilizes an access terminal, computing device, or a console to take control of the communications sessions as described above. Control messages 620, 625 and 630 may be transmitted between the dispatcher group 635 and the groups of call participants 605, 610, 615 enabling the dynamic control entities 620, 625 and 630 to monitor and occasionally control the communication sessions.

Figure 7A:
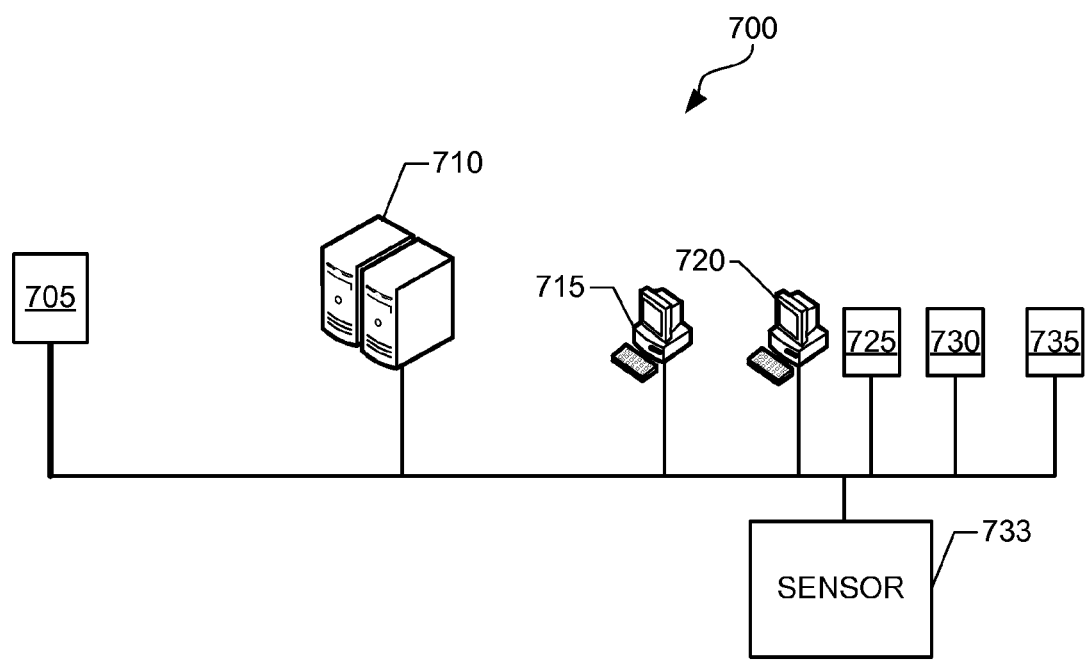
FIG. 7A is a high level schematic diagram of an enterprise communication scheme for a group communication session having first and second dynamic point of control consoles, a server, and a number of access terminals.

FIG. 7A illustrates an example computer network architecture 700 for forming a collaborative communication session according to an embodiment. In this example, the network 700 includes a first originator access terminal 705 and a group of participant access terminals 725, 730 and 735. The originator and participant access terminals 705, 725, 730 and 735 may be any communication or computing device capable of supporting the communication session and implementing the various embodiments, including the various types of access terminals described above with reference to FIG. 1. In order to convey that access terminals may be any of a variety of different types of communication and computing devices, FIG. 7A and subsequent figures show them as numbered blocks 705, 725, 730 and 735. The group of participants 725-735 may each use an access terminal (e.g., a smart phone) to access the communication session, and may communicate through their access terminal during the communication session. The network 700 further includes a server 710 supporting the communication session that is operatively connected to a first dynamic point of control entity computer console 715 and to a second dynamic point of control entity computer console 720. Server 710 provides services to many the various users of the communication network 700, and may include a fast network connection and high input/output (I/O) throughput to maintain a group communication session. The server 710 also transmits resource allocation parameters to the one or more of the access terminals 705, 725, 730, 735 so the access terminal 705, 725, 730, 735 can assume the role of the dynamic point of control entity and exert supervisory control over the communication session. The server 710 may receive control messages from the dynamic point of control entity and may deliver resource allocation parameters to allow the dynamic point of control entity to exert control over a number of access terminals engaged in a communication session. Additionally, the server 710 may receive control messages and broadcast data to the access terminals in a simultaneous fashion. The server 710 may also receive sensor outputs and may communicate the sensor outputs in a controlled fashion to the intended recipients. The server 710 may also receive a control message from and may communicate resource allocation parameters to the dynamic point of control entity.

In the example illustrated in FIG. 7A, the network 700 includes a first console 715 configured as a dynamic point of control which may be manned by a person serving as a call jockey. In another embodiment, the dynamic point of control may be automated and configured to respond to voice command or inputs from the respective access terminals 705, 725, 730, and 735. In an embodiment, the dynamic point of control entity may be a software application that communicates control instructions in response to commands. The call originator is shown utilizing an access terminal 705 that is a cell phone (e.g., a smart phone), but the originator may use any of a variety of computing devices. For example, an access terminal 705 may be a LINUX® based or GOOGLE® ANDROID® based smart phone. The server 710 can be any computer device that communicates data between the originator 705 and the first and second control entities or call jockeys and communication session participants, and is configured to provide the communication session services.

A first dynamic control entity participant operating from a first computer console 715 may take control of the communication session. The console 715 may include an input device with a text entry and display device for system administration messages. The first computer console 715 may include a keyboard and a screen, and a computing device connected to a network, such as a cellular data network. In an embodiment, the first console 715 may be operable to link to access terminals through the server 710 to take control of a communication session. In another embodiment, the first console 715 may be a console system and may include one or more console ports that are attached to multiplexers or network-connected multiport serial servers which enable an operator to connect a terminal to any of the attached servers. A communication session may include the exchange of media, text, video, or any other media exchange in the art. Instead of a group communication session, the session may be a social network application for sharing data, such as, for example, QChat, or Yagatta® as an alternative. In another non-limiting embodiment, the dynamic point of control entity 715 may operate with an access terminal 725.

Figure 7B:
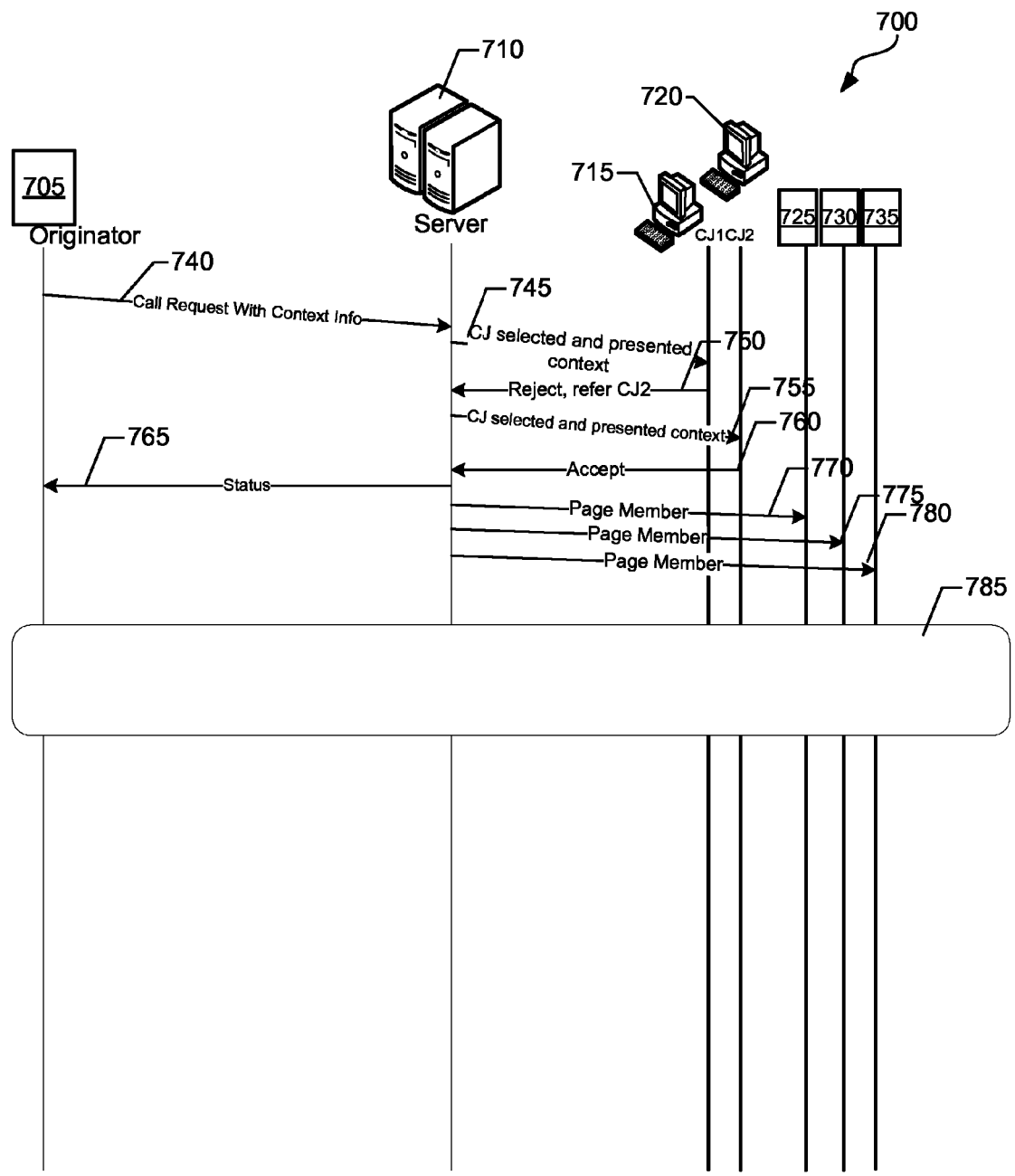
FIG. 7B is a message flow diagram of an originator, a server, a first and second dynamic point of control entity and a number of access terminals for originating a group communication session with a dynamic point of control entity.

Examples of message flows within the communication network shown in FIG. 7A are illustrated in FIG. 7B. An originator 705 may transmit or generate a call request 740 with a context information data to the server 710. The call request message 740 may also send additional information, such as a nominated dynamic point of control entity 715 for the communication session. The nominated dynamic point of control entity 715 may accept or reject the nomination, and may send a corresponding message 750 to the server 710 informing it of its decision. In the example illustrated in FIG. 7B, the first dynamic point of control entity 715 may reject the appointment by sending a rejection message 750.

In response, the server 710 may send a second nomination message 755 to a second candidate dynamic point of control entity 720 requesting it to perform the supervisory role or the information gathering role of the call jockey. In the illustrated example, the second dynamic point of control entity 720 accepts the appointment to be the dynamic point of control entity 720, and sends a confirmation message 760 to the server 710. The server 710 may page session participants via messages 770, 775, and 780 to alert the participants to join the communication session. The communication session may then commence and the floor may be granted to the originator entity 705. As used herein, "floor" refers to the session control which enables a participant to speak while other participants can only listen. The floor may assigned during an initial communication session during which the originator 705, or a different entity utilizing a computing device or smart phone, may send introductory data to each of the communication session participants.

During a call session, conversations may be exchanged among the participants and a variety of different types of media may be delivered to some or all of the participants. In some configurations, media may not be delivered to the dynamic point of control entity 720 (the call jockey or "CJ"). The second dynamic point of control entity 720 may only receive a subset of data for monitoring and may not receive other communication session data, for example, voice communication, video, etc. In another embodiment, any participant of the group communication session can become a dynamic point of control entity. For example, a group communication participant may request permission to take control of the group communication session as the dynamic point of control entity and another originator or participant may accept the request.

Figure 7C:
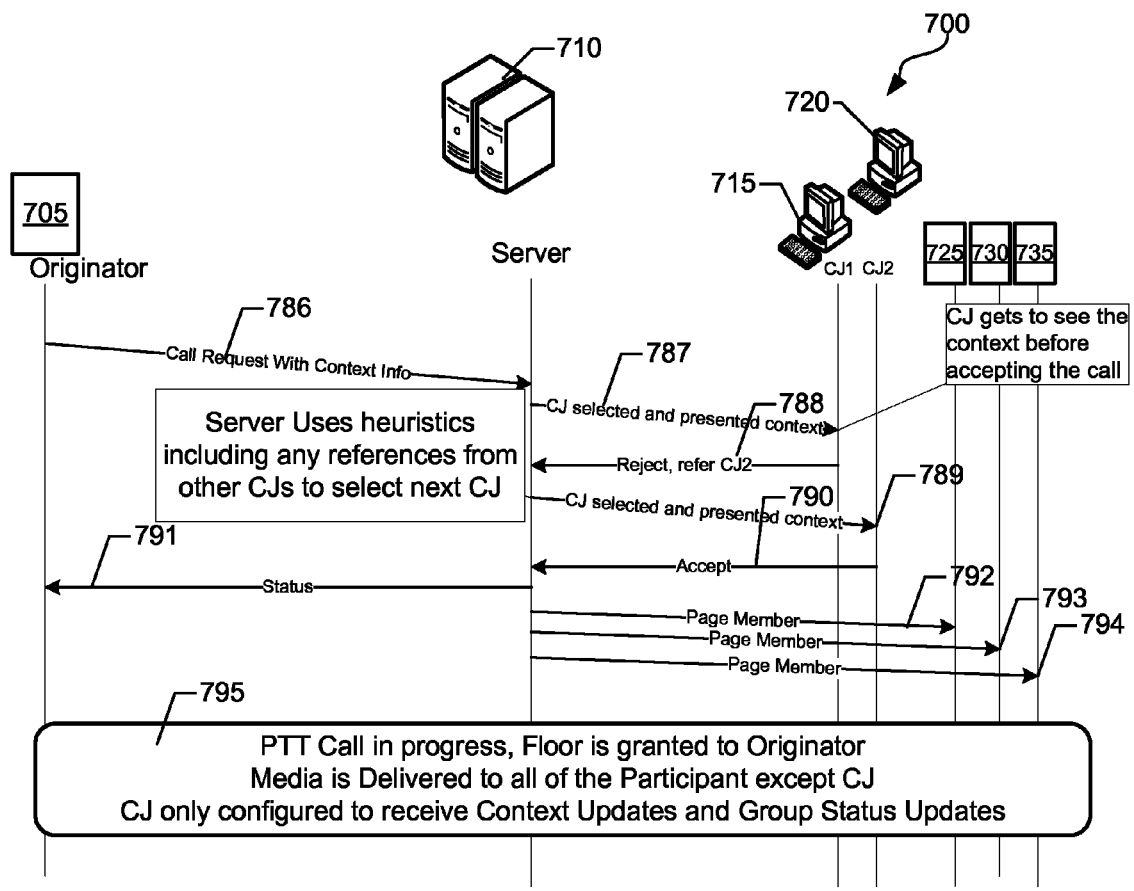
FIG. 7C is a message flow diagram of an originator, a server, a first and second dynamic point of control entity and a number of access terminals for originating a group communication session according to a different embodiment.

Examples of embodiment message flows within the communication network are shown in FIG. 7C which illustrates that any of the participants of the group communication session may become the dynamic point of control entity (call jockey) and may assume the role by transmitting a request. An originator may transmit a call request message 786 to the server 710. Message 786 may include context information data. A call request message 787 may also send additional information, such as a nominated dynamic point of control entity 715 for the communication session including additional context information and be transmitted from the server 710. The nominated dynamic point of control entity 715 may review the context information and may determine that the entity 715 is not the best suited for this role in the current context. The entity 715 may accept or reject the nomination, and may send a corresponding message 788 to the server 710 informing the server 710 of its decision to reject the appointment. The first dynamic point of control entity 715 may reject the appointment by sending a rejection message 788 that also may provide a recommendation that another entity may serve as the call jockey.

In response, the server 710 may send a second nomination message 789 to a second candidate or the dynamic point of control entity 720. Message 789 requests the second dynamic point of control entity 720 perform the supervisory role or the information gathering role of the call jockey. Message 789 may also include the context information.

In the illustrated example, the second dynamic point of control entity 720 accepts the appointment to be the dynamic point of control entity, and sends a confirmation message 790 to the server 710. The server 710 may page session participants via messages 792, 793 and 794 to alert the participants to join the communication session. The communication session 795 may commence and the floor may be granted to the originator entity 705.

During a call session, conversations may be exchanged among the participants and a variety of different types of media may be delivered to some or all of the participants. In some configurations, media may not be delivered to the dynamic point of control entity 715 (the call jockey or "CJ"). The second dynamic point of control entity 720 may only receive a subset of data for monitoring and may not receive other communication session data, for example, voice communication, video, etc. and which is private. Any participant in the group communication session of the embodiment illustrated in FIG. 7B may deliver a request to assume the control of the call jockey role by delivering a message to the server 710, which can be accepted by the second dynamic point of control entity 720.

Figure 7D:
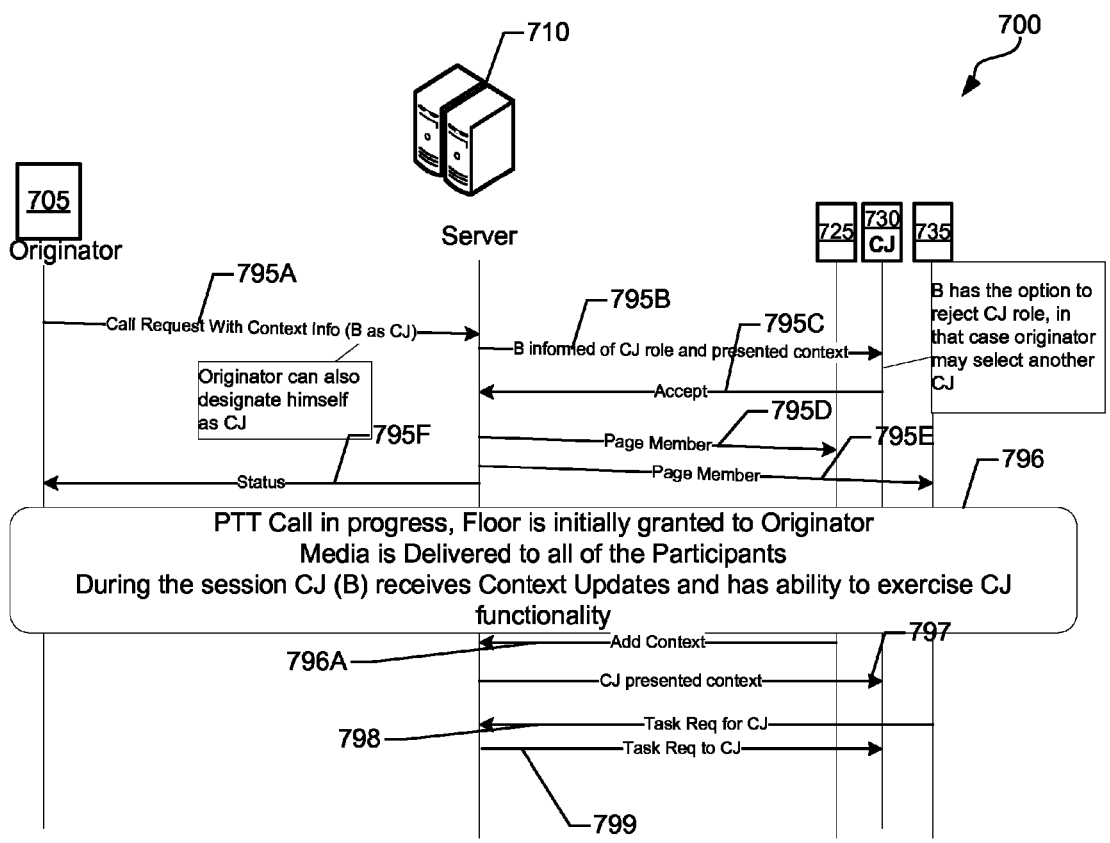
FIG. 7D is a message flow diagram of an originator, a server, a first and second dynamic point of control entity, and a number of access terminals for originating a group communication session with a designated dynamic point of control entity according to a different embodiment.

Examples of another embodiment of message flows within the communication network are shown in FIG. 7D, which illustrates that a group communication session can be originated with a designated call jockey on a request shown as a second mobile phone participant 730. An originator 705 may transmit a call request 795A with context information data to the server 710. The call request message 795A may also send additional information, such as a nominated dynamic point of control entity for the communication session. In this instance, the nominated call participant 730 is requested to assume the role of the call jockey via message 795B from the server 710. The nominated group communication session participant 730 may accept or reject the nomination, and may send a corresponding message 795C to the server 710 informing of a decision to accept the role. In yet another embodiment, an originator 705 may also provide control instructions to a server 710 to self-designate himself/ herself (the originator 705) as a dynamic point of control entity (call jockey).

The server 710 may page session participants via messages 795D, 795E to alert the participants to join the communication session. A status message 795F may also be sent from the server 710 to the originator 705. The communication session 796 may then commence and the floor may be granted to the originator entity 705 and media may be delivered to participants. The dynamic call jockey 730 may receive context updates and have an ability to exercise call jockey functionality to supervise the communication session or assist participants.

During a call session, conversations may be exchanged among the participants and a variety of different types of media may be delivered to some or all of the participants. In some configurations, media may not be delivered to the dynamic point of control entity 730. The call jockey 730 may keep the media private and may only receive a subset of data for monitoring. The call jockey 730 may not receive other communication session data, for example, voice communication, video, etc. A first participant 725 may transmit a context message 796A, which is delivered to the server 710. The call jockey 730 may receive the context message in message 797.

The third participant 735 may formulate a task request message 798 and transmit the task request message 798 to the server 710. The server 710 may transmit the task request message 798 to the call jockey 730 via message 799, where the call jockey 730 may perform the task or obtain another individual to obtain the requested task information. For example, the task message may be a request for sensor data. The call jockey 730 may readily obtain the sensor data and transmit the data to the participant 730.

Figure 8:
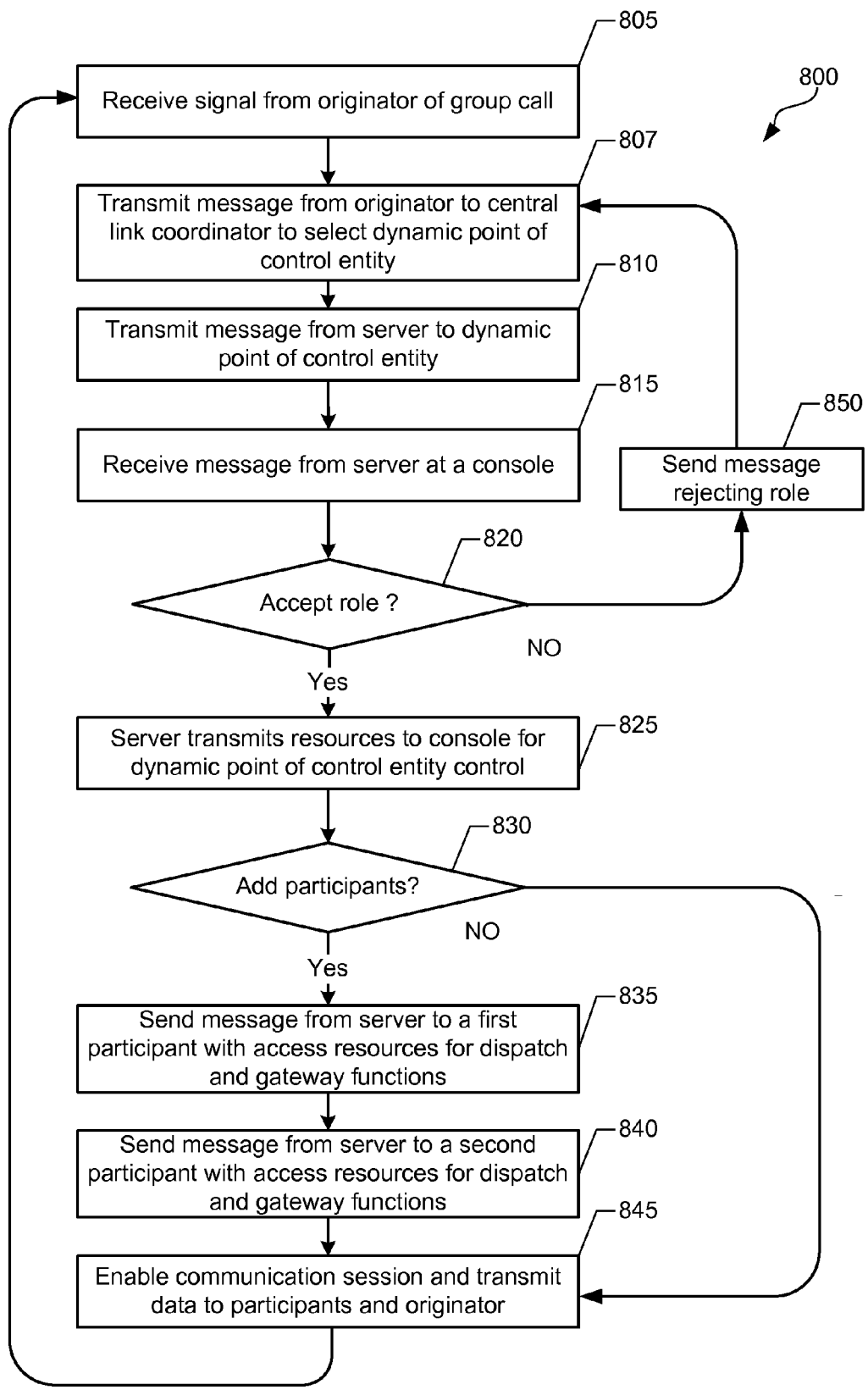
FIG. 8 is a process flow diagram of an embodiment method of a group communication session in which a request is made for a context aware dynamic point of control entity to enter into the group communication session.

FIG. 8 illustrates an embodiment method 800 for appointment of a dynamic point of control entity for a group communication session. Method 800 may be implemented in a communication system including a server and a plurality of computing devices each having a processor configured with processor executable instructions to perform the operations of the method. In method 800, a computing device associated with an originator of a communication session may receive a user input to commence a group communication session in block 805. In response, the computing device may generate and transmit a message to the server 710 to initiate the communication session and select a dynamic point of control entity 720 in block 807.

In response, the server 710 may transmit a message to a nominated dynamic point of control entity's access terminal or console 720 in block 810. In block 815, the nomination message may be received at the console 720, where the nomination to serve as the dynamic point of control may be accepted or declined in determination block 820. The decision to accept the role as the dynamic point of control may be made by a user or automatically based upon information known to the receiving console 720. If the user or the console 720 declines to serve as the dynamic point of control, (i.e., determination block 820="No") a message may be transmitted to the server 710 rejecting the role in block 850. In that case, the originator may select a different entity or, based on an algorithm, the server 710 may select a new dynamic control entity, and the server may repeat the operations of block 807 by transmitting a nomination message to the newly selected dynamic control entity.

If the user or the console 720 agrees to serve as the dynamic point of control (i.e., determination block 820="Yes"), that entity may send a message to the server 710 confirming acceptance of the appointment, in response to which the server 710 may transmit resource allocation information to the console 720 for controlling the session in block 825. In determination block 830, the server 710 may respond to commands from the originator or another participant to add participants to the group communication session. If the server 710 receives an input to add participants (i.e., determination block 830="Yes"), a message may be sent from the server 710 to a first participant 725 in block 835, and to a second participant in block 840. These messages may include access resource parameters that the participant communication devices require in order to perform dispatch and gateway functions. Many participants may be added to the communication group. In block 845, the communication session may be enabled and data transmitted to the participants and the originator. If no further participants are to be added (i.e., determination block 830="No"), the server 710 may enable the communication session with the currently connected participants, although additional participants may be added to the session at a later time.

Figure 9:
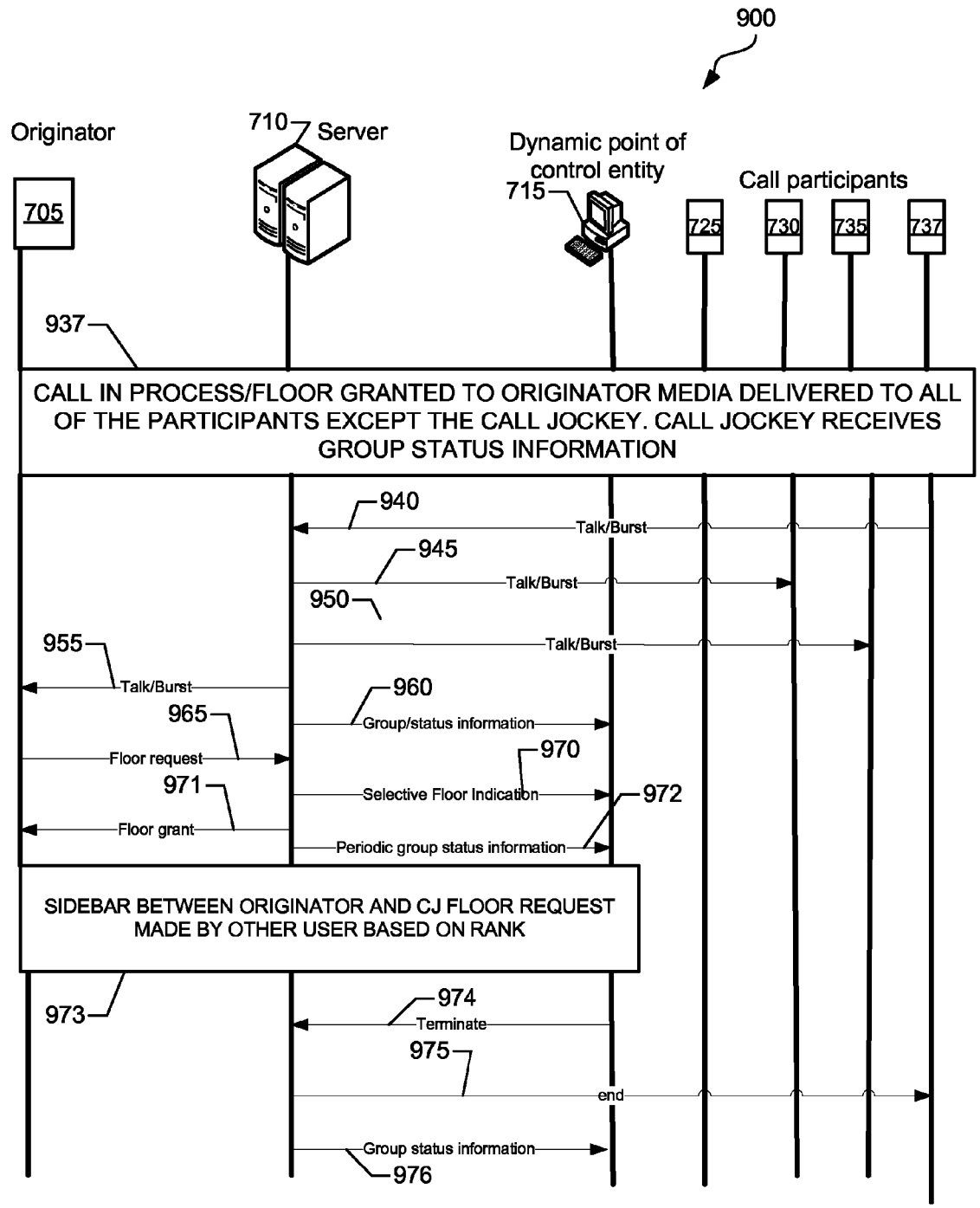
FIG. 9 illustrates a message flow diagram of an originator, a server, a first and second dynamic point of control entity and a number of access terminals for originating a group communication session with a dynamic point of control entity, and also forming a sidebar communication session between a subset of the participants of a communication session.

FIG. 9 illustrates message flows that may occur during origination of a group call with a dynamic point of control entity 715. FIG. 9 illustrates that messages may be exchanged while transmitting a selective floor grant request to the originator 705 and forming a sidebar conversation between the originator 705 and a first dynamic point of control entity 715. In the example illustrated in FIG. 9, a group communication session call is already in progress, generally shown by message block 937. In the illustrated group communication session 937, the originator 705 has the floor. In this manner, each of the other participants is muted in favor of the originator 705. This gives the originator 705 the opportunity to transmit to each of the participants without interruption. In an embodiment, voice and/or media may be sent to all of the participants. In the illustrated implementation, the first dynamic point of control entity 715 does not receive media, but monitors the group communication session call via one or more status messages.

Server 710 may send media via talk burst messages 955 and 940-950 to the originator 705 and group participants 725-735. The server 710 may also transmit a status update message 960 to the dynamic point of control entity 715. The status update message 960 includes data regarding the group communication session 937 sufficient for the dynamic point of control entity 715 to control the group communication session 937.

The originator 705 may transmit a message 965 indicating a selective floor request to the server 710. The floor request message 965 may be communicated from the server 710 to the dynamic point of control entity 715. The dynamic point of control entity 715 may reject the floor request or may grant the floor request via a message 971.

Status updates may also be sent via a second status update message 972 indicating status of the participants and the group communication session 937. Upon the dynamic point of control entity 715 granting the floor request, a second private sidebar group communication session 973 may be formulated between the dynamic point of control entity 715 and the originator 705. Other entities may not receive data associated with the second private sidebar group communication session 973. However, in an embodiment, other entities may receive data when invited to do so upon a control command from the first dynamic point of control entity 715. For example, the call jockey 715 or the other participant(s) 705 in the private sidebar group communication session 973 may deliver an invitation signal to the server 710 to invite another individual to participate.

The dynamic point of control entity 715 may terminate participants from a group communication session so they no longer receive data. For example, the dynamic point of control entity 715 may deliver a termination message 974 to the server 710 to end a particular group participant's participation or to stop the participant from exchanging media in the session 973.

In this example, the participant using an access terminal 730 is removed from the communication session. To accomplish this, the server 710 may deliver a group termination signal from the server 710 to the access terminal 735 to end the group communication session for the respective access terminal 735. Termination may be accomplished for one participant, but the remaining participants 720, 725, and 730 may remain on the group communication session. A third group status update message 976 may be delivered from the server 710 to the dynamic point of control entity 715 for monitoring purposes.

Figure 10:
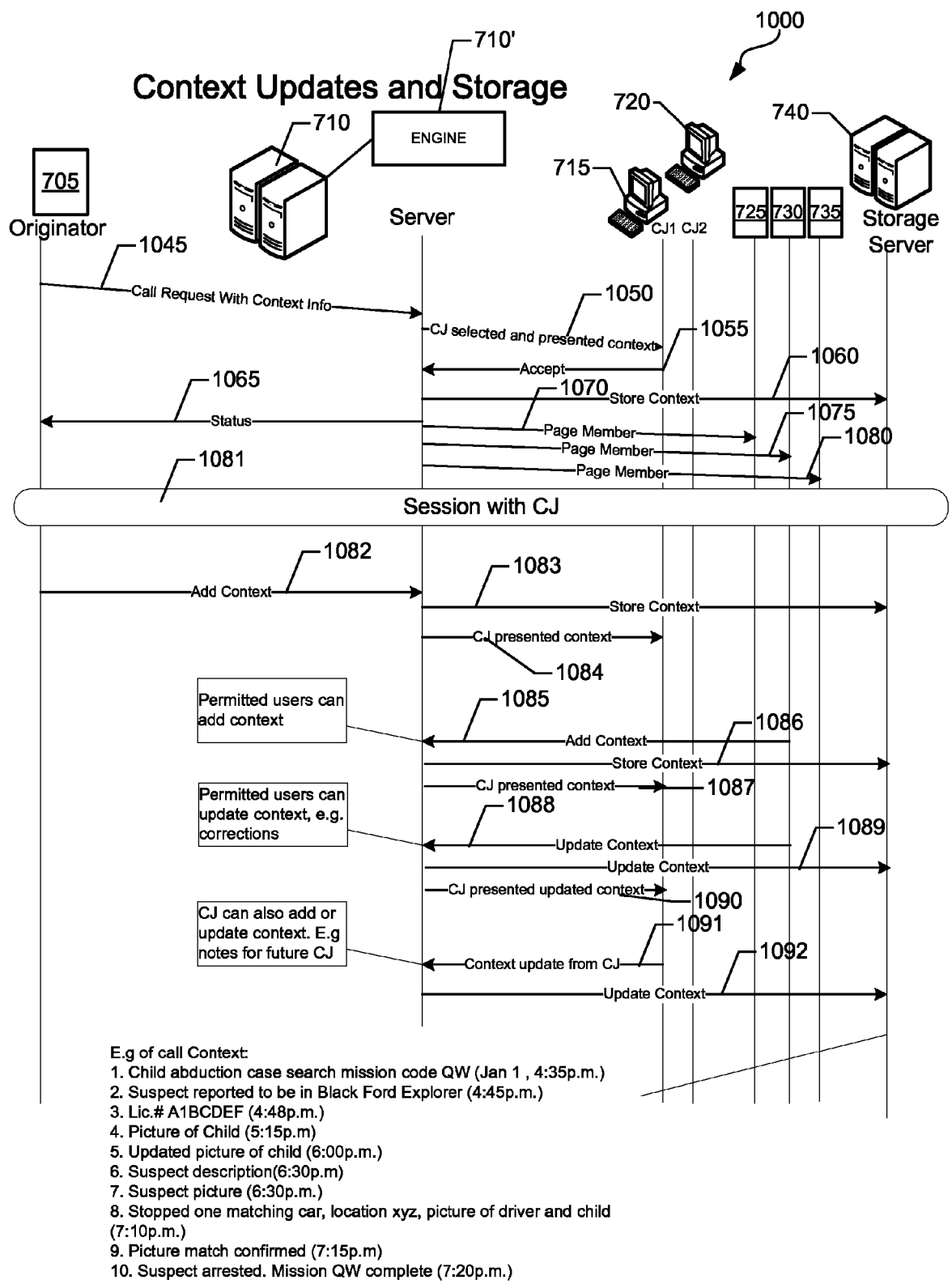
FIG. 10 illustrates a message flow diagram of an originator, a server, a first and second dynamic point of control entity, a storage server, and a number of access terminals for originating a group communication session with a dynamic point of control entity, and also transmitting and receiving context updates to one or more group participants of the communication session.

FIG. 10 illustrates a message flow diagram 1000 according to an embodiment for providing context media based updates for a group participation call. The originator using an access terminal 705 may deliver a call request message 1045 to the server 710 to form a call request. The message 1045 may include context information. The originator 705 may deliver a message to the server 710 and the server 710 may also deliver a request for a dynamic point of control entity in message 1050.

Context information may include relevant data that is needed or desired by participants or may include various media, including pictures, sensor data, video, text, or any other media known in the art. Generally, the media may be distributed to one or more participants and may include topical media that may assist the communication session with achievement of an objective.

The dynamic point of control entity 715 may receive an appointment message 1050, and may accept the appointment via message 1055. The context media may be stored on the storage medium 740 via communication message 1060. The server 710 may send a page request to invite participants 725, 730, and 735 to join the communication session 1081 via page messages 1070, 1075, and 1080.

The various embodiments may enable a group communication session 1081 in which the originator 705 has a floor, or functionality in which the originator 705 may transmit to each of the participants in a centralized and focused manner. Media may be delivered to all of the participants 725, 730, 735. The first dynamic point of control entity 715 may not receive media but instead may monitor the group communication session call via one or more status messages. The originator 705 may communicate context messages 1082 to the server 710, and the server 710 may store the context message on the storage medium 740 in message 1083. The context messages 1082 may be communicated from the originator 705 to the server 710 and to the dynamic point of control entity 715 for approval via a message 1084.

For example, the dynamic point of control entity 715 may further include context related controls that may be asserted over one or more participants. For example, the dynamic point of control entity 715 may mute or provide an alert to participants that have excessive background noise and that pose a distraction, or may take requests from group session participants based on a preemption ranking of the group session participants. In another embodiment, the dynamic point of control entity 715 may provide an alert to a participant that a participant's talk time has exceeded an overuse threshold, or may alert a participant that a certain geographical fence location has been crossed, or may alert a participant that sensor data from an access terminal is relevant and has triggered as predetermined condition. In response to the context of the communication session or of a particular participant (or changes in context), the call jockey 715 may also perform call controls including adding, deleting, muting participants, restarting a call, continuing a call originated elsewhere, merging calls, splitting calls, and forming a sidebar communication with members or new entities. The call jockey 715 may also review information including a group voice conversation, access terminal identification, member profile details, member location information, member preemption ranking data, cumulative talk time, sensor data, flags and side bar data.

Permitted users may add context elements and upload the context elements to the server 710. The context messages 1085 may be added to the group communication session 1081 via messages 1085, which are stored on a storage server 740 via message 1086. The context elements may be presented to the dynamic point of control entity console 715 for approval and use via message 1087.

A second call participant 730 may add further updated context elements and upload the context elements 1088 to the server 710. The context messages 1088 may be added to the group communication session 1081 via messages 1089, which are stored on the storage server 740. The presented context elements may be presented to the dynamic point of control entity 715 via message 1090 for approval.

The first point of control entity 715 may add further updated context elements and upload the context elements 1091 to the server 710. The context messages 1091 may be added to the group communication session via messages 1092, which are stored on the storage server 740. In an embodiment, each of the individuals on the communication session 1081 may access the context updates via the storage server 740. In another embodiment, the first dynamic point of control entity 715 may provide task requests to participants and receive task responses. For example, the first dynamic point of control entity 715 may transmit an information lookup task and a request to the information lookup task may be received in response. For example, the first dynamic point of control entity 715 may transmit text instructions and the participants may carry out the instructions and provide an indication when a task is completed. For example, the first dynamic point of control entity 715 may provide a short emergency code like "S.O.S" and the participants may acknowledge and then take action. For example, the first dynamic point of control entity 715 may provide to some or all participants sensor data received from system and/or participant access devices, which may be acknowledged by participants. For example, the sensor data may be arranged into a message with a header and then transmitted, which may then be received by a participant.

For example, in a call context illustrated in FIG. 10, a child abduction case search mission code may be delivered at 4:35 p.m. in a first context message. Given this context certain individuals may be invited as group communication session participants. A predetermined entity may be requested to be a call jockey 715 versed in experience in child abduction cases. Additional experts may also be invited to participate in the group communication session as participants. Additionally, participants who are not well versed in this type of specialized case may be dropped and/or muted. Further, certain individuals who can provide specialized knowledge or instructions may be granted the floor. Further, sensor devices may be employed to transmit sensor readings to the server 710.

In the illustrated example case, a second message for updating context information reports that a suspect may be in a black FORD® EXPLORER® truck at 4:45 p.m. In a third context message, a license plate may be delivered in a message at 4:48 p.m. For example, based on this message additional group session participants may be invited/dropped/muted or granted the floor. A photograph of an abducted child may be delivered in an additional fourth context message at 5:15 p.m. In a fifth context message, an updated picture of an abducted child may be delivered at 6 p.m. In a sixth context message, a suspect description may be delivered at 6:30 p.m. In a seventh context message, a suspect's photograph may be delivered at 6:30 p.m.

In an eighth context message, a message indicating that a suspect has been stopped in a matching car in a specific location with a photograph of a driver and a child may be delivered at 7:10 p.m. A ninth context message may be transmitted that indicates that a picture match of the suspect and the child are confirmed. A tenth context message may indicate that the suspect has been arrested. Each of the context messages may be communicated to the server 710 and may be compared to various context-base decision criteria or rules in a decision engine 710'. The decision engine 710' may store one or more rules for correlating contextual update messages to appropriate communication session configurations, suitable responses, or actions. The one or more rules may match allocated resource parameters. Assigned actions, updated resource allocations, and other context-relevant information may be transmitted from the server 710 to a group session participant who may perform an action based on the context messages.

For example, an access terminal may transmit a request to the server 710 to assign the dynamic point of control entity 715 access to information regarding the conduct and participants of the group communication session. The request may also assign the dynamic point of control entity control authority over the group communication session. Thereafter, the server 710 may deliver resource allocation parameters to the dynamic point of control entity 715 to grant the dynamic point of control entity 715 access to information regarding the conduct and participants of the group communication session and to assign the dynamic point of control entity 715 control authority over the group communication session. Additionally, the server 710 may determine a contextual parameter of the group communication session by receiving an output of a sensor that is located on an access terminal or that is a separate sensing device. In another embodiment, the server 710 may determine a contextual parameter of the group communication session by receiving a message from a group participant indicating the contextual parameter, or by receiving an output from a computing device or by the server 710 providing an output indicating the context. In a further embodiment, the context may be provided when a predetermined group participant has crossed a predetermined "geo-fence," or a specific geographic location. For example, when a group participant enters an area reported by a GPS device to a server 710, the server 710 may compare the area longitude and latitude to a predetermined number of context rules. The rules may include locations where help or assistance or instruction may be needed and other locations where no help, assistance or instructions are needed. When the compared location indicates that assistance is needed, the server 710 may output resource allocation parameters indicating that the call jockey 715 should assist the call participant.

In another embodiment, a group communication session participant may indicate that an emergency has occurred. This emergency indication may come from a message, a sensor output, a server 710, a computing device, may be read or obtained from a news story, or via a social media application. The emergency indication may be received by the server 710. In response the server 710 may immediately deliver relevant resource allocation parameters for one or more group communication session participants.

In another embodiment, a group communication session participant may enter the group communication session which may trigger a contextual change to a group communication session. For example, a high ranking member may enter the group communication session. Such ranking may be determined by comparing the new participant's identification received from an access terminal to a table stored in memory which correlates participant rank to participant identification. Thus, group session participants may be monitored and compared to a listing stored in a storage medium to determine if the group session participants are individuals that require immediate or priority consideration. The indication that an expert, a supervisor, a decision maker, or a celebrity is attending the session may be received by the server 710. In another embodiment, the indication may signal that an entity joining the group communication session is an individual that requires immediate assistance. In response the server 710 may immediately deliver relevant resource allocation parameters for one or more group communication session participants.

In this embodiment, some participants may be ranked, such as officers of a company, while others may be of a common or lower rank, such as support personnel. In a military application, individuals may be ranked based on their mission roles and/or their military rank. The server 710 may rank group participants and determine one or more contextual parameters based on the ranking or social structure. For example, in a sport's session a coach may be ranked higher than a third string player. Thereafter, additional group participants can be added to the group communication session. The server 710 may then rank the additional group participants and the original group participants and determine the contextual parameter based on a change of the ranking.

In another embodiment, the server 710 may determine a contextual parameter of the group communication session by receiving a signal which is transmitted in response to a condition indicating that a priority level of a group communication session has changed. This priority change may be from an emergency that is detected, or may be from a message that a participant requires assistance. A priority change may also be determined by virtue of the fact that a high ranking participant has joined the group communication session.

In another embodiment, based on the context, the server 710 may add specific group participants to the group communication session. For example, a military officer with the rank of a general may join the group communication session. Typically, a general may have a number of staff and lower level commanders reporting to him. So when the server 710 detects that a general has joined by receiving an indication parameter from the access terminal, the server 710 may refer to a table stored in memory to identify other parties who also need to be added based on the general's attendance in the group communication session. For example, the server 710 may deliver resource allocation parameters to add one or the general's staff to the group communication session and may drop other existing participants, or may mute existing participants and give the general the floor. Giving the general floor allows him or her communicate with all of the group participants while the remaining participants are placed on mute.

In another embodiment, the server 710 may form a sidebar communication session between the access terminal of one group communication session participant and a second participant based on the detected context. For example, the server 710 may automatically form a sidebar communication session with a second general.

In yet another embodiment, based on the detected context of the group communication session, the server 710 may select a predetermined dynamic point of control entity 715 from a number of suited call jockeys 720. For example, by a predetermined access terminal joining the group communication session, a request may be transmitted to the server 710 to assign a specific dynamic point of control entity 720 to the group communication session from a number of different dynamic point of control entities 715, 720 not present. In response the server 710 may transmit resource allocation parameters to assign the specific dynamic point of control entity 720 to the group communication session in an automatic manner. In another embodiment, based on the context of the communication session, the dynamic point of control role may additionally be transferred to a different entity based on the context. In a further embodiment, based on the context of the communication session, the call jockey role may additionally be removed from the group communication session based on the context of the session.

In yet another embodiment, based on the context of the group communication session some information may be private or public. For example, a sensor output may be received in response to which a request may be transmitted to the server 710 to indicate that content in the group communication session is to become private to at least some group communication session participants. The server 710 may also transmit resource allocation parameters to indicate that content in the group communication session is to become private. Likewise, based on a sensor output, a request may be transmitted to the server 710 to indicate that content in the group communication session is to become public and shared with at least some group communication session participants. The server 710 may transmit resource allocation parameters to indicate that content in the group communication session is to become public and shared with at least some group communication session participants.

Figure 11:
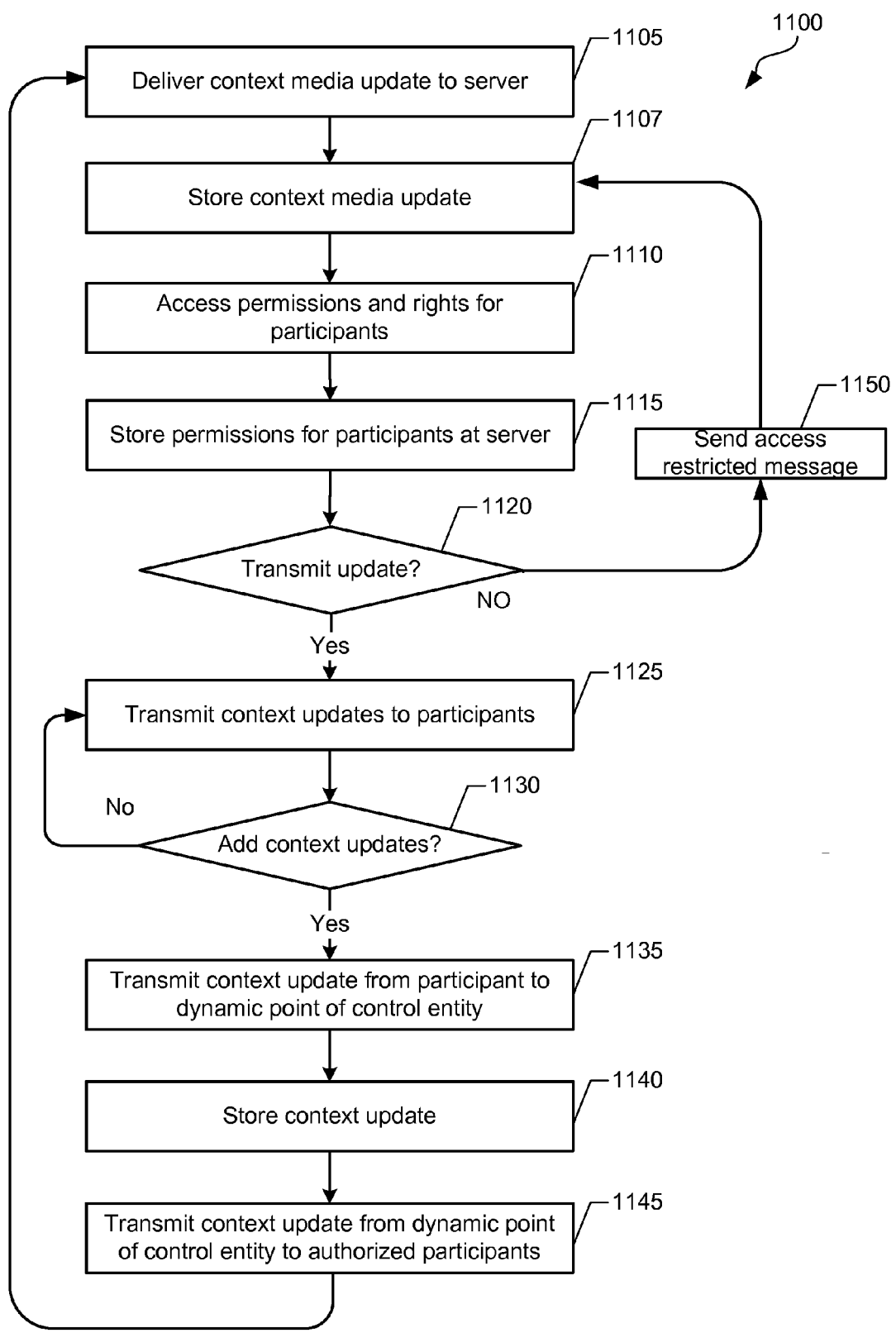
FIG. 11 is a process flow diagram of an embodiment method of a group communication session having a dynamic point of control entity that may receive and that deliver context updates to group participants in the group communication session.

FIG. 11 illustrates an embodiment method 1100 for delivering and storing context media updates to a server for a number of group participants, where the context updates may be delivered to group participants once authorized for distribution by the dynamic point of control entity. Method 1100 may be implemented in a communication system including a server and a plurality of computing devices each having a processor configured with processor-executable instructions to perform the operations of the method.

In an embodiment, a participant may form a context update for a group communication session. The context update may be an important piece of information that may assist a group communication session or communication information of relevance to a subset of the participants. The processor of the participant's access terminal may transmit a message including the update to the server 710 in block 1105. The context update may be stored on a storage server 740 in block 1107.

The permission and rights for participants may be accessed in block 1110. Some participants may be restricted in terms of the media they can receiver or contribute to the communication session, and some may receive or transmit updates depending on their ranking or priority. In block 1115, the permissions for each participant may be stored at the server 710 for the group participants.

In determination block 1120, the processor may compare the permissions for the group participants and the particular context update, and a determine whether to transmit the context update to particular participants. If the update should not be delivered to participants (i.e., determination block 1120="No"), an access restriction message may be transmitted in block 1150 and no context update may be sent. If the server 710 determines that the update should be delivered to the communication session participants (i.e., determination block 1120="Yes"), the server 710 may deliver the context update in block 1125, in which case context updates are delivered to the group of participants.

In determination block 1130, the server 710 may determine whether to add new context updates for transmission. If additional context updates are to be delivered (i.e., determination block 1130="Yes"), the server 710 may transmit context updates from the participant to the dynamic point of control entity in block 1135. The context update may be stored in block 1140 and the context update may be transmitted to the participants from the dynamic point of control entity to participants in block 1145. Once the previous context updates are delivered, if there are no additional context updates to supplement or add to the existing updates (i.e., determination block 1130="No"), the dynamic point of control entity may cease transmitting updates and return to block 1125.

Figure 12:
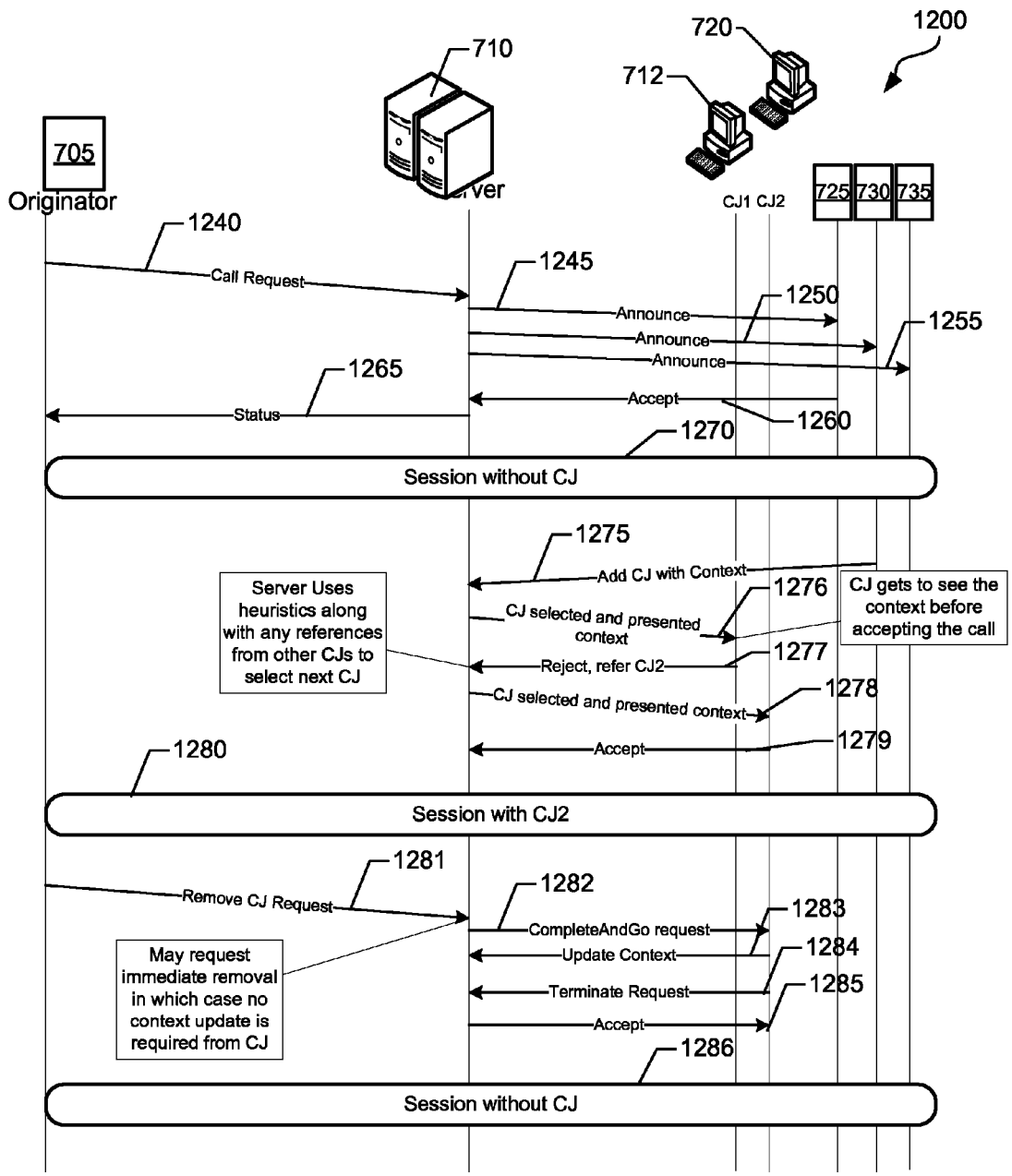
FIG. 12 illustrates a message flow diagram of an originator, a server, a first and second dynamic point of control entity, and a number of access terminals for originating a group communication session without a dynamic point of control entity, and also adding and removing a dynamic point of control entity during the communication session.

FIG. 12 shows message flows for adding or removing a dynamic point of control entity from a group communication session. The originator 705 may initiate a communication session by sending message 1240 to the server 710, and the server 710 may transmit announcement messages 1245, 1250, 1255 to the group participants' access terminals 725-735.

A communication acceptance message 1260 may be transmitted from access terminals 725-735 to the server 710 and a status message 1265 may be transmitted from the server 710 to the originator 705. A group communication session 1270 may be being without a dynamic point of control entity or role. In this illustrate, a second participant 730 may transmit a request the addition of a dynamic point of control entity by sending message 1275 to the server 710.

In message 1276, the dynamic point of control entity may be selected and presented with context information. In message 1277, the first dynamic point of control entity 715 may reject the appointment, but may refer a second dynamic point of control entity 720 via a message 1277.

The server 710 using predefined rules may analyze the message 1277 for the identity of a second dynamic point of control entity and may deliver an invitation message 1278 to the second dynamic point of control entity 720. In message 1279, the second dynamic point of control entity 720 may accept the appointment, and may join the communication session 1280 as the dynamic point of control entity 720.

In some situations, the originator 705 may request an immediate removal of the call jockey role from the second dynamic point of control entity 720 by delivering a message 1281 to the server 710. The server 710 may deliver the removal message 1282 to the second dynamic point of control entity 720. In response, a context update message 1284 may be delivered to the server 710. The second dynamic point of control entity 720 may deliver a termination request message 1285 to the server 710, which may be accepted. A resulting communication session 1286 without the second dynamic point of control entity 720 may proceed in which the remaining participants may continue to confer or exchange data.

Figure 13:
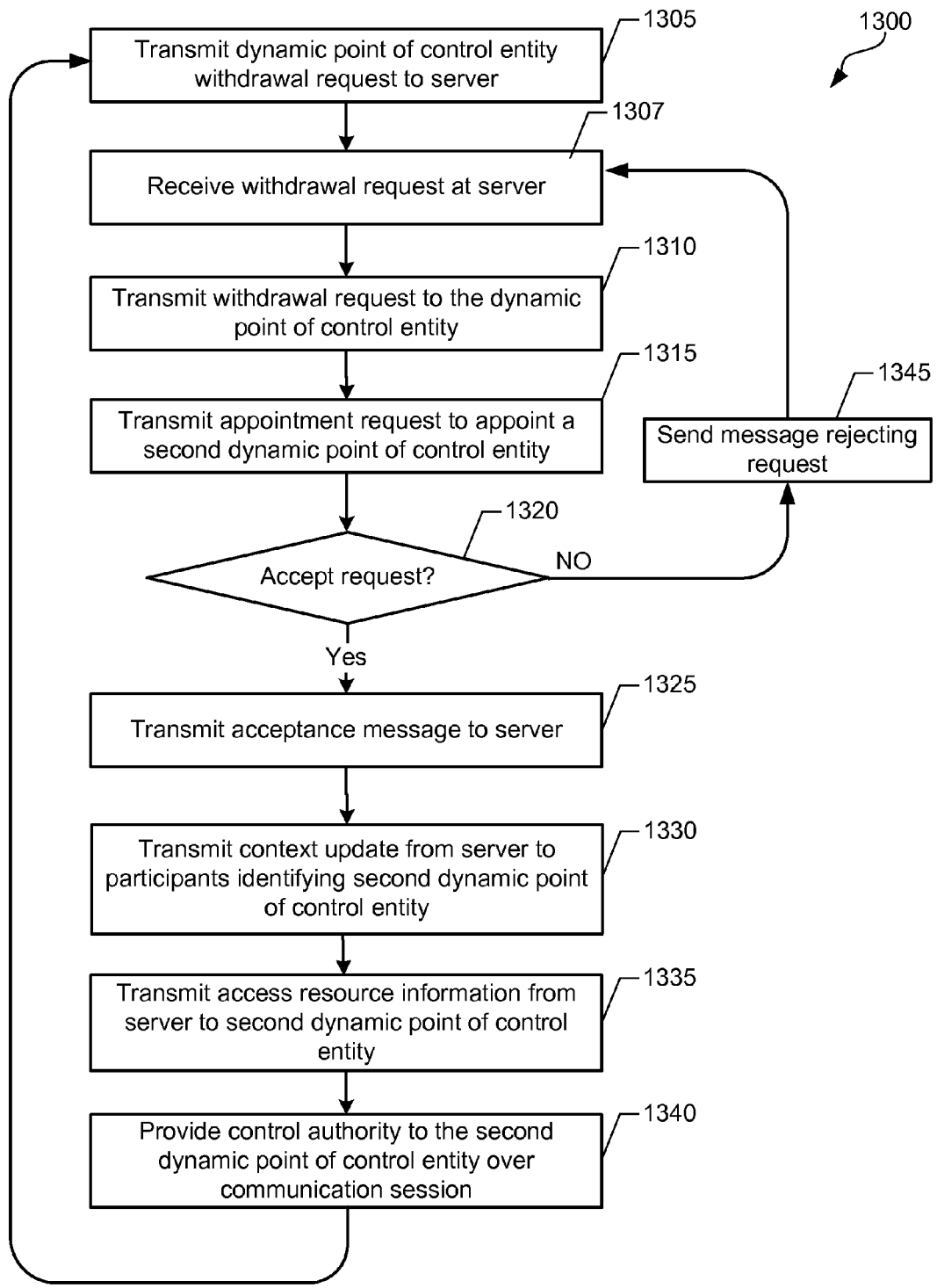
FIG. 13 is a process flow diagram of an embodiment method for appointing a dynamic point of control entity for a group communication session.

FIG. 13 illustrates an embodiment method 1300 that is an example of withdrawing a call jockey in a group communication session. The method 1300 illustrates a withdrawal of a dynamic point of control entity in a group communication session. An access terminal may submit a dynamic point of control entity withdrawal request to a server 710 within a group communication session. This message is transmitted from the access terminal to the server 710 in block 1305 and received in block 1307 and communicated on to the dynamic point of control entity in block 1310.

In block 1315, a server may transmit an appointment request for a new second dynamic point of control entity. In determination block 1320, the dynamic point of control entity may accept or decline the request by providing an input to a console or by delivering a message. If the appointment is accepted by the processor detecting the acceptance of the request, or by detecting a call jockey availability parameter (i.e., determination block 1320="Yes"), the acceptance message may be delivered by the access terminal to the server 710 in block 1325. The server may transmit context updates. The context updates may be delivered in block 1330, which identify the new dynamic point of control entity to group communication session participants. In block 1335, the server 710 may send access resource information to the second dynamic point of control entity. In block 1340, the second dynamic point of control entity may be given control authority over the group communication session. On the other hand, if the appointment is not accepted by the access terminal for the participant nominated to be the second dynamic point of control entity (i.e., determination block 1320="No"), a message rejecting the role may sent by the access terminal to the server 710 in block 1345.

Figure 14:
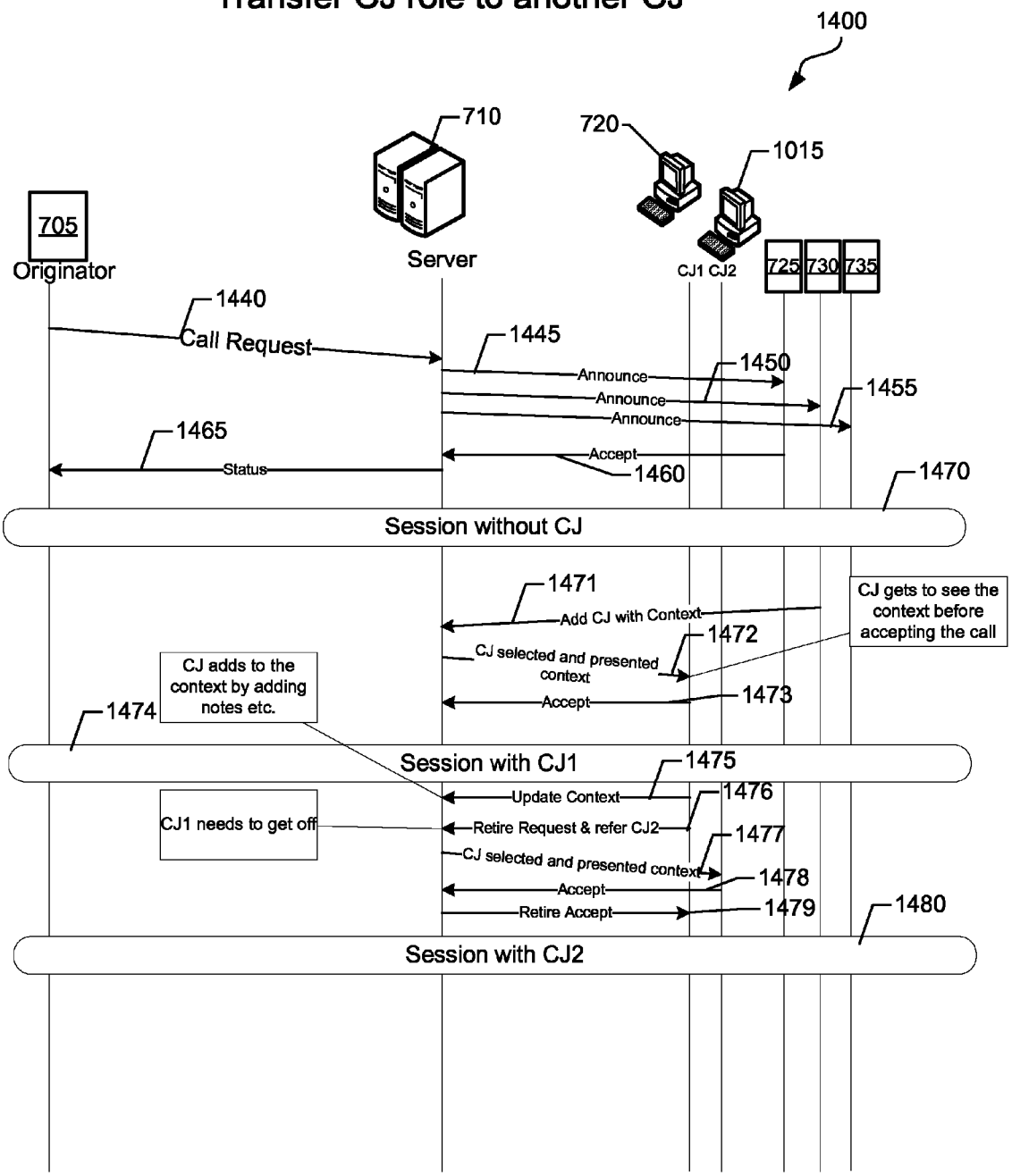
FIG. 14 illustrates a message flow diagram of an originator, a server, a first and second dynamic point of control entity, and a number of access terminals for originating a group communication session without a dynamic point of control entity, and also adding and transferring a dynamic point of control entity role during the communication session.

FIG. 14 illustrates message flows for transferring the dynamic point of control entity role from one access terminal to another. The originator 705 may deliver a communication session call request in message 1440 to the server 710, and the server 710 may transmit announcement messages 1445, 1450, and 1455 to the group participant's access terminals 725-735. An acceptance message 1460 may be delivered to the server 710 and a status message 1465 may be transmitted from the server 710 to the originator 705. A group communication session 1470 may be initiated without a dynamic point of control entity.

In this embodiment, a second participant 730 may signal an intention to add a dynamic point of control entity 715 in block 1471, and may send a context message to the server 710. In message 1472, the dynamic point of control entity 715 may be selected and presented the context information. The nominated dynamic point of control entity 715 may review the context information before accepting the role.

In message 1473, the first dynamic point of control entity 715 may accept the appointment and deliver a message to the server 710 indicating acceptance of the role. In block 1474, a group communication session may be formed with the dynamic point of control entity 715.

The dynamic point of control entity 715 may transmit status updates in block 1475. In block 1476, the dynamic point of control entity 715 may be occupied with other tasks and groups, may retire, or may be unable to continue performing the role. In this case, the dynamic point of control entity 715 may send a message 1477 to the server 710 referring the role to the second dynamic point of control entity 720. This message 1477 may include a context status update. In message 1478, the second dynamic point of control entity 720 may accept the appointment and the first dynamic point of control entity 715 may be retired. In block 1480, a communication session may be formed with the second dynamic point of control entity 720.

Figure 15:
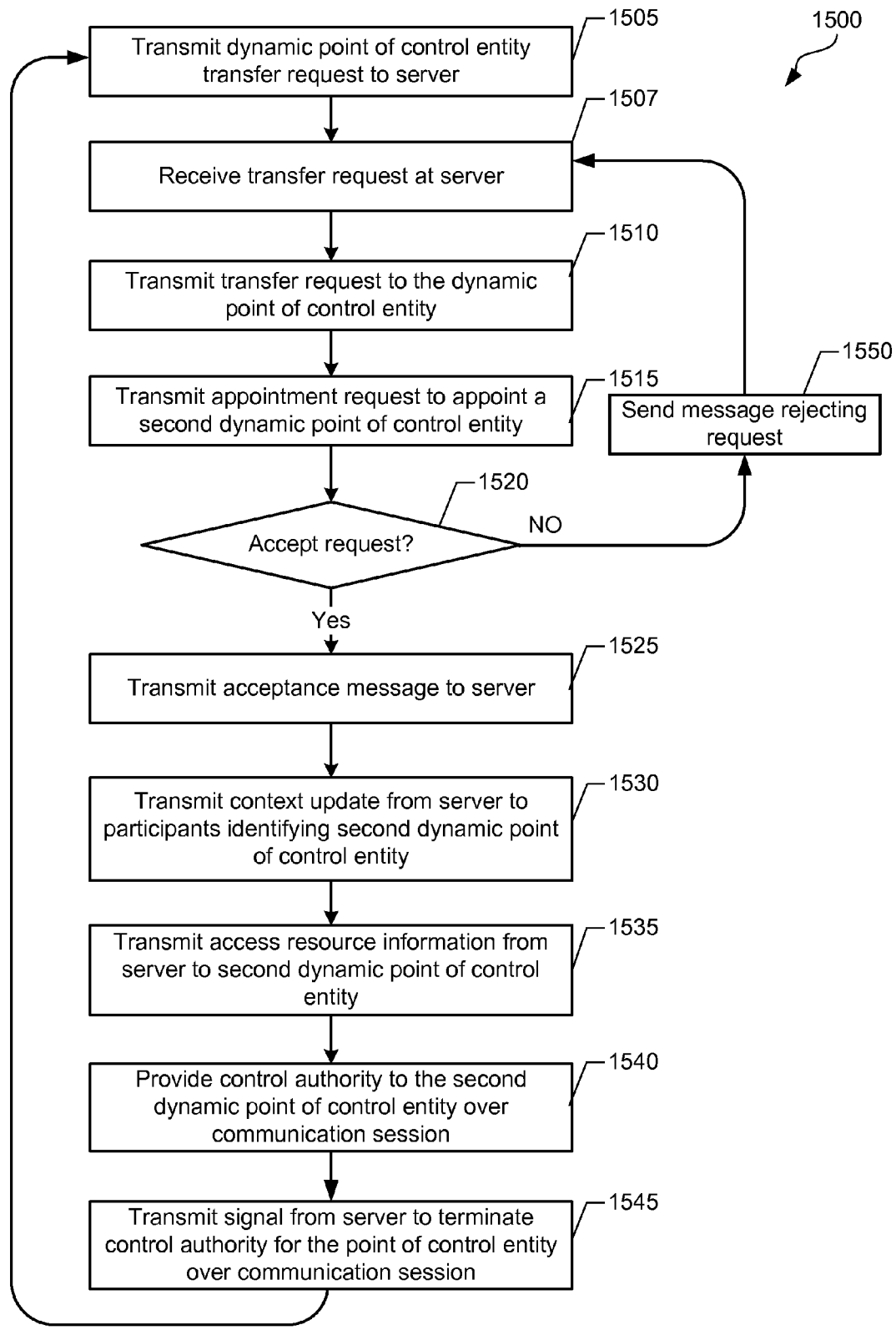
FIG. 15 is a process flow diagram of an embodiment method for appointing a dynamic point of control entity for a group communication session and transferring the role to another second entity.

FIG. 15 illustrates an embodiment method 1500 for transferring control authority over a group communication session and switching a dynamic point of control entity role between two entities in the group communication session. An access terminal 705 may submit a dynamic point of control entity transfer request to a server 710 within a group communication session. The message is transmitted from the access terminal 705 to the server 710 in block 1505. The message is received in block 1507, and may be communicated to the dynamic point of control entity 715 in block 1510. In block 1515, an access terminal may transmit a transfer request from a former dynamic point of control entity 715 to a new second dynamic point of control entity 720.

In determination block 1520, the second or newly proposed dynamic point of control entity 720 may accept or decline the appointment request by providing an input. If accepted and the access terminal receives an input that indicates that the request has been accepted (i.e., determination block 1520="Yes"), the acceptance message may be delivered to the server in block 1525, and context updates may be delivered in block 1530 identifying the new dynamic point of control entity.

In block 1535, access resource information may be transferred in the server 710 to the second dynamic point of control entity 720 from the first control entity to provide authoritative control over the communication session. In block 1540, the second dynamic point of control entity 720 may be given control authority over the group communication session, and in block 1545 control authority may be terminated for the first dynamic point of control entity. In another embodiment, the first and the second dynamic point of control entities may share control over the session for some predetermined time period. In an embodiment, the first dynamic point of control entity may retain limited control over the session so as to give the second dynamic point of control entity time to take over the communications session, thereby minimizing chances for disruption. In the event that the second call jockey does not wish to assume control over the communication session (i.e., determination block 1520="No"), the processor may provide a message rejecting the appointment in block 1550 and another entity may be selected for replacement.

In yet another embodiment, the second dynamic point of control entity 720 may be a group communication session participant utilizing an access terminal. In a further embodiment, the determination block 1520 is optional and the appointment may not be declined. For example, the first dynamic point of control entity 715 may simply appoint the second dynamic point of control entity 720 as the current call jockey without any option for acceptance or rejection. In a further embodiment, some dynamic point of control entities may have the right to appoint others to the role of the dynamic point of control, which appointments may not be declined.

Figure 16:
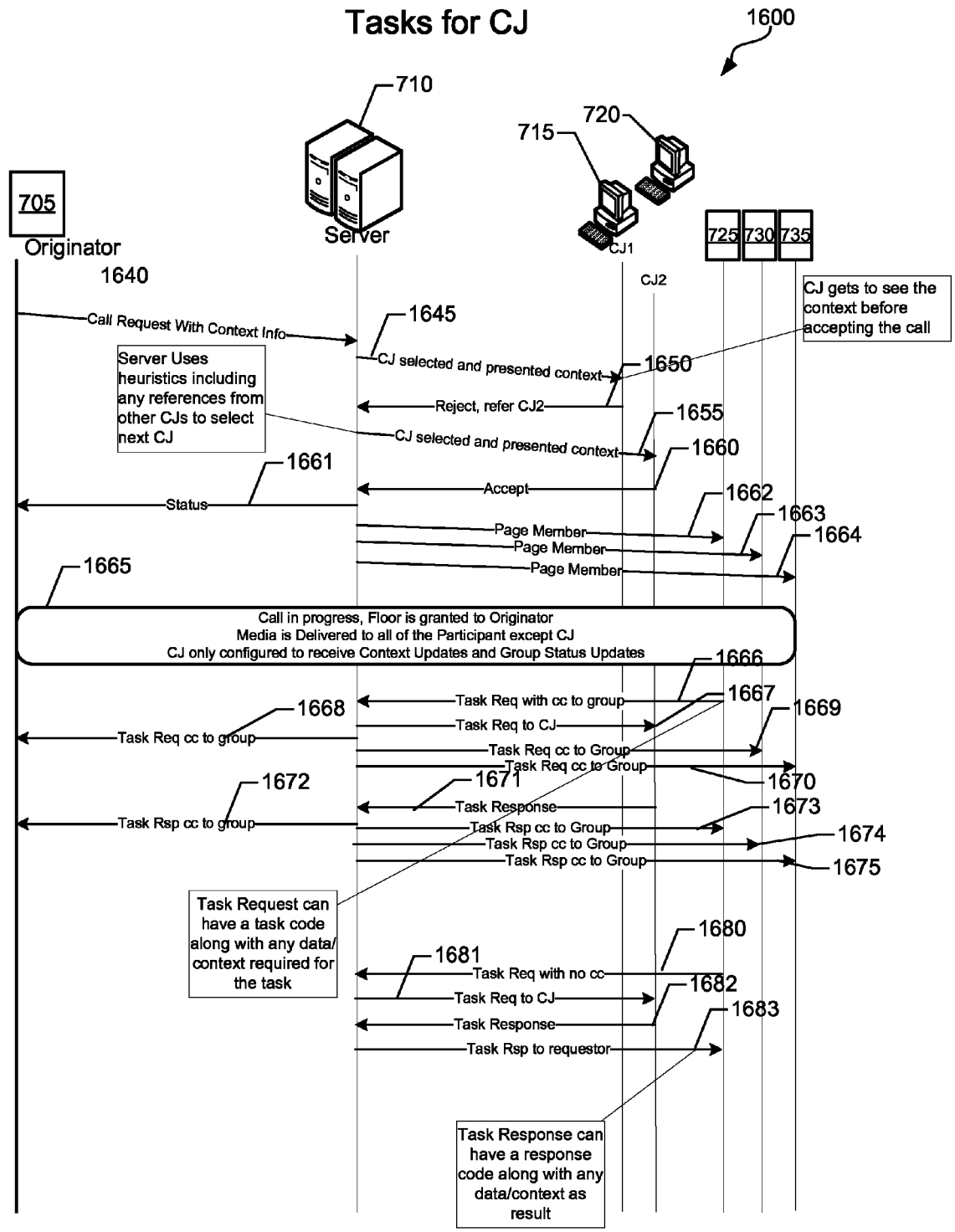
FIG. 16 illustrates a message flow diagram of an originator, a server, a first and second dynamic point of control entity, and a number of access terminals with the dynamic point of control entity role performing a number of tasks for the group participants during the communication session.

FIG. 16 illustrates messages associated with one or more task requests and/or one or more performed tasks in a group communication session. The figure illustrates that some messages may be routed solely to the dynamic point of control entity 715 for approval of a request, so participants are not inundated with multiple unapproved messages.

The originator 1605 may deliver a communication session call request in message 1640. The call request may select a dynamic point of control entity 715 and may be delivered to the server 710. The server 710 may transmit a dynamic point of control entity selection message 1645 to the dynamic point of control entity 715 in block 1645.

The first dynamic point of control entity 715 may reject the appointment in message 1650. Server 710 may utilize heuristics including a reference for a recommendation for a new dynamic point of control entity 720 and may deliver a message 1655 selecting a new dynamic point of control entity 720. In message 1660, the second dynamic point of control entity 720 may accept the appointment and in messages 1662-1664, the server 710 may page the group session participants 725, 730 and 735 and commence a group communication session 1665.

A second participant 730 using an access terminal may transmit a task request 1666 to the server 710. The server 710 may broadcast the task request to the group session participants. The task request may be delivered from the server 710 to the second dynamic point of control entity 720 via message 1667 for approval. The second dynamic point of control entity 720 may deliver the task request to the call participants in messages 1668-1670.

One participant may have a response and may deliver a task response in message 1671. The task response may be delivered to the server 710, which may be transmitted to the group in messages 1672-1675. In this manner, a collaborative problem-solving methodology may be implemented without broadcasting multiple different messages to the participants in an unorganized fashion. A different participant 725 may optionally deliver a private task request in message 1680 to the server 710 that is not broadcast to the group, but instead that is a private task request. The server 710 may receive the task request message 1680. Server 710 may transmit the message to the second dynamic point of control entity 720. The second dynamic point of control entity 720 may send a response 1682 to the server 710. The response message may then be delivered from the server 710 to the requestor 725 in message 1683.

Figure 17:
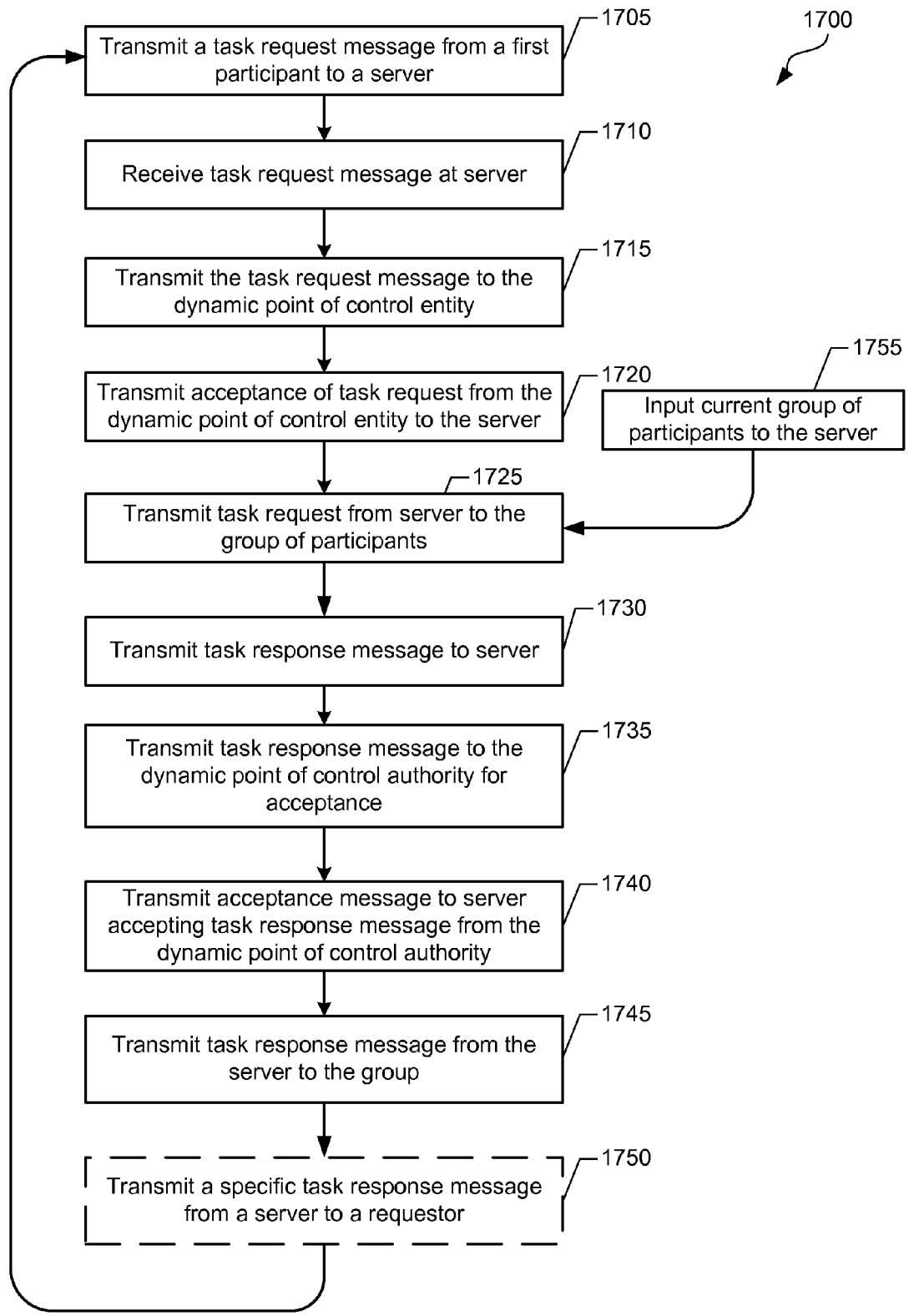
FIG. 17 is a process flow diagram of an embodiment method for appointing a dynamic point of control entity for a group communication session and delivering and responding to task requests during the communication session.

FIG. 17 illustrates an embodiment method 1700 for receiving a task request for information and transmitting a response to the task request that is authorized for delivery by the dynamic point of control entity 715. Task request types may include information lookup task requests, text instruction task requests, short emergency code tasks, and sensor data related task types. For example, a task request may include requests for pictures of a license plate, details of a car's make and color, and a response may include a car owner's picture and registered address. As another example, a task request may include a request for assistance, and a response may include an acknowledgement. As another example, a task request may include vital signs from a heart beat sensor and live data, and a response may be an acknowledgement. As another example, a task request may include informing a supervisor of a condition, and a response may be further instructions based on the condition.

Various task and request configurations are possible and within the scope of the present disclosure.

In an embodiment, method 1700 illustrates a task request and response during a group communication session but may be applicable to other group communication session formats. The method 1700 includes an access terminal or computing device. The device transmits a task request message from a first participant to a server 710 in block 1705. In block 1710, the task request message may be received at a server 710, and the task request message is transmitted to the dynamic point of control entity 715 in block 1715. In block 1720, an acceptance of the task request may be made by providing an input on a console 715, which may be communicated to the server 710. The input may be in a message and may be delivered from the dynamic point of control entity 715, and to the server 710 accepting the task request.

Generally, some participants may have some specialized knowledge and thus better suited to respond to particular task requests with the assistance of the call jockey than other participants. For example, in the military some participants may observe real world conditions but may not have specialized knowledge, so they may events to specialized individuals were able to respond to meet the task objective. In block 1725, a task request message may be sent from the server 710 to the participants of the group communication session to determine if any participant can perform the task or respond appropriately. In block 1755, an input of the current participants may be provided to the processor from a storage medium. An entity may respond to a request or perform a task. For example, the task request may request information from a call participant 705 of one or more conditions or observed parameters. As additional examples, the task may be a sensor output a reading, observing a parameter of a battle, a police dispatch function, emergency services, directions, or reporting a missing person, etc. An entity may utilize the access terminal to respond to the task request.

In block 1730, a task response message may be sent to the server 710. In block 1735, a task response message may be delivered to the dynamic point of control entity 715 for acceptance, which can be accepted in block 1740 via a message. In block 1745, the message may be delivered to the group communication session participants or optionally sent to the requestor to complete the task request in block 1750 and may transmit a new task request message.

Figure 18:
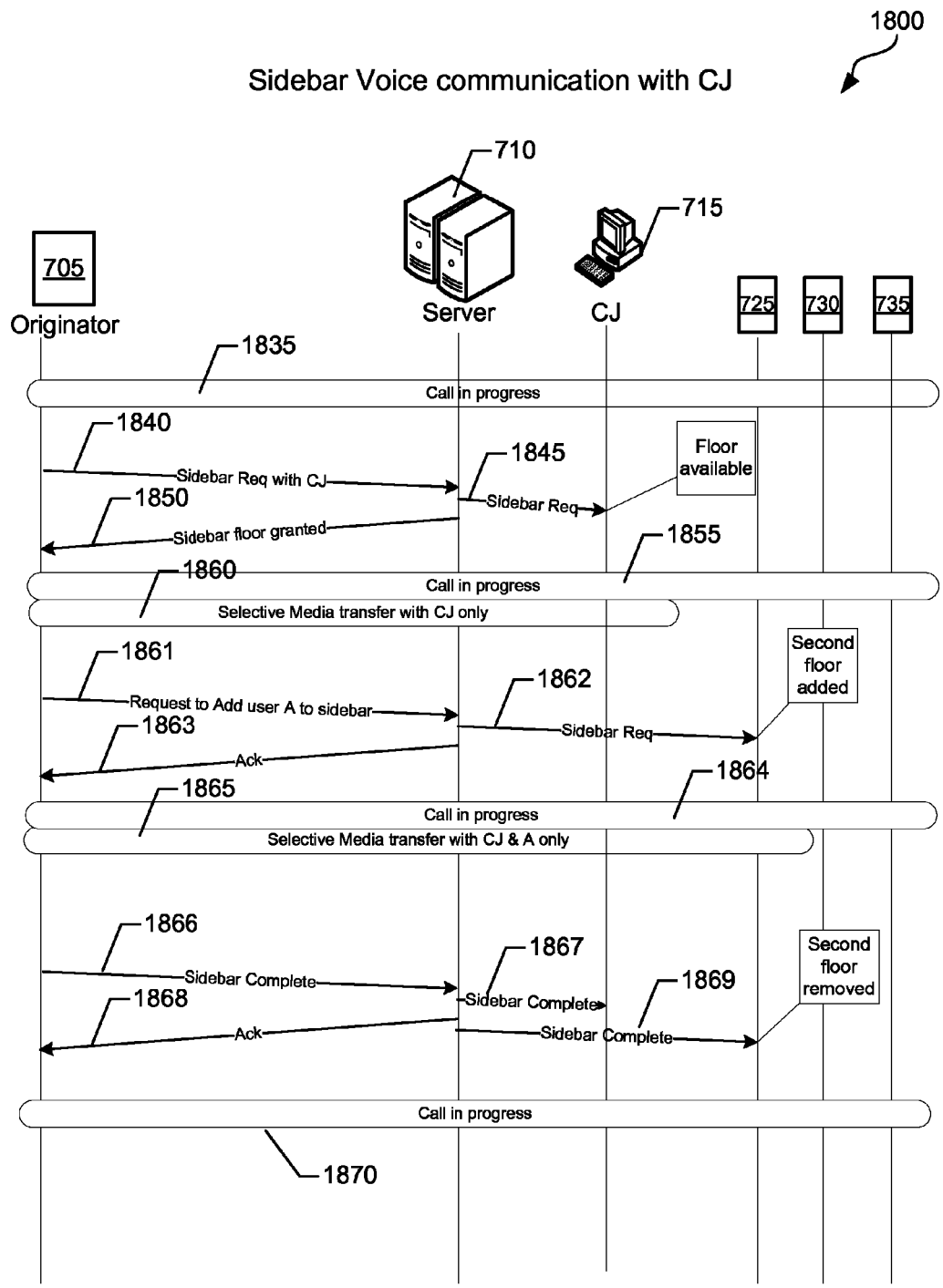
FIG. 18 illustrates a message flow diagram of an originator, a server, a first and second dynamic point of control entity, and a number of access terminals with the dynamic point of control entity role forming a sidebar communication session for selective communication with one or more group participants during a communication session.

FIG. 18 illustrates message flows and may be involved in a private sidebar communication session 1860 between two participants. The private sidebar communication session 1860 may be private relative to a group communication session 1835; meaning that no audio, text, or other media within the private sidebar session is shared is shared with others unless a user input command directs that the material be shared outside the sidebar session.

In the illustrated example, the originator 705 may send a sidebar request message 1840 to the server 710, and the server 710 may communicate a sidebar request to the dynamic point of control entity 715 in message 1845. A message 1850 may be sent from the server to the originator granting the request. A second sidebar communication session 1860 may be formed that does not include the group participants 720-730, and that is private between the originator 705 and the dynamic point of control entity 715.

In some cases, the originator 705 may deliver a request message 1861 to the server 710 seeking to add a group participant to the sidebar session. In response, the server 710 may communicate a sidebar request to the other participant 720 or a different entity. If the invited participant agrees, and acceptance message 1863 may be sent to the server 710 acknowledging the request. The newly added participant 720 may join the second sidebar communication session 1865. At some point, the sidebar communication session 1865 may be ended by the originator 705 sending a sidebar termination request message 1866 to the server 710. In response, the server 710 may communicate a sidebar termination request message 1867 to the dynamic point of control entity 715. A message 1869 may be sent granting the request and terminating the first participant's 720 sidebar communication session as signal 1869. An acknowledgement message 1868 may be delivered from the server 710 to the originator 705. The group communication session 1870 may remain for the group participants 720-730 and the dynamic point of control entity 715 and originator 705.

In an optional embodiment a floor request may be received by a participant. For example, the first participant 720 may receive a floor request message 1862, and may accept the floor request to broadcast audio to multiple participants whereas other participants are muted. The first participant 720 may terminate floor status by sending message 1869 to the server 710 and seeking broadcast to other participants.

Figure 19:
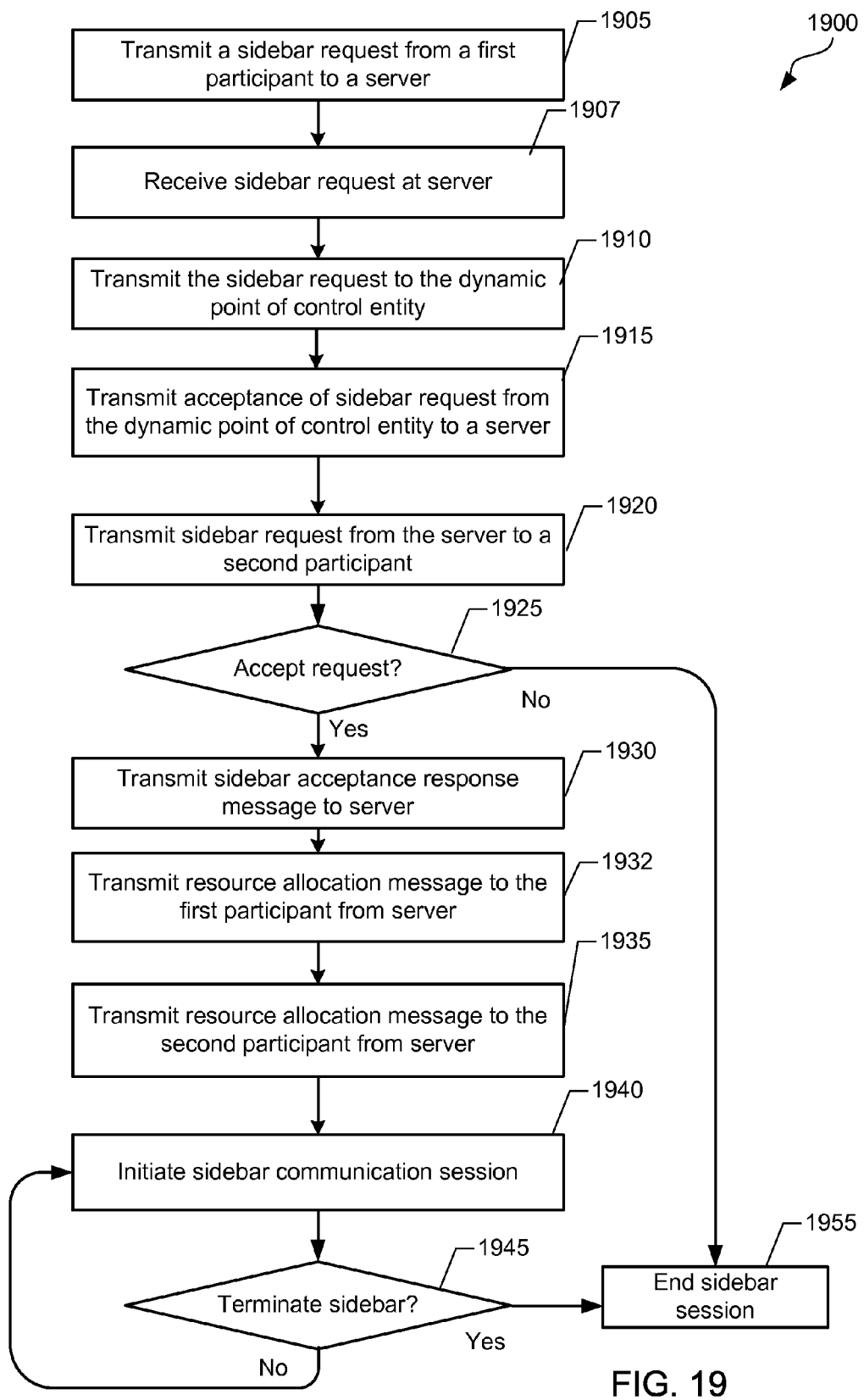
FIG. 19 is a process flow diagram of an embodiment method for appointing a dynamic point of control entity for a group communication session and forming a sidebar communication session with one or more group participants during the communication session.

FIG. 19 illustrates an embodiment method 1900 for forming a sidebar communication session with a dynamic point of control entity. The method 1900 may begin when an access terminal 705 or computing device transmits a sidebar request message to a server 710 in block 1905. In block 1907, the sidebar communication request message may be received at the server 710, and the sidebar communication request message may be transmitted to the dynamic point of control entity 715 in block 1910.

In block 1915, the dynamic point of control entity may accept the request form a sidebar communication link, and transmit a message to the server 710 accepting the request. In block 1920, a sidebar request message may be delivered to a second participant 725. A determination may be reached as to whether to accept the sidebar request in block 1925. If the processor receives an input indicating an acceptance (i.e. determination block 1925="Yes"), a sidebar acceptance message is delivered from the second participant to the server in block 1930. Resources may be allocated for the first participant and the second participant in blocks 1932 and 1935, and a sidebar communication session may be formed in block 1940.

If the processor receives no input, or the processor receives an input that the sidebar has not been terminated, (i.e., determination block 1945="No"), indicating the sidebar communication session is to continue, the sidebar communication session continues in block 1940. On the other hand, if the processor receives an input that the sidebar is to be terminated, (i.e., determination block 1945="Yes"), the session ends in block 1955.

Figure 20:
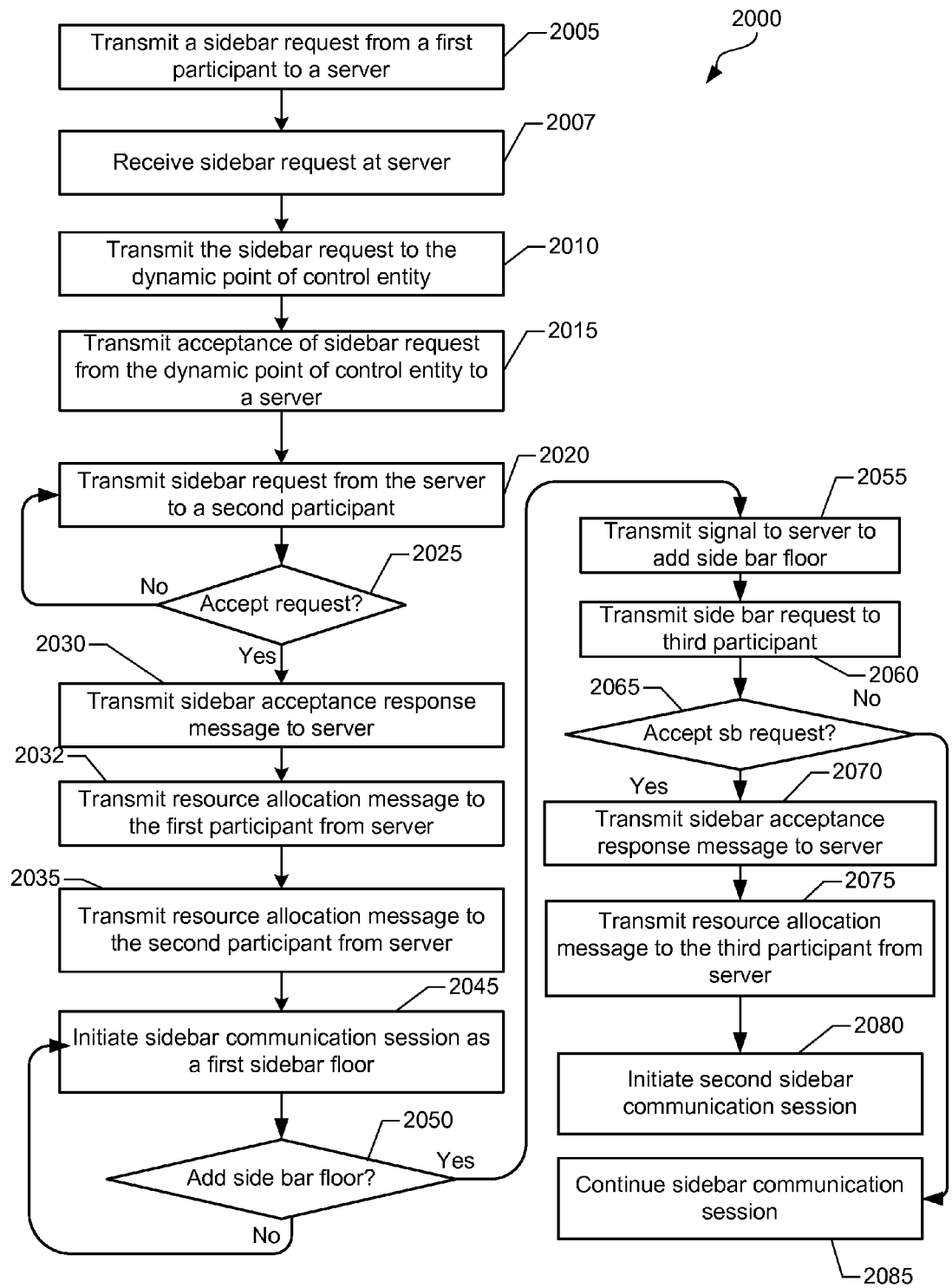
FIG. 20 is a process flow diagram of an embodiment method for appointing a dynamic point of control entity for a group communication session, forming a sidebar communication session with one or more group participants during the communication session, and adding a floor whereby a single participant may communicate with a number of group participants while the group is muted.

FIG. 20 illustrates an embodiment method 2000 for adding a sidebar floor and forming a second sidebar communication session within a first sidebar communication session. Method 2000 may be implemented in a computing device having a processor configured with processor executable instructions to perform the operations of the method 2000. The method 2000 illustrates a number of steps to formulate a sidebar communication session and also to assign a floor to one or more participants so media can be delivered to the group participants by an entity that holds the floor. The method 2000 includes an access terminal or computing device that transmits a sidebar request message from a first participant to a server in block 2005.

In block 2007, the sidebar communication request message is received at the server 710. The server 710 may then transmit the sidebar communication request message to the dynamic point of control entity in block 2010. In block 2015, the dynamic point of control entity may accept the sidebar request and transmit an acceptance message to the server 710. In block 2020, a sidebar request message may be transmitted from the server 710 to a second participant in the sidebar communication. The second participant may decide whether to participate in the sidebar communication in determination block 2025, the second participant may determination may be made as to whether the sidebar request is accepted.

If the invitation to join the sidebar communication session is accepted (i.e., determination block 2025="Yes"), the second participant's computing device sends a sidebar acceptance message to the server in block 2030. Resources may be allocated for the first participant and the second participant in blocks 2032 and 2035 and a sidebar communication session may be formed in block 2045.

In determination block 2050, a determination may be reached to add a sidebar floor, or a participant that may communicate directly with all of the participants of the sidebar communication session. If the processor determines to add a sidebar session floor (i.e., determination block 2050="Yes"), processor may communicate a message to the server to add a sidebar floor in block 2055. If the processor determines that no floor is required (i.e., determination block 2050="No"), the sidebar communication session continues in block 2045.

A third participant may be added in block 2060. In decision block 2065, a decision may be reached as to whether the third participant provides an input to accept the request. If so (i.e., determination block 2065="Yes"), a sidebar acceptance message response may be delivered to the server in block 2070 and resource allocation parameters may be sent to the third participant in block 2075. In block 2080, a second sidebar communication session may be formulated by one or more participants. On the other hand, if the request is not accepted to join the sidebar communication session (i.e., determination block 2065="No"), the processor may continue the communication session in block 2085.

Figure 21:
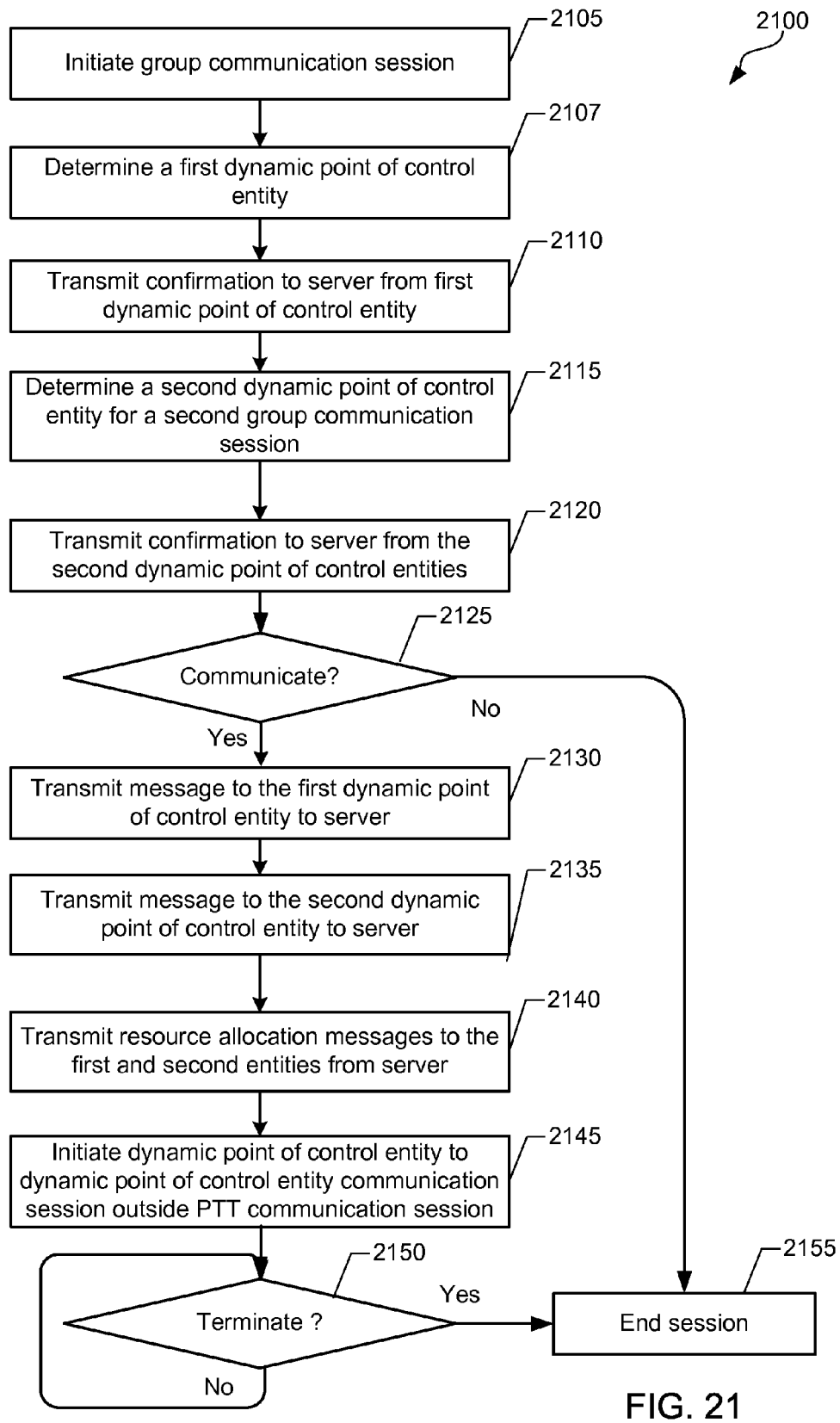
FIG. 21 is a process flow diagram of an embodiment method for appointing a dynamic point of control entity for a group communication session and forming a communication session between the dynamic point of control entity and a second dynamic point of control entity that cannot be heard by other members of the group communication session.

FIG. 21 illustrates an embodiment method 2100 that may be implemented in a computer device having a processor configured with processor-executable instructions to perform the operations of the method 2100. The method 2100 illustrates at least two dynamic point of control entities or two call jockeys formulating a sidebar communication session to communicate with one another in a private manner.

The method 2100 includes an access terminal or computing device that transmits a group communication session initiation communication request from a first participant to a server 710 in block 2105. In block 2107, a first dynamic point of control entity 715 may be determined in block 2107. In block 2110, a confirmation message may be sent between a server 710 and a first dynamic point of control entity 715. In block 2115, a second dynamic point of control entity 720 may be determined and may be available. In block 2120, a confirmation message may be sent to a server 710 from the second dynamic point of control entity 720. In determination block 2125, the processor may determine whether to communicate between the first and the second dynamic point of control entities 715 and 720 in block 2125. If determination block 2125 indicates that the processor should communicate (i.e., determination block 2125="Yes"), a message may be transmitted to the first dynamic point of control entity to a server in block 2130 and a message may be transmitted to the second dynamic point of control entity to a server in block 2135.

Resource allocation parameters may be delivered to the first and the second dynamic point of control entities, and the server in block 2140. In block 2145, a communication session may be established between a first dynamic point of control entity and a second dynamic point of control entity outside of the group communication session, so that the first dynamic point of control entity may communicate with the second dynamic point of control entity. On the other hand, if an input is received to not communicate (i.e., determination block 2125="No"), the session may be terminated as in block 2155.

In determination block 2150, the server or the terminal supporting the dynamic point of control entities may monitor for user inputs. This may indicate a decision to terminate the communication session between two dynamic point of control entities. When a user input is received indicating that the participants have decided to terminate the communication session (i.e., decision block 2150="Yes"), the communication session between the two dynamic point of control entities may be terminated in block 2155.

Figure 22:
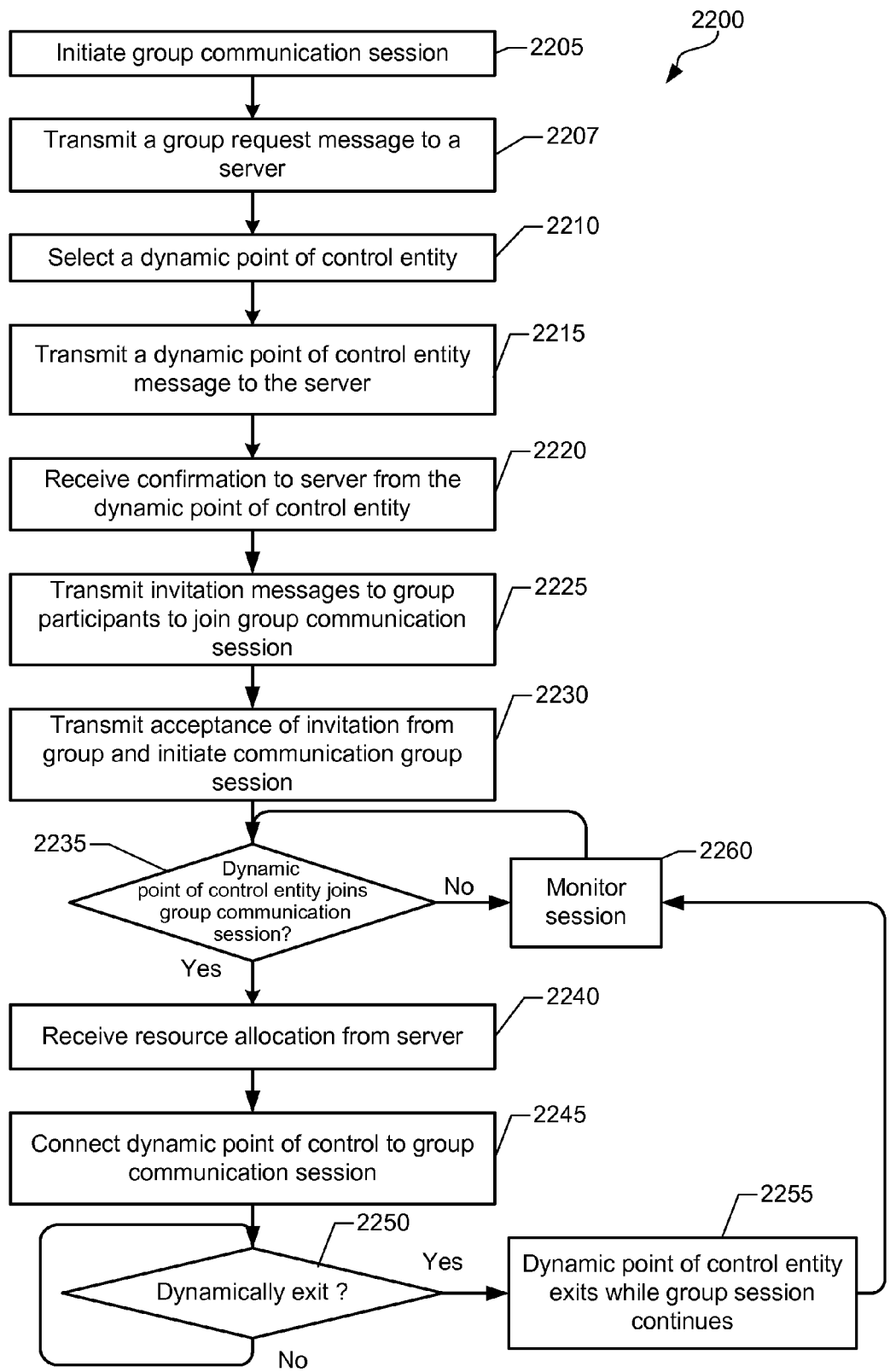
FIG. 22 is a process flow diagram of an embodiment method for appointing a dynamic point of control entity for a group communication session in which the dynamic point of control entity may enter and take control of portions of a group communication session.

FIG. 22 illustrates an embodiment method 2200 that may be implemented in a computer device having a processor configured with processor-executable instructions to perform the operations of the method 2200. The method 2200 illustrates a number of blocks for a dynamic point of control entity to join a group communication session and to communicate with one or more group participants. The method 2200 includes an access terminal 705 or computing device that transmits a group communication session initiation communication request from a first participant to a server 710 in block 2205. In block 2207, a group request message may be delivered to a server 710 and a first dynamic point of control entity 715 may be determined in block 2210.

In block 2215, a confirmation message may be sent between a server 710 and a first dynamic point of control entity 715 and a confirmation may be received in block 2220. In block 2225, invitation messages may be delivered to formulate group participants for the communication session. In block 2230, one or all of the group communication session participants may accept the invitation and deliver messages.

In determination block 2235, the dynamic point of control entity may decide whether to join the communication session. So long as the dynamic point of control entity decides not to join the communication session (i.e., determination block 2235="No"), the dynamic point of control entity may continue to monitor the session in block 2260. If the dynamic point of control entity decides to join the communication session (i.e., determination block 2235="Yes"), the dynamic point of control entity may inform the server and receive resource allocation parameters necessary to join the communication session as a participant in block 2240. In block 2245, the dynamic point of control entity 715 may control the group communication session so that it enters the communication session as a participant, such as gaining the ability to listen to discussions and to be heard as participant. In determination block 2250, the dynamic point of control entity may determine whether to dynamically exit the communication session. When the dynamic point of control entity decides to exit the communication session (i.e., determination block 2250="Yes"), the processor may control the group communication session so the dynamic point of control entity no longer receives media and can no longer be heard by other participants. While the call jockey remains a participant in the communication session (i.e., as long as determination block 2250="No"), the communication between the dynamic point of control entity and the group of participants may continue.

In one embodiment, the dynamic point of control entity 715 may operate in a public security department that provides desktop support to one or more security officers in the field. For example, the dynamic point of control entity 715 may act as a mission controller that directs a team comprising the group of participants in the communication session. This may enable the dynamic point of control entity to direct the efforts of the team to achieve mission objectives. The dynamic point of control entity 715 may be selected based on the location, the area of command, or domain expertise. For example, dynamic point of control entity 715 may receive automatically certain permissions required for mission control and may have sidebar conversations with other entities to obtain contextual information of specific details. For example, the call jockey can speak to a supervisor privately in a sidebar communication session, while on the call with other individuals.

In another embodiment, the dynamic point of control entity 715 may act as an assistant to the group of participants, and help the group members work towards a group objective. The dynamic point of control entity 715 may perform this task on an ad hoc basis or may have authority to perform this role in certain circumstances. In an embodiment, the call jockey may act as a secondary supporting dynamic point of control entity 720 having limited permissions which enable me entity to support the primary dynamic point of control entity 715. For example, the dynamic point of control entity 720 may work on finding resources to support a group mission, or to step in to handle urgent tasks. As another example, an assistant call jockey 720 may work with some group participants on a subtask to enable the primary call jockey 715 to continue working on a main group task.

In another embodiment, the dynamic point of control entity 715 may provide specialized and specific services. For example, the dynamic point of control entity 715 may serve as an information resource that can access a number of information databases to answer questions from the group and send context information (e.g., pictures, finger prints, car license plates) to the group participants. For example, the dynamic point of control entity 715 may be a forensic expert who provides expert advice to a team of investigators based on pictures and other data provided by the team. The dynamic point of control entity 715 may provide unsolicited advice or instructions or may respond to specific inquiries.

In another embodiment, the dynamic point of control entity 715 may be a construction worker or supervisor. For example, the dynamic point of control entity 715 may receive picture updates, streaming video from different entities, and may monitor progress of tasks. When appropriate, the dynamic point of control entity 715 may join a voice communication session with the group to provide data, advice, conclusions, or instructions. A group communication session participant and the dynamic point of control entity 715 may get involved in a sidebar communication session while the dynamic point of control entity 715 may continue to monitor the progress of the process. The dynamic point of control entity 715 may be able to receive high priority alerts from group members that require immediate attention. In another embodiment, an alert may be formed for one or more participants based on the context update. For example, the server 710 may form an alert message. The message may be an alert that a geographical boundary (or "geo-boundary") is crossed, an alert that a predetermined talk time is exceeded, an alert that a sensor has been triggered and a mute action, or an alert action that a background noise exceeds a predetermined level.

In yet a further embodiment, the dynamic point of control entity 715 may be a coach and may have direct control over the team and may be able to communicate effectively with all members, members in the field, extras, or may have a private sidebar communication session with the team captain, goalkeeper, quarterback, or individual players.

In a further embodiment, additional messages may be provided to ensure that the communication messaging is effective with QChat/Yagatta. In this embodiment, consolidated call status messages may be provided between the server 710 and the dynamic point of control entity 715. In this embodiment, control messages may be exchanged from the dynamic point of control entity 715 and the server 710 to allow add/delete member tasks. Request messages may be exchanged between the dynamic point of control entity 715 and group participants 720, 725 and 730 to communicate a request and acknowledgement messages may be delivered from the dynamic point of control entity 715 to the group members 720, 725, and 730. This embodiment, a special functionality invocation message from the call jockey 715 to the group members 720-730 may be delivered through the server 710 for exchanging voting requests. For example, a special functionality invocation message from the group members 720-730 to the call jockey 715 may be delivered through the server 710 for responding to the voting requests. A special floor request message may also be delivered from the dynamic point of control entity 715 to make an announcement to all of the group participants.

In another embodiment, one call jockey 715 managing several group communication sessions and inundated with high traffic may delegate some tasks to a second call jockey 720 via one or more delegation messages. In this embodiment, a first message may be transmitted from the call jockey 715 to the server 710 to request such a delegation. In response, the server 710 may transmit a second message to the second call jockey to initiate transfer of call context and monitoring responsibility to the second call jockey 720. The server 710 may also send an update message to the group communication session participants informing them of the change in call jockey 715 or 720 assignments or responsibilities in the communication session.

In yet another embodiment, some communication may involve a large number of members and simultaneous requests that can arrive to the dynamic point of control entity 715 at the same time. In this instance, there may be multiple co-responsible dynamic point of control entities 715 and 720. Load balancing may be required to balance tasks and messages to the multiple dynamic point of control entities 715 and 720 according to a predefined schema.

In yet another embodiment, the dynamic point of control entity 715 may be intelligently chosen based on a call context and the role may be extended beyond call management. For example, in-band forwarding of context information to a dynamic point of control entity 715 is not possible in regular conference calls and the dynamic point of control entity 715 may add a logical focal point to a group communication session. In this case, the dynamic point of control entity 715 may provide participants an option of keeping certain aspects of a voice conversation private while delegating some non-voice conversation tasks to a non-member of the group communication session. For example, the dynamic point of control entity 715 may manage more than two different group communication sessions simultaneously. In such a situation, a mobile access terminal may provide the dynamic point of control entity 715 with functionality that is not limited to back office functionality.

In a further embodiment, call context data may be provided to the dynamic point of control entity 715. Context data may include a summary of what the call is about with relevant media and may be transmitted in a message. For example, a call participant may review the message first prior to joining a call.

For example, call context information provided to the dynamic point of control entity 715 may include a speaking individual's identification information, a member profile detail, a member preemption rank, a member location information, a member's cumulative talk time, a flag indication indicating that the member has been restricted, sensor data (temperature, radiation information, pressure information, gyroscopic data), and/or sidebar information data. For example, in the case of a group communication session supporting a search team in a child abduction case, a suspect's automobile may be identified in a message to the group participants. Another message may provide the suspect's license number. Another message may provide a photo of the child and a further message may provide an update regarding the missing child. Another message may provide a suspect's description and a further message may provide a suspect's picture. A group call participant may respond by reporting that a matching car has been stopped by the police with the message including a location, a picture of the driver and a picture of the child. The dynamic point of control entity 715 may route this message to a supervisory individual who can confirm that the picture matches the suspect and authorize an arrest of the suspect all in real time.

In another embodiment, the communication session may be a closed group call, an ad hoc group call, or a closed two participant call. The dynamic point of control entity 715 may be a group member or not a group member. If the dynamic point of control entity 715 is a group member, the dynamic point of control entity 715 may be pre-configured to assume the role of the call jockey 715. However, if the dynamic point of control entity 715 is absent, then the dynamic point of control entity 715 may be replaced by a different entity. However, if the dynamic point of control entity 715 is not present or if any other relevant entities are not present, the originator 705 may be the default dynamic point of control entity 715 role. Otherwise, an originator 705 may that request a member of the group communication session serve as the dynamic point of control entity 715. In another embodiment, as a call jockey 715 joins the group communication session, the call jockey 715 may be preconfigured to assume the role simultaneously when they join the communication session. In another example, an invitation to serve as a dynamic point of control entity 715 may be sent to a non-member.

For a transfer of the dynamic point of control entity role 715 between participants, the dynamic point of control entity 715 may be a group member or may not be a group member. The dynamic point of control entity 715 may be transferred automatically when one call jockey 715 drops off a communication session, or may be explicitly transferred by an entity. The dynamic point of control entity 715 may also have a dynamic configuration, whereby a secondary call jockey 720 is assigned to assume the role at some predetermined milestone. In another embodiment, the dynamic point of control entity console 715 may include controls, including a participant mute control input, a communication control request input, an alert input, a geographical alert signal input (e.g., if a certain geographical location parameter has been triggered by a group participant passing over a predetermined location), and signal inputs from various sensors. For example, this alternatively may also be an access terminal touch screen on a smart phone. To satisfy the dynamic point of control entity 715 use, additional signaling messages may be required (for example, in a QChat, or Yagatta session) which may include: consolidated call status messages from a server 710 to the dynamic point of control entity 715; control messages from the dynamic point of control entity 715 to the server 710 to allow the dynamic point of control entity 715 to execute the tasks like adding/deleting members; a request message from group members to the dynamic point of control entity 715 to communicate a pre-configured request; acknowledgement messages from the dynamic point of control entity 715 to group members; special functionality invocation message from the dynamic point of control entity 715 to group members (e.g. a voting request); a functionality response message from group members to the dynamic point of control entity 715 (e.g. to send voting choices); and a special floor request from the dynamic point of control entity 715 to make announcement to the group.

Figure 23:
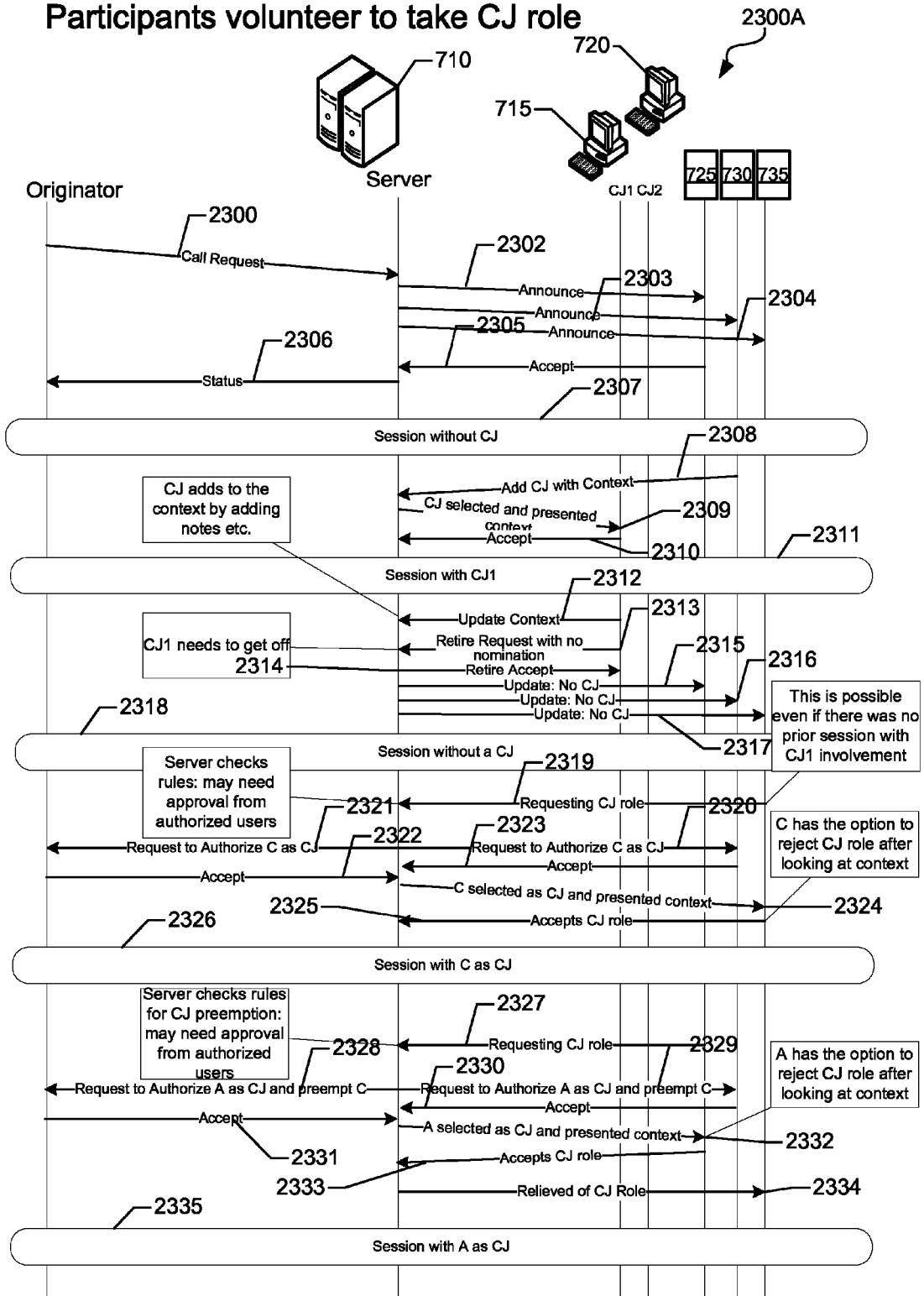
FIG. 23 illustrates a message flow diagram of an originator, a server, a first and second dynamic point of control entity, and a number of access terminals with the one or more group participants volunteering to serve as a dynamic point of control entity during a communication session.

FIG. 23 illustrates messaging flows 2300A within an alternative embodiment in which group communication session participants may volunteer to assume the role of a dynamic point of control entity. An originator 705 may deliver a call request 2300 to the server 710. The server 710 may provide announcement messages 2302, 2303 and 2305 indicating that participants are needed. A second group communication participant 730 may deliver an acceptance message 2305 to the server 710. The server 710 may deliver a status message 2306 to all participants. A group communication session 2307 commences without any call jockey 715 or 720.

A second group participant 730 may deliver a message 2308 to the server 710 to add a call jockey role 715. This message 2308 may also include context information. A first dynamic point of control entity 715 may be selected in message 2309 and may accept the appointment via message 2310. A group communication session 2311 then commences with a first call jockey 715.

The first call jockey 715 may deliver a message 2312 to the server 710 to update the context information. A time period later, the first call jockey 715 may resign by transmitting message 2313 to retire as the call jockey. This may occur as a request without any nomination of another individual to serve the point of control role, or alternatively may include a nomination. The server 710 may deliver a retire acceptance message 2314. Update messages 2315, 2316 and 2317 may be delivered from the server 710 to group session participants 725, 730 and 735.

A group communication session 2318 may commence without any call jockey. A third group participant 735 may deliver a message 2319 to the server 710 to add a call jockey role. The server 710 may deliver a message 2321 to the originator 705 to request authorization to permit addition and may deliver message 2320 requesting authorization. Message 2322 to the server 710 may indicate an acceptance from the originator 705. Message 2323 may indicate acceptance from the third participant 735.

The server 710 may deliver a message 2324 that includes resource allocation parameters so the third participant 735 is selected as the dynamic point of control entity 735 and may exert control over the session 2326. The third participant 735 may accept the appointment via message 2325. A group communication session 2326 may the commence with the third participant 735 serving as the call jockey 735.

Later circumstances may change such that another entity should serve as the authority role due to predetermined reasons. For example, another participant may be more qualified or may have specialized experience. The first group participant 725 may deliver a message 2327 to the server 710 to request the call jockey role. The server 710 may deliver a message 2328 to the originator 705 to request authorization and to preempt any existing parties and to permit the replacement. For example, any previous control entity would be replaced via a message.

The server 710 may also deliver message 2329 requesting authorization and preemption/replacement from the third participant 735. Message 2330 to the server 710 may indicate an acceptance from the third participant 735. Message 2331 may indicate acceptance from the originator 705.

The server 710 may deliver message 2332 that includes resource allocation parameters so the first participant 725 is selected as the dynamic point of control entity 725 and may exert control over the session 2335. The first participant 725 may accept the appointment via message 2333. A message 2334 is delivered from the server 710 to the third participant 735 relieving that participant of the call jockey role and revoking the third participant's 735 control authority over the session 2335. A group communication session 2335 may then commence with the first participant 725 serving as the call jockey 725.

Figure 24:
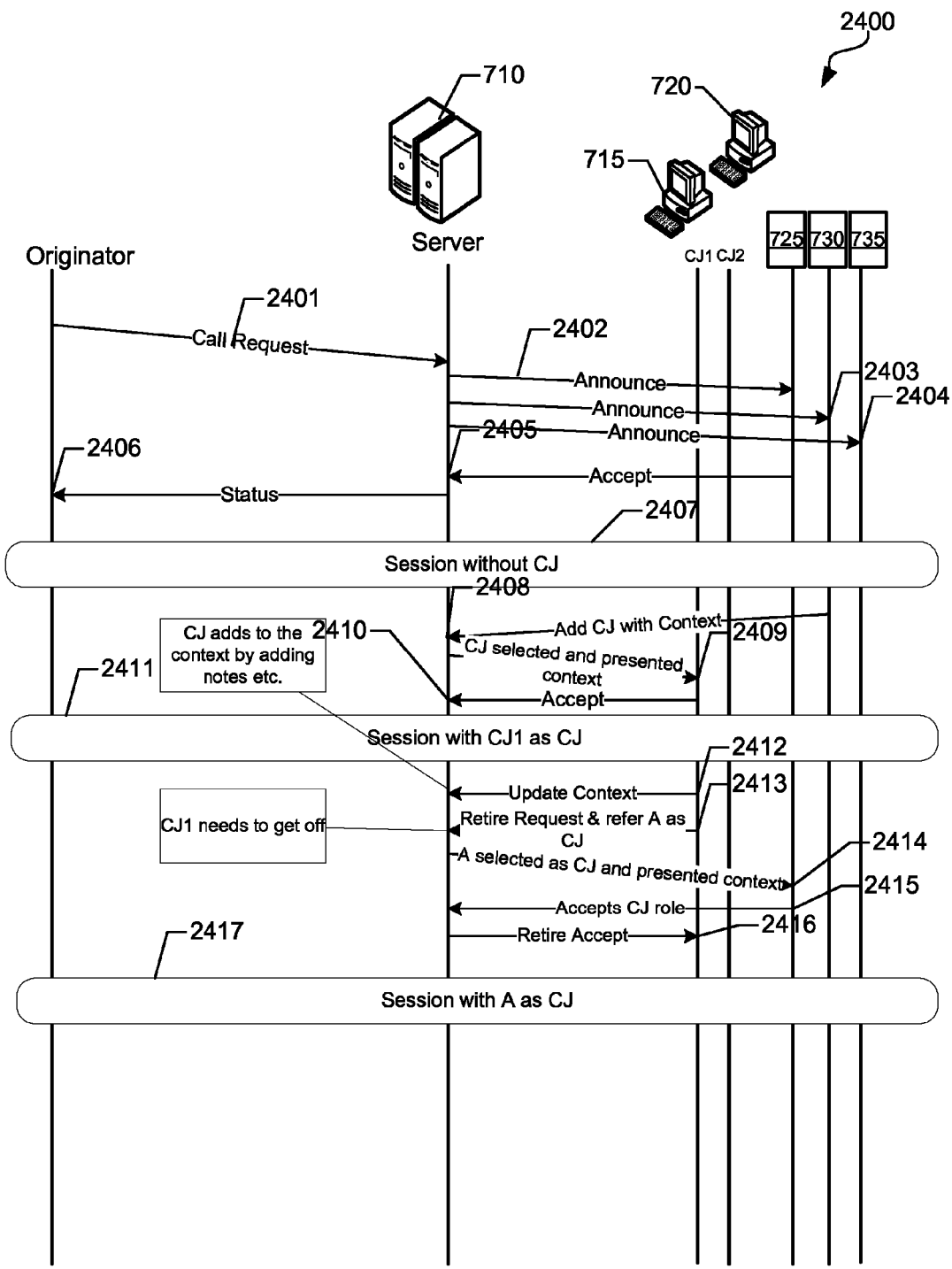
FIG. 24 illustrates a message flow diagram of an originator, a server, a first and second dynamic point of control entity, and a number of access terminals with the one or more group participants transferring a dynamic point of control entity role to one or more participants during a group communication session.

FIG. 24 illustrates a messaging flow diagram 2400 of an alternative embodiment in which group communication session participants may transfer a dynamic point of control entity role to another designated participant of the group communication session. The transfer allows a participant to assume the role of the dynamic point of control entity. The originator 705 may deliver a call request 2401 to the server 710. The server 710 provides announcement messages 2402, 2403 and 2404 indicating that participants are needed. A first group communication participant 725 may deliver an acceptance message 2405 to the server 710. The server 710 may deliver a status message 2406 to the originator 705, which may indicate acceptance. A group communication session 2407 commences without any call jockey role 715 and 720.

A second group participant 730 may deliver a message 2408 to the server 710 to add a call jockey role in a message that includes context information. Message 2409 includes a request to add a call jockey and also includes presented context information and is delivered to the first call jockey 715. A first dynamic point of control entity 715 may accept the appointment via message 2410. A group communication session 2411 commences with a first call jockey 715.

The first call jockey 715 may deliver a message 2412 to the server 710 to update the context information. A time period later, the first call jockey 715 may quit by transmitting message 2413 to retire as the call jockey. This may occur as a request message and may form a nomination of another individual 725 to serve the point of control role. The first call jockey 715 may immediately leave the group communication session 2411 and the server 710 may deliver an appointment message 2414, which selects the first participant 725 as the dynamic point of control entity 725 and delivers resource allocation parameters and context information. Message 2415 from the first participant 725 transmitted to the server 710 may indicate acceptance of the role. Message 2416 may indicate a retirement of the first call jockey 715. A group communication session 2417 may then commence with the first participant 725 serving as the call jockey 725.

Cases involving the dynamic point of control entity 725 may include a public security department in which the dynamic point of control entity 725 provides desktop support to security officers in field. For example, the dynamic point of control entity 725 may be acting as a mission controller directing the team and driving the mission, or the dynamic point of control entity 725 may be selected based on location or an area of command or expertise.

The dynamic point of control entity 725 may be selected based on a profile and may automatically obtain permissions required for a mission controller role. The dynamic point of control entity 725 may be acting as assistant, e.g., helping with adding members to the mission team. The dynamic point of control entity 725 may be supervising in on-demand basis or may have authority in an authoritative way based on the context of the session. The dynamic point of control entity 725 may be acting as a secondary call jockey with limited permissions, in addition on the primary dynamic point of control entity (mission controller). The dynamic point of control entity 725 may be asked to find some important resource needed for the mission. The dynamic point of control entity 725 may be an assistant call jockey and may be asked to add some members to the call or may be able to do so on his/her own discretion based on the context needed. The dynamic point of control entity 725 may also be providing specific specialized services. For example, the dynamic point of control entity 725 may be sent some context information (e.g. pictures/fingerprints/car license number etc) to search for information in databases systems.

The dynamic point of control entity 725 may be an expert that can provide solicited or unsolicited advice/instructions to the group communication session. For example, a forensic expert dynamic point of control entity 725 may provide expert advice based on pictures or data that are forwarded to him or her. The dynamic point of control entity 725 may also be a construction worker supervisor. For example, the dynamic point of control entity 725 may receive picture updates/streaming video from different construction workers who are members of the group and may monitor progress of work. When needed, the dynamic point of control entity 725 can join the voice communication with the group for any supervisory instructions. The dynamic point of control entity 725 may be a group member and the dynamic point of control entity 725 can enter into a sidebar conversation, while the dynamic point of control entity 725 may monitor the projects via pictures/streaming video. The dynamic point of control entity 725 may be able to receive high importance alerts from the group members requiring immediate attention. The dynamic point of control entity 725 may also be a sports team coach. The dynamic point of control entity 725 may be able to have private communication with the match referee, other teams coach or a commentator, while still managing his team on the field. While the team may include all the team members (in field and extras) the coach can be acting as the dynamic point of control entity 725 while having direct communication with the team or having private communication with the team captain.

Figure 25:
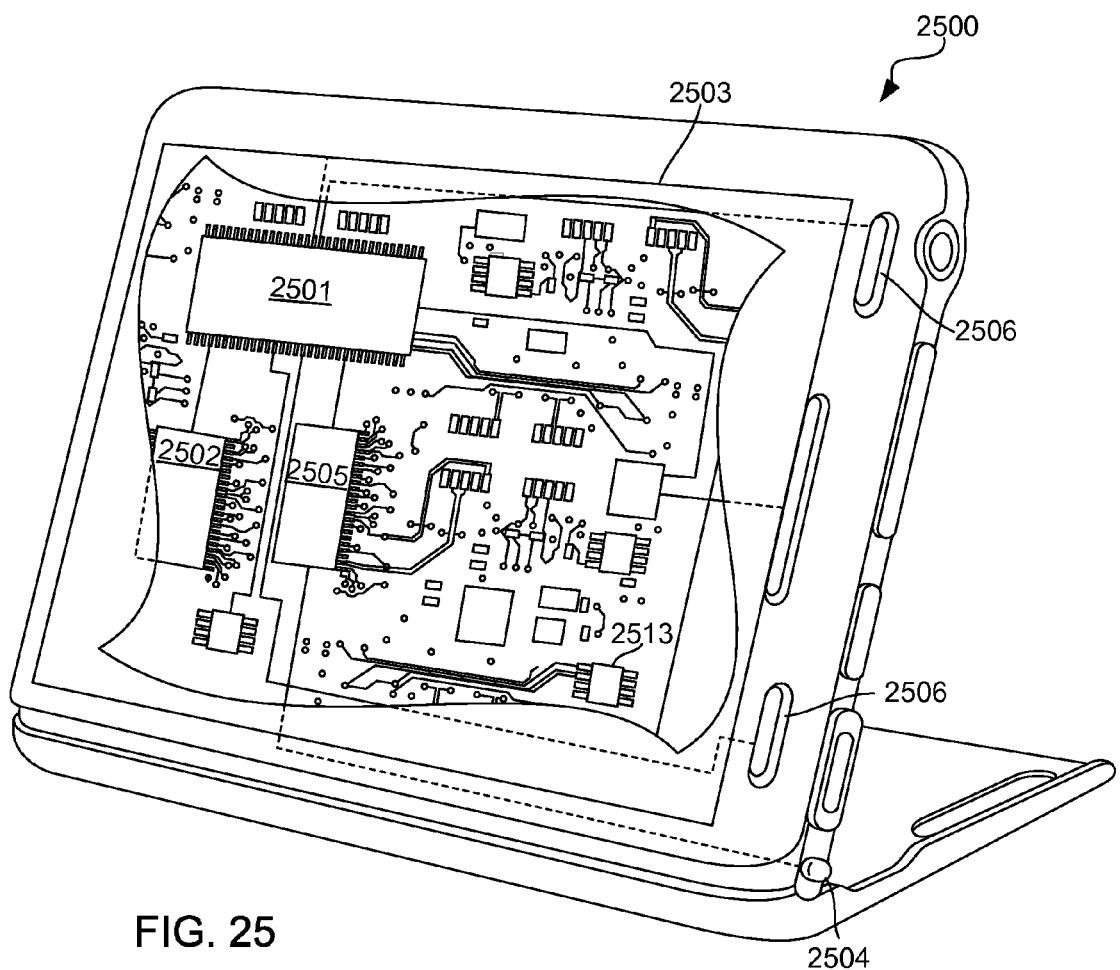
FIG. 25 is a component block diagram of a mobile device suitable for use in an embodiment.

FIG. 25 is a system block diagram of a receiver device suitable for use with any of the embodiments. The embodiments may be implemented in a variety of mobile devices, particularly mobile computing devices. An example of a mobile device that may implement the various embodiments is a smart phone 2500 illustrated in FIG. 25. A multi-processor mobile device, such as a smart phone 2500, may include a processor 2501 coupled to memory 2502 and to a radio frequency data modem 2505. The modem 2505 may be coupled to an antenna 2504 for receiving and transmitting radio frequency signals. The smart phone 2500 may also include a display 2503, such as a touch screen display. The mobile device 2500 may also include user input devices, such as buttons 2506, to receive user inputs. In the various embodiments the smart phone 2500 includes a tactile output surface, which may be positioned on the display 2503 (e.g., using E-Sense™ technology), on a back surface 2512, or another surface of the mobile device 2500. The mobile device processor 2501 may be any programmable microprocessor, microcomputer or multiple processor chip or chips that can be configured by software instructions (applications) to perform a variety of functions, including the functions of the various embodiments described herein. Typically, software applications may be stored in the internal memory 2502 before they are accessed and loaded into the processor 2501. In some mobile computing devices, additional memory chips (e.g., a Secure Data (SD) card) may be plugged into the mobile device and coupled to the processor 2501. The internal memory 2502 may be a volatile or nonvolatile memory, such as flash memory, or a mixture of both. For the purposes of this description, a general reference to memory refers to all memory accessible by the processor 2501, including internal memory 2502, removable memory plugged into the mobile device, and memory within the processor 2501.

Figure 26:
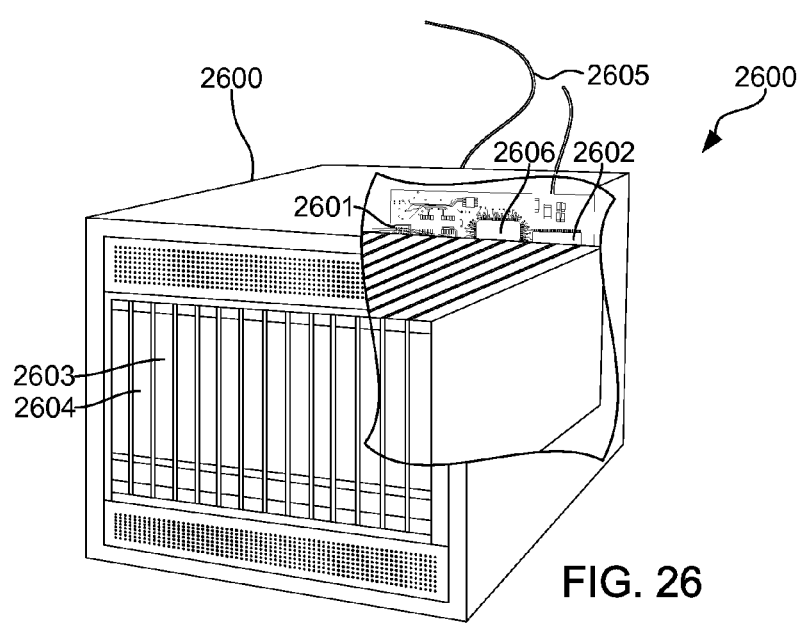
FIG. 26 is a component block diagram of a server device suitable for use in an embodiment.

The various embodiments may be implemented on any of a variety of commercially available server devices, such as the server 2600 illustrated in FIG. 26. Such a server 2600 typically includes a processor 2601 coupled to volatile memory 2602 and a large capacity nonvolatile memory, such as a disk drive 2603. The server 2600 may also include a floppy disc drive, compact disc (CD) or DVD disc drive 2606 coupled to the processor 2601. The server 2600 may also include network access ports 2604 coupled to the processor 2601 for establishing data connections with a network 2605, such as a local area network coupled to other broadcast system computers and servers. The processors 2501, 2601 may be any programmable microprocessor, microcomputer or multiple processor chip or chips that can be configured by software instructions (applications) to perform a variety of functions, including the functions of the various embodiments described above. In some devices, multiple processors 2501, 2601 may be provided, such as one processor dedicated to wireless communication functions and one processor dedicated to running other applications. Typically, software applications may be stored in the internal memory 2502, 2602, and 2603 before they are accessed and loaded into the processor 2501, 2601.

The processor 2501, 2601 may include internal memory sufficient to store the application software instructions. In many devices the internal memory may be a volatile or nonvolatile memory, such as flash memory, or a mixture of both. For the purposes of this description, a general reference to memory refers to memory accessible by the processor 2501, 2601 including internal memory or removable memory plugged into the device and memory within the processor 2501, 2601 itself.

Figure 27:
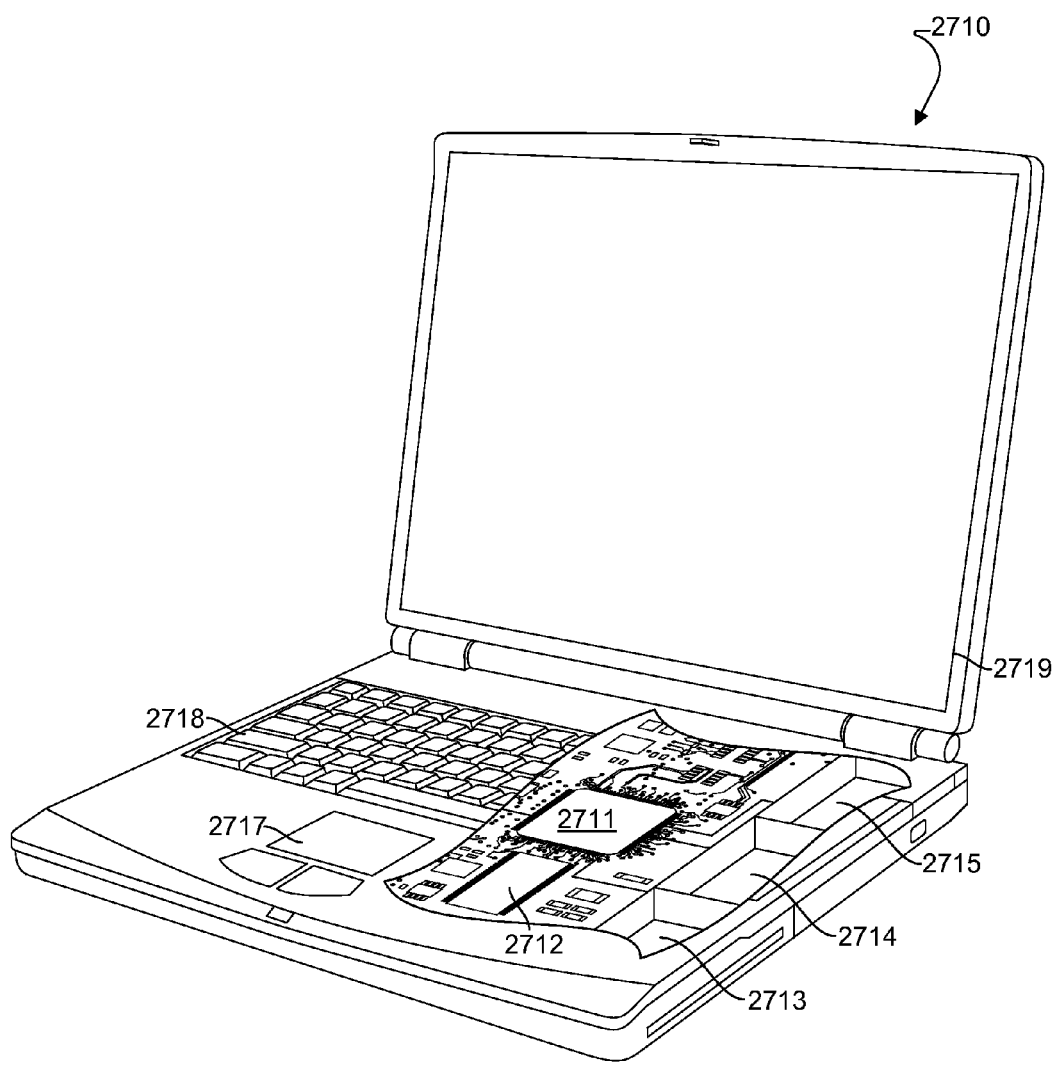
FIG. 27 is a component block diagram of a laptop computer device suitable for use in an embodiment.

FIG. 27 shows a computer 2710. The embodiments described above may also be implemented within a variety of personal computing devices, such as a laptop computer 2710 as illustrated in FIG. 9 that may be operable with a Yagatta application. Many laptop computers include a touch pad touch surface 2717 that serves as the computer's pointing device, and thus may receive drag, scroll, and flick gestures similar to those implemented on mobile computing devices equipped with a touch screen display and described above. A laptop computer 2710 will typically include a processor 2711 coupled to volatile memory 2712 and a large capacity nonvolatile memory, such as a disk drive 2713 of Flash memory. The computer 2710 may also include a floppy disc drive 2714 and a compact disc (CD) drive 2715 coupled to the processor 2711. The computer device 2710 may also include a number of connector ports coupled to the processor 2711 for establishing data connections or receiving external memory devices, such as a USB or FireWire® connector sockets, or other network connection circuits for coupling the processor 2711 to a network (not shown). In a notebook configuration 2710, the computer housing includes the touchpad 2717, the keyboard 2718, and the display 2719 all coupled to the processor 2711. Other configurations of computing device 2710 may include a computer mouse or trackball (not shown) coupled to the processor 2711 (e.g., via a USB input) as are well known, which may also be use in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The operations of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for conducting a communication session among a plurality of participants supported by a server, comprising:
    establishing a group communication session between a first participant and a second participant;
    determining a contextual parameter of the group communication session, wherein the contextual parameter comprises a summary of what the group communication session is about;
    receiving a request by the server to assign a dynamic point of control entity to the group communication session;
    assigning, by the server, the dynamic point of control entity from a number of different dynamic point of control entities that are not participants in the group communication session based on the determined contextual parameter; and
    taking action in the group communication session based on the contextual parameter.

2. The method of claim 1, further comprising:
    inviting an additional participant to join the group communication session based on the determined contextual parameter;
    delivering resource allocation parameters from the server to the dynamic point of control entity.

3. The method of claim 2, further comprising:
    receiving a request by the server to assign the dynamic point of control entity access to information regarding a conduct of participants of the group communication session and assigning the dynamic point of control entity control authority over the group communication session; and
    delivering resource allocation parameters from the server to the dynamic point of control entity to assign the dynamic point of control entity access to information regarding the conduct of the participants of the group communication session and assigning the dynamic point of control entity control authority over the group communication session.

4. The method of claim 1, wherein determining a contextual parameter of the group communication session comprises:
    receiving an output of a sensor; and
    comparing the output to a plurality of rules to determine the contextual parameter.

5. The method of claim 1, wherein determining a contextual parameter of the group communication session comprises receiving a message from a group communication session participant indicating the contextual parameter.

6. The method of claim 1, wherein determining a contextual parameter of the group communication session comprises:
    receiving an output from a computing device that a group participant has crossed a predetermined geographic location; and
    comparing the output to a plurality of rules to determine the contextual parameter.

7. The method of claim 1, wherein determining a contextual parameter of the group communication session comprises:
    receiving an output from a computing device; and
    comparing the output to a plurality of defined rules to determine the contextual parameter.

8. The method of claim 1, wherein determining a contextual parameter of the group communication session comprises receiving a signal from a computing device indicating that an emergency has occurred.

9. The method of claim 1, wherein determining a contextual parameter of the group communication session comprises receiving a signal from the server that an emergency has occurred.

10. The method of claim 1, wherein determining a contextual parameter of the group communication session comprises receiving a signal that a predetermined entity has joined the group communication session.

11. The method of claim 1, wherein determining a contextual parameter of the group communication session comprises receiving a signal which is transmitted in response to a condition that an entity with specialized knowledge is needed by at least one participant in the group communication session.

12. The method of claim 1, wherein determining a contextual parameter of the group communication session comprises receiving a signal which is transmitted in response to a condition indicating assistance is needed by at least one participant in the group communication session.

13. The method of claim 1, wherein determining a contextual parameter of the group communication session comprises receiving a signal which is transmitted in response to a condition indicating that a priority level of the group communication session has changed by at least one participant in the group communication session.

14. The method of claim 1, further comprising:
ranking a plurality of group participants; and
determining the contextual parameter based on the ranking.

15. The method of claim 14, further comprising:
adding additional group participants;
ranking the additional group participants and the plurality of group participants; and
determining the contextual parameter based on a change of the ranking.

16. The method of claim 1, wherein taking action in the group communication session based on the contextual parameter comprises:
receiving a request by the server to add group participants to the group communication session; and
receiving resource allocation parameters to add group participants to the group communication session.

17. The method of claim 1, wherein taking action in the group communication session based on the contextual parameter comprises:
receiving a request by the server to drop group participants from the group communication session; and
receiving resource allocation parameters to drop group participants from the group communication session.

18. The method of claim 1, wherein taking action in the group communication session based on the contextual parameter comprises:
receiving a request by the server to form a sidebar communication session from at least two of group communication session participants; and
receiving resource allocation parameters to form the sidebar communication session from at least two of group communication session participants.

19. The method of claim 1, wherein taking action in the group communication session based on the contextual parameter comprises:
receiving resource allocation parameters to assign the dynamic point of control entity to the group communication session.

20. The method of claim 1, wherein taking action in the group communication session based on the contextual parameter comprises:
receiving a request by the server to grant an entity a floor from a plurality of group participants wherein the entity transmits content to the plurality of group participants; and
receiving resource allocation parameters to grant the entity the floor from the plurality of group participants wherein the entity transmits content to the plurality of group participants.

21. The method of claim 1, wherein taking action in the group communication session based on the contextual parameter comprises:
receiving a request by the server to transfer a dynamic point of control entity role to a second entity; and
receiving resource allocation parameters to transfer the dynamic point of control entity role to the second entity.

22. The method of claim 1, wherein taking action in the group communication session based on the contextual parameter comprises:
receiving a request by the server to remove a dynamic point of control entity role from the group communication session; and
receiving resource allocation parameters to remove the dynamic point of control entity role from the group communication session.

23. The method of claim 1, wherein taking action in the group communication session based on the contextual parameter comprises:
receiving a request by the server to store the contextual parameter to a memory; and
receiving resource allocation parameters to store the contextual parameter to the memory.

24. The method of claim 1, wherein taking action in the group communication session based on the contextual parameter comprises:
receiving a request by the server to request that the dynamic point of control entity join the communication session; and
receiving resource allocation parameters for the dynamic point of control entity to join the communication session.

25. The method of claim 1, wherein taking action in the group communication session based on the contextual parameter comprises:
receiving a request by the server to form a sidebar communication session between at least two different dynamic point of control entities; and
receiving resource allocation parameters to form the sidebar communication session between at least two different dynamic point of control entities.

26. The method of claim 1, wherein taking action in the group communication session based on the contextual parameter comprises:
receiving a request by the server to indicate that content in the group communication session is to become private to at least some group communication session participants; and
receiving resource allocation parameters to indicate that content in the group communication session is to become private to the at least some group communication session participants.

27. The method of claim 1, wherein taking action in the group communication session based on the contextual parameter comprises:
receiving a request by the server to indicate that content in the group communication session is to become public and shared with at least some group communication session participants; and
receiving resource allocation parameters to indicate that content in the group communication session is to become public and shared with at least some group communication session participants.

28. The method of claim 1, wherein taking action in the group communication session based on the contextual parameter comprises:
receiving a request by the server to mute at least some group communication session participants in the group communication session; and
receiving resource allocation parameters to mute at least some group communication session participants.

29. The method of claim 1, wherein taking action in the group communication session based on the contextual parameter comprises:
receiving a request by the server to give a first participant a floor of the group communication session; and receiving resource allocation parameters to give the first participant the floor of the communication session and to mute other participants except the first participant in the group communication session.

30. The method of claim 1, wherein taking action in the group communication session based on the contextual parameter comprises:
receiving a request by the server to deliver content to one or more participants in the group communication session; and
receiving resource allocation parameters to deliver the content to participants in the group communication session.

31. The method of claim 30, wherein the content comprises one or more of video, audio, an text.

32. The method of claim 1, wherein taking action in the group communication session based on the contextual parameter comprises:
transmitting a request for the dynamic point of control entity to join participants in the communication session as a speaking participant; and
transmitting resource allocation parameters for the dynamic point of control entity to join to participants in the communication session as the speaking participant.

33. The method of claim 1, wherein taking action in the group communication session based on the contextual parameter comprises:
receiving data from a sensor on a communication device of one or more of the plurality of participants in the communication session; and
transmitting the received sensor data to the dynamic point of control entity, wherein the dynamic point of control entity formulates a request for providing instructions to a participant of the communication session providing the sensor data, and
wherein the server communicates resource allocation parameters to provide the request for instructions to the communication session participant providing the sensor data.

34. The method of claim 1, wherein taking action in the group communication session based on the contextual parameter comprises:
receiving a request for the server to form a private communication session, wherein the request indicates a participant associated with a second private communication session; and
selectively communicating resource allocation parameters to the communication session participants to join in the second private communication session.

35. The method of claim 1, wherein taking action in the group communication session based on the contextual parameter comprises:
receiving an alert message that comprises at least one of an alert if a boundary is crossed, an alert if a predetermined talk time is exceeded, an alert a sensor has been triggered, and a mute or an alert action if a background noise exceeds a predetermined level.

36. A server, comprising:
memory; and
a server processor coupled to the memory, wherein the server processor is configured with processor executable instructions to perform operations comprising:
establishing a group communication session between a first participant and a second participant;
determining a contextual parameter of the group communication session, wherein the contextual parameter comprises a summary of what the group communication session is about;
receiving a request to assign a dynamic point of control entity to the group communication session;
assigning the dynamic point of control entity from a number of different dynamic point of control entities that are not participants in the group communication session based on the determined contextual parameter; and
taking action in the group communication session based on the contextual parameter.

37. The server of claim 36, wherein the server processor is configured with processor-executable instructions to perform operations such that determining a contextual parameter of the group communication session comprises:
receiving an output of a sensor; and
comparing the output to a plurality of rules to determine the contextual parameter.

38. The server of claim 36, wherein the server processor is configured with processor-executable instructions to perform operations such that determining a contextual parameter of the group communication session comprises receiving a message from one of the first participant and the second participant indicating the contextual parameter.

39. The server of claim 36, wherein the server processor is configured with processor-executable instructions to perform operations such that determining a contextual parameter of the group communication session comprises:
receiving a message that a group participant has crossed a predetermined geographic location; and
comparing the crossed predetermined geographic location to a plurality of rules to determine the contextual parameter.

40. The server of claim 36, wherein the server processor is configured with processor-executable instructions to perform operations such that determining a contextual parameter of the group communication session comprises:
receiving an output from a computing device; and
comparing the output from a computing device output to a plurality of defined rules to determine the contextual parameter.

41. The server of claim 36, wherein the server processor is configured with processor-executable instructions to perform operations such that determining a contextual parameter of the group communication session comprises:
receiving a signal indicating that an emergency has occurred.

42. The server of claim 36, wherein the server processor is configured with processor-executable instructions to perform operations such that determining a contextual parameter of the group communication session comprises:
receiving a signal that a predetermined entity has joined the group communication session.

43. The server of claim 36, wherein the server processor is configured with processor-executable instructions to perform operations such that determining a contextual parameter of the group communication session comprises:
receiving a signal indicating that an entity with specialized knowledge is needed by at least one participant in the group communication session.

44. The server of claim 36, wherein the server processor is configured with processor-executable instructions to perform operations such that determining a contextual parameter of the group communication session comprises:
receiving a signal indicating assistance is needed by at least one participant in the group communication session.

45. The server of claim 36, wherein the server processor is configured with processor-executable instructions to perform operations such that determining a contextual parameter of the group communication session comprises:
receiving a signal indicating that a priority level of a group communication session changed by at least one participant in the group communication session.

46. The server of claim 36, wherein the server processor is configured with processor-executable instructions to perform operations further comprising:
ranking a plurality of group participants; and
determining the contextual parameter based on the ranking.

47. The server of claim 46, wherein the server processor is configured with processor-executable instructions to perform operations further comprising:
adding additional group participants to the group communication session;
ranking the additional group participants and the plurality of group participants; and
determining the contextual parameter based on a change of the ranking.

48. The server of claim 36, wherein the server processor is configured with processor-executable instructions to perform operations such that:
determining a contextual parameter of the group communication session comprises receiving data from a sensor on a communication device of one or more participants in the group communication session; and
taking action in the group communication session based on the contextual parameter comprises:
transmitting the received sensor data to the dynamic point of control entity;
receiving a message from the dynamic point of control entity comprising a request for providing instructions to a participant of the group communication session providing the sensor data; and
transmitting resource allocation parameters for the dynamic point of control entity to provide the request for instructions.

49. The server of claim 36, wherein the server processor is configured with processor-executable instructions to perform operations further comprising communicating data to at least one participant via multicast.

50. The server of claim 36, wherein the server processor is configured with processor-executable instructions to perform operations such that taking action in the group communication session based on the contextual parameter comprises:
transmitting an alert message that comprises at least one of an alert if a boundary is crossed, an alert if a predetermined talk time is exceeded, an alert a sensor has been triggered and
a mute, or an alert action if a background noise exceeds a predetermined level.

51. A non-transitory processor readable medium having stored thereon processor executable instructions configured to cause a server processor to perform operations comprising:
establishing a group communication session between a first participant and a second participant;
determining a contextual parameter of the group communication session, wherein the contextual parameter comprises a summary of what the group communication session is about;
receiving a request to assign a dynamic point of control entity to the group communication session;
assigning the dynamic point of control entity from a number of different dynamic point of control entities dynamic point of control entities that are not participants in the group communication session based on the determined contextual parameter; and
taking action in the group communication session based on the contextual parameter.

52. The non-transitory processor readable medium of claim 51, wherein the stored processor-executable instructions are configured to cause the server processor to perform operations such that:
determining a contextual parameter of the group communication session comprises:
receiving an output of a sensor; and
comparing the output to a plurality of rules to determine the contextual parameter.

53. The non-transitory processor readable medium of claim 51, wherein the stored processor-executable instructions are configured to cause the server processor to perform operations such that:
determining a contextual parameter of the group communication session comprises receiving a message from one of the first participant and the second participant indicating the contextual parameter.

54. The non-transitory processor readable medium of claim 51, wherein the stored processor-executable instructions are configured to cause the server processor to perform operations wherein determining a contextual parameter of the group communication session comprises:
receiving output message from a computing device that a group participant has crossed a predetermined geographic location; and
comparing the crossed predetermined geographic location to a plurality of rules to determine the contextual parameter.

55. The non-transitory processor readable medium of claim 51, wherein the server processor is configured with processor-executable instructions to perform operations such that determining a contextual parameter of the group communication session comprises:
receiving an output from a computing device; and
comparing the output from the computing device to a plurality of defined rules to determine the contextual parameter.

56. The non-transitory processor readable medium of claim 51, wherein the stored processor-executable instructions are configured to cause the server processor to perform operations such that determining a contextual parameter of the group communication session comprises:
receiving a signal indicating that an emergency has occurred.

57. The non-transitory processor readable medium of claim 51, wherein the stored processor-executable instructions are configured to cause the server processor to perform operations such that determining a contextual parameter of the group communication session comprises:
receiving a signal that a predetermined entity has joined the group communication session.

58. The non-transitory processor readable medium of claim 51, wherein the stored processor-executable instructions are configured to cause the server processor to perform operations such that determining a contextual parameter of the group communication session comprises:
receiving a signal indicating a condition that an entity with specialized knowledge is needed by at least one participant in the group communication session.

59. The non-transitory processor readable medium of claim 51, wherein the stored processor-executable instructions are configured to cause the server processor to perform operations such that determining a contextual parameter of the group communication session comprises:

receiving a signal which is transmitted in response to a condition indicating assistance is needed by at least one participant in the group communication session.

60. The non-transitory processor readable medium of claim 51, wherein the stored processor-executable instructions are configured to cause the server processor to perform operations such that determining a contextual parameter of the group communication session comprises:

receiving a signal indicating that a priority level of a group communication session has changed by at least one participant in the group communication session.

61. The non-transitory processor readable medium of claim 51, wherein the stored processor-executable instructions are configured to cause the server processor to perform operations further comprising:

ranking a plurality of group participants; and
determining the contextual parameter based on the ranking.

62. The non-transitory processor readable medium of claim 61, wherein the stored processor-executable instructions are configured to cause the server processor to perform operations further comprising:

adding additional group participants to the group communication session;
ranking the additional group participants and the plurality of group participants; and
determining the contextual parameter based on a change of the ranking.

63. The non-transitory processor readable medium of claim 51, wherein the stored processor-executable instructions are configured to cause the server processor to perform operations such that:

receiving data from a sensor on a communication device of one or more of the participants in the group communication session; and
taking action in the group communication session based on the contextual parameter comprises:
transmitting the received sensor data to the dynamic point of control entity; and
receiving a request for providing instructions to a participant of the group communication session providing the sensor data; and
transmitting resource allocation parameters for the dynamic point of control entity to provide the request for instructions.

64. The non-transitory processor readable medium of claim 51, wherein the stored processor-executable instructions are configured to cause the server processor to perform operations such that taking action in the group communication session based on the contextual parameter comprises:

transmitting an alert message that comprises at least one of an alert if a boundary is crossed, an alert if a predetermined talk time is exceeded, an alert a sensor has been triggered and
a mute or an alert action if a background noise exceeds a predetermined level.

65. A server, comprising:

means for establishing a group communication session between a first participant and a second participant;
means for determining a contextual parameter of the group communication session, wherein the contextual parameter comprises a summary of what the group communication session is about;
means for receiving a request to assign a dynamic point of control entity to the group communication session;
means for assigning the dynamic point of control entity from a number of different dynamic point of control entities dynamic point of control entities that are not participants in the group communication session based on the determined contextual parameter; and
means for taking action in the group communication session based on the contextual parameter.

66. The server of claim 65, wherein the means for determining a contextual parameter of the group communication session comprises:

means for receiving an output of a sensor; and
means for comparing the output to a plurality of rules to determine the contextual parameter.

67. The server of claim 65, wherein the means for determining a contextual parameter of the group communication session comprises:

means for receiving a message from one of the group participants indicating the contextual parameter.

68. The server of claim 65, wherein the means for determining a contextual parameter of the group communication session comprises:

means for receiving output message from a computing device that a group participant has crossed a predetermined geographic location; and
means for comparing the crossed predetermined geographic location to a plurality of rules to determine the contextual parameter.

69. The server of claim 65, wherein the means for determining a contextual parameter of the group communication session comprises:

means for receiving an output from a device; and
means for comparing the output from the device to a plurality of defined rules to determine the contextual parameter.

70. The server of claim 65, wherein the means for determining a contextual parameter of the group communication session comprises:

means for receiving a signal indicating that an emergency has occurred.

71. The server of claim 65, wherein the means for determining a contextual parameter of the group communication session comprises:

means for receiving a signal that a predetermined entity has joined the group communication session.

72. The server of claim 65, wherein the means for determining a contextual parameter of the group communication session comprises:

means for receiving a signal indicating a condition that an entity with specialized knowledge is needed by at least one participant in the group communication session.

73. The server of claim 65, wherein the means for determining a contextual parameter of the group communication session comprises:

means for receiving a signal which is transmitted in response to a condition indicating assistance is needed by at least one participant in the group communication session.

74. The server of claim 65, wherein the means for determining a contextual parameter of the group communication session comprises:

means for receiving a signal indicating that a priority level of a group communication session has changed by at least one participant in the group communication session.

75. The server of claim 65, further comprising:
means for ranking a plurality of group participants; and
means for determining the contextual parameter based on the ranking.

76. The server of claim 65, further comprising:
means for adding additional group participants to the group communication session;
means for ranking the additional group participants and the first participant and the second participant; and
means for determining the contextual parameter based on a change of the ranking.

77. The server of claim 65, further comprising:
means for receiving data from a sensor on a communication device of one or more of the participants in the group communication session; and
wherein the means for taking action in the group communication session based on the contextual parameter comprises:
means for transmitting the received sensor data to the dynamic point of control entity and receiving a request for providing instructions to a participant of the group communication session providing the sensor data; and
means for transmitting resource allocation parameters for the dynamic point of control entity to provide the request for instructions.

78. The server of claim 65, wherein the means for taking action in the group communication session based on the contextual parameter comprises:
means for transmitting an alert message that comprises at least one of means for an alert if a boundary is crossed, means for an alert if a predetermined talk time is exceeded, means for an alert a sensor has been triggered and means for a mute or means for an alert action if a background noise exceeds a predetermined level.

79. A computing device, comprising:
a memory; and
a processor coupled to the memory and configured with processor-executable instructions to perform operations comprising:
joining a group communication session between at least two participants as a dynamic point of control entity;
receiving resource allocation parameters enabling the computing device to serve as the dynamic point of control entity;
determining a contextual parameter of the group communication session, wherein the contextual parameter comprises a summary of what the group communication session is about;
transmitting a request to a server to assign to the group communication session another dynamic point of control entity that is not a participant in the group communication session, wherein an assignment of the other dynamic point of control entity is based on the determined contextual parameter; and
taking action in the group communication session based on the contextual parameter.

80. The computing device of claim 79, wherein the processor is configured with processor-executable instructions to perform operations such that determining a contextual parameter of the group communication session comprises:

receiving an output of a sensor; and
comparing the output to a plurality of rules to determine the contextual parameter.

81. The computing device of claim 79, wherein the processor is configured with processor-executable instructions to perform operations such that determining a contextual parameter of the group communication session comprises receiving a signal indicating that an emergency has occurred.

82. A computing device, comprising:
means for joining a group communication session between at least two participants as a dynamic point of control entity;
means for receiving resource allocation parameters enabling the computing device to serve as the dynamic point of control entity;
means for determining a contextual parameter of the group communication session, wherein the contextual parameter comprises a summary of what the group communication session is about;
means for transmitting a request to a server to assign to the group communication session another dynamic point of control entity that is not a participant in the group communication session, wherein an assignment of the other dynamic point of control entity is based on the determined contextual parameter; and
means for taking action in the group communication session based on the contextual parameter.

83. The computing device of claim 82, wherein the means for determining a contextual parameter of the group communication session comprises:
means for receiving an output of a sensor; and
means for comparing the output to a plurality of rules to determine the contextual parameter.

84. The computing device of claim 82, wherein the means for determining a contextual parameter of the group communication session comprises means for receiving a signal indicating that an emergency has occurred.

85. A non-transitory computer-readable storage medium having stored thereon processor executable instructions configured to cause a computer device processor of a computing device to perform operations, comprising:
joining a group communication session between at least two participants as a dynamic point of control entity;
receiving resource allocation parameters enabling the computing device to serve as the dynamic point of control entity;
determining a contextual parameter of the group communication session, wherein the contextual parameter comprises a summary of what the group communication session is about;
transmitting a request to a server to assign to the group communication session another dynamic point of control entity that is not a participant in the group communication session, wherein an assignment of the other dynamic point of control entity is based on the determined contextual parameter; and
taking action in the group communication session based on the contextual parameter.

86. The non-transitory processor readable medium of claim 85, wherein the stored processor-executable instructions are configured to cause the computer device processor to perform operations such that determining a contextual parameter of the group communication session comprises:
receiving an output of a sensor; and
comparing the output to a plurality of rules to determine the contextual parameter.

87. The non-transitory processor readable medium of claim 85, wherein the stored processor-executable instructions are configured to cause the computer device processor to perform operations such that determining a contextual parameter of the group communication session comprises receiving a signal indicating that an emergency has occurred.

88. A system, comprising:
a server comprising a server processor coupled to one of a broadcast network and a multicast network; and
a computing device comprising a computing device processor configured to receive communications from the server via one of the broadcast network and the multicast network,
wherein the server processor is configured with processor-executable instructions to perform operations comprising:
establishing a group communication session between a first participant and a second participant;
determining a contextual parameter of the group communication session, wherein the contextual parameter comprises a summary of what the group communication session is about;
receiving a request to assign a dynamic point of control entity to the group communication session;
assigning the dynamic point of control entity from a number of different dynamic point of control entities that are not participants in the group communication session based on the determined contextual parameter; and
taking action in the group communication session based on the contextual parameter.

89. The system of claim 88, wherein the server processor is configured with processor-executable instructions to perform operations such that determining a contextual parameter of the group communication session comprises:
receiving an output of a sensor; and
comparing the output to a plurality of rules to determine the contextual parameter.

90. The system of claim 88, wherein the server processor is configured with processor-executable instructions to perform operations such that determining a contextual parameter of the group communication session comprises receiving a message from one of the first participant and the second participant indicating the contextual parameter.

91. The system of claim 88, wherein the server processor is configured with processor-executable instructions to perform operations such that determining a contextual parameter of the group communication session comprises:
receiving a message from the computing device indicating that a group participant has crossed a predetermined geographic location; and
comparing the crossed geographic location to a plurality of rules to determine the contextual parameter.

92. The system of claim 88, wherein the server processor is configured with processor-executable instructions to perform operations such that determining a contextual parameter of the group communication session comprises:
receiving an output from the computing device; and
comparing the output from the computing device to a plurality of defined rules to determine the contextual parameter.

93. The system of claim 88, wherein the server processor is configured with processor-executable instructions to perform operations such that determining a contextual parameter of the group communication session comprises receiving a signal indicating that an emergency has occurred.

94. The system of claim 88, wherein the server processor is configured with processor-executable instructions to perform operations such that determining a contextual parameter of the group communication session comprises receiving a signal that a predetermined entity has joined the group communication session.

95. The system of claim 88, wherein the server processor is configured with processor-executable instructions to perform operations such that determining a contextual parameter of the group communication session comprises receiving a signal that an entity with specialized knowledge is needed by at least one participant in the group communication session.

96. The system of claim 88, wherein the server processor is configured with processor-executable instructions to perform operations such that determining a contextual parameter of the group communication session comprises receiving a signal indicating assistance is needed by at least one participant in the group communication session.

97. The system of claim 88, wherein the server processor is configured with processor-executable instructions to perform operations such that determining a contextual parameter of the group communication session comprises receiving a signal indicating that a priority level of a group communication session has changed by at least one participant in the group communication session.

98. The system of claim 88, wherein the server processor is configured with processor-executable instructions to perform operations further comprising:
ranking a plurality of group participants; and
determining the contextual parameter based on the ranking.

99. The system of claim 88, wherein the server processor is configured with processor-executable instructions to perform operations further comprising:
adding additional group participants;
ranking the additional group participants and the first participant and the second participant; and
determining the contextual parameter based on a change of the ranking.

100. The system of claim 88, wherein:
the computing device processor is configured with processor-executable instructions to perform operations such that:
determining a contextual parameter of the group communication session comprises receiving data from a sensor; and
the server processor is configured with processor-executable instructions to perform operations such that taking action in the group communication session based on the contextual parameter comprises:
receiving the sensor data and a request for providing instructions to a participant of transmitting resource allocation parameters for the dynamic point of control entity to provide the request for instructions.

101. The system of claim 88, wherein the server processor is configured with processor-executable instructions to perform operations such that taking action in the group communication session based on the contextual parameter comprises:
transmitting an alert message that comprises at least one of an alert if a boundary is crossed, an alert if a predetermined talk time is exceeded, an alert a sensor has been triggered and
a mute or an alert action if a background noise exceeds a predetermined level.

102. A system, comprising:
a server coupled to one of a broadcast network and a multicast network; and
a computing device comprising:
means for receiving communications from the server via one of the broadcast network and the multicast network;
means for joining a group communication session between at least two participants as a dynamic point of control entity;
means for receiving resource allocation parameters enabling the computing device to serve as the dynamic point of control entity;
means for determining a contextual parameter of the group communication session, wherein the contextual parameter comprises a summary of what the group communication session is about;
means for transmitting a request to the server to assign to the group communication session another dynamic point of control entity that is not a participant in the group communication session, wherein an assignment of the other dynamic point of control entity is based on the determined contextual parameter; and
taking action in the group communication session based on the contextual parameter.

103. The system of claim 102, wherein means for determining a contextual parameter of the group communication session further comprises:
means for receiving an output of a sensor; and
means for comparing the output to a plurality of rules to determine the contextual parameter.

104. The system of claim 102, wherein means for determining a contextual parameter of the group communication session comprises:
means for receiving a message from a participant in the group communication session indicating the contextual parameter.

105. The system of claim 102, wherein means for determining a contextual parameter of the group communication session comprises:
means for receiving a message from the computing device that a group participant crossed a predetermined geographic location; and
means for comparing the crossed geographic location to a plurality of rules to determine the contextual parameter.

106. The system of claim 102, wherein means for determining a contextual parameter of the group communication session comprises:
means for transmitting an output from the computing device.

107. The system of claim 102, wherein means for determining a contextual parameter of the group communication session further comprises:
means for receiving a signal indicating that an emergency has occurred.

108. The system of claim 102, wherein means for determining a contextual parameter of the group communication session further comprises:
means for transmitting a signal from the computing device that a predetermined entity has joined the group communication session.

109. The system of claim 102, wherein means for determining a contextual parameter of the group communication session comprises means for transmitting a signal from the computing device indicating that an entity with specialized knowledge is needed.

110. The system of claim 102, wherein means for determining a contextual parameter of the group communication session further comprises means for transmitting a signal indicating assistance is needed.

111. The system of claim 102, wherein means for determining a contextual parameter of the group communication session further comprises means for transmitting a signal indicating that a priority level of a group communication session changed by at least one participant in the group communication session.

112. The system of claim 102, the computing device further comprising:
means for ranking a plurality of group participants; and
means for determining the contextual parameter based on the ranking.

113. The system of claim 102, the computing device further comprising:
means for adding additional group participants;
means for ranking the additional group participants and the at least two participants; and
means for determining the contextual parameter based on a change of the ranking.

114. The system of claim 102, wherein:
means for determining a contextual parameter of the group communication session comprises means for receiving data from a sensor on a communication device of one or more of the at least two participants in the group communication session; and
means for taking action in the group communication session based on the contextual parameter comprises:
means for receiving a message including a request for providing instructions to a participant of the group communication session providing the sensor data; and
means for transmitting resource allocation parameters for the dynamic point of control entity to provide the request for instructions.

115. The system of claim 102, wherein means for taking action in the group communication session based on the contextual parameter comprises means for transmitting an alert message that comprises at least one of means for an alert if a boundary is crossed, means for an alert if a predetermined talk time is exceeded, means for an alert a sensor has been triggered and means for a mute, or means for an alert action if a background noise exceeds a predetermined level.

* * * * *